United States Patent
Tsukuba

(10) Patent No.: US 11,336,919 B2
(45) Date of Patent: May 17, 2022

(54) IMAGE PROCESSING APPARATUS AND METHOD

(71) Applicant: SONY CORPORATION, Tokyo (JP)

(72) Inventor: Takeshi Tsukuba, Chiba (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/982,910

(22) PCT Filed: Mar. 18, 2019

(86) PCT No.: PCT/JP2019/011049
§ 371 (c)(1),
(2) Date: Sep. 21, 2020

(87) PCT Pub. No.: WO2019/188467
PCT Pub. Date: Oct. 3, 2019

(65) Prior Publication Data
US 2021/0014533 A1    Jan. 14, 2021

(30) Foreign Application Priority Data

Mar. 30, 2018 (JP) ............................. JP2018-067808
Jun. 29, 2018 (JP) ............................. JP2018-124008

(51) Int. Cl.
*H04N 19/625* (2014.01)
*H04N 19/124* (2014.01)
(Continued)

(52) U.S. Cl.
CPC ......... *H04N 19/625* (2014.11); *H04N 19/124* (2014.11); *H04N 19/426* (2014.11); *H04N 19/96* (2014.11)

(58) Field of Classification Search
CPC .................................................. H04N 19/625
(Continued)

(56) References Cited

U.S. PATENT DOCUMENTS

2012/0127003 A1* 5/2012 Shibahara ............ H04N 19/124
341/87
2013/0336385 A1* 12/2013 Budagavi ............. H04N 19/625
375/240.2
(Continued)

FOREIGN PATENT DOCUMENTS

JP     2014-036278 A    2/2014

OTHER PUBLICATIONS

V. Lorcy et al., Proposed improvements to the Adaptive multiple Core transform, Joint Video Exploration Team (JVET) of ITU-T SG 16 WP 3 and ISO/IEC JTC 1/SC 29/WG 11, May 26-Jun. 1, 2016, pp. 1-4, 3rd Meeting: Geneva, CH.
(Continued)

*Primary Examiner* — Yulin Sun
(74) *Attorney, Agent, or Firm* — Paratus Law Group, PLLC

(57) ABSTRACT

There is provided an image processing apparatus and a method that can suppress an increase in the memory capacity necessary for an orthogonal transform and an inverse orthogonal transform. A submatrix as part of a transform matrix in a first size is used to derive a transform matrix in a second size that is a size smaller than the first size. The derived transform matrix is used to apply an inverse orthogonal transform to coefficient data in which a predicted residual of an image is orthogonally transformed. In this way, an image is generated. The present disclosure can be applied to, for example, an image processing apparatus, an image decoding apparatus, an image encoding apparatus, or the like.

32 Claims, 55 Drawing Sheets

(51) Int. Cl.
*H04N 19/426* (2014.01)
*H04N 19/96* (2014.01)

(58) Field of Classification Search
USPC ....................................................... 375/240.2
See application file for complete search history.

(56) References Cited

U.S. PATENT DOCUMENTS

2015/0043641 A1* 2/2015 Gamei .................... H04N 19/52
375/240.12
2019/0281299 A1* 9/2019 Leleannec .............. H04N 19/61

OTHER PUBLICATIONS

An et al., Unified Adaptive Loop Filter for Luma and Chroma, Joint Video Exploration Team (JVET) of ITU-TSG 16 WP 3 and ISO/IEC JTC 1/SC 29/WG 11, Jul. 13-21, 2017, pp. 1-27, 7th Meeting: Torino, IT.

V. Lorcy et al., EE2: Adaptive Primary Transform improvement, Joint Video Exploration Team (JVET) of ITU-T SG 16 WP 3 and ISO/IEC JTC 1/SC 29/WG 11, Oct. 15-21, 2016, pp. 1-8, 4th Meeting: Chengdu, CN.

Chen et al., Algorithm Description of Joint Exploration Test Model 7 (JEM7), Joint Video Exploration Team (JVET) of ITU-T SG 16 WP 3 and ISO/IEC JTC 1/SC 29/WG 11, Jul. 13-21, 2017, pp. i-iv, 1-6, and 28-35, 7th Meeting: Torino, IT.

Sugito et al., Improvement of Normality and Orthogonality in Hevc Transform Bases, 2012 Visual Communications and Image Processing, Nov. 27-30, 2012, pp. 1-6, San Diego, CA, IEEE.

Tsukuba et al., CE6: Transform Matrix Replacement (CE 6.1.8.1), Joint Video Exploration Team (JVET) of ITU-T SG 16 WP 3 and ISO/IEC JTC 1/SC 29/G 11, Jul. 10-18, 2018, pp. 1-12, 11th Meeting: Ljubljana, SI.

Suzuki et al., Description of SDR and HDR video coding technology proposal by Sony, Joint Video Experts Team (JVET) of ITU-T SG 16 WP 3 and ISO/IEC JTC 1/SC 29/WG 11, Apr. 10-20, 2018, pp. 1-7, 10th Meeting: San Diego.

* cited by examiner

FIG. 1

| TrSetIdx | Transform Candidates | |
|---|---|---|
| | pt_{hor,ver}_flag==0 | pt_{hor,ver}_flag==1 |
| 0 | 4 (DST-VII) | 2 (DCT-VIII) |
| 1 | 4 (DST-VII) | 3 (DST-I) |
| 2 | 4 (DST-VII) | 1 (DCT-V) |
| 3 | 2 (DCT-VIII) | 4 (DST-VII) |
| 4 | DCT-II | |

Four pre-defined transform candidate sets ( LUT_TrSetToTrTypeIdx )

FOR INTRA PREDICTION (TrSetIdx 0–2)
FOR INTER PREDICTION (TrSetIdx 3)
CASE WHERE ADAPTIVE PRIMARY TRANSFORM IS NOT APPLIED (TrSetIdx 4)

TrTypeIdx==0 is DCT-II

FIG. 2

| TrType Idx | Transform Type | Basis function $T_i(j)$, $i,j=0,1,\cdots,N-1$ |
|---|---|---|
| 0 | DCT-II | $T_i(j) = \omega_0 \cdot \sqrt{\dfrac{2}{N}} \cdot \cos\left(\dfrac{\pi \cdot i \cdot (2j+1)}{2N}\right)$, where $\omega_0 = \begin{cases} \sqrt{\dfrac{1}{2}} & i=0 \\ 1 & i \neq 0 \end{cases}$ |
| 1 | DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{1}{2}} & i=0 \\ 1 & i \neq 0 \end{cases}$, $\omega_1 = \begin{cases} \sqrt{\dfrac{1}{2}} & j=0 \\ 1 & j \neq 0 \end{cases}$ |
| 2 | DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| 3 | DST-I | $T_i(j) = \sqrt{\dfrac{2}{N+1}} \cdot \sin\left(\dfrac{\pi \cdot (i+1) \cdot (j+1)}{N+1}\right)$ |
| 4 | DST-VII | $T_i(j) = \sqrt{\dfrac{4}{2N+1}} \cdot \sin\left(\dfrac{\pi \cdot (2i+1) \cdot (j+1)}{2N+1}\right)$ |

$N = 2, 4, 8, 16, \cdots, 2^{**}M$

IN IMPLEMENTATION, VALUE OF EACH COEFFICIENT $T_i(j)$ OF ORTHOGONAL TRANSFORM IS HELD AT k-bit INTEGER PRECISION

FIG. 3

Selected (H)orizontal and (V)ertical transform sets for each intra prediction mode (LUT_IntraModeToTrSet)

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |
| Intra Mode | 18 | 19 | 20 | 21 | 22 | 23 | 24 | 25 | 26 | 27 | 28 | 29 | 30 | 31 | 32 | 33 | 34 | |
| V | 0 | 0 | 0 | 0 | 0 | 1 | 0 | 1 | 0 | 1 | 0 | 1 | 0 | 1 | 32 | 33 | 34 | |
| H | 2 | 2 | 2 | 2 | 2 | 1 | 0 | 1 | 0 | 1 | 0 | 1 | 0 | 1 | 0 | 1 | 0 | |
| Intra Mode | 35 | 36 | 37 | 38 | 39 | 40 | 41 | 42 | 43 | 44 | 45 | 46 | 47 | 48 | 49 | 50 | 51 | 52 |
| V | 2 | 2 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |
| Intra Mode | 53 | 54 | 55 | 56 | 57 | 58 | 59 | 60 | 61 | 62 | 63 | 64 | 65 | 66 | 67 (=IntraBC) | 4 (=InterTrSetIdx) | 4 (=InterTrSetIdx) | |
| V | 2 | 2 | 1 | 0 | 1 | 0 | 1 | 0 | 1 | 0 | 1 | 0 | 1 | 0 | 0 | 1 | 1 | |
| H | 0 | 0 | 1 | 0 | 1 | 0 | 1 | 0 | 1 | 0 | 1 | 0 | 1 | 0 | 0 | 1 | 1 | |

FIG. 5

| TRANSFORM SIZE N | NUMBER OF ELEMENTS | TYPE OF TRANSFORM MATRIX | BIT PRECISION bit | LUT SIZE bits |
|---|---|---|---|---|
| 2 | 4 | 0 | 8 | 0 |
| 4 | 16 | 2 | 8 | 256 |
| 8 | 64 | 1 | 8 | 512 |
| 16 | 256 | 1 | 8 | 2048 |
| 32 | 1024 | 1 | 8 | 8192 |
| 64 | 4096 | 0 | 8 | 0 |
| 128 | 16384 | 0 | 8 | 0 |
| TOTAL | | | | 11008 (≒1.3KB) |

| TRANSFORM SIZE N | NUMBER OF ELEMENTS | TYPE OF TRANSFORM MATRIX | BIT PRECISION bit | LUT SIZE bits |
|---|---|---|---|---|
| 2 | 4 | 1 | 10 | 40 |
| 4 | 16 | 5 | 10 | 800 |
| 8 | 64 | 5 | 10 | 3200 |
| 16 | 256 | 5 | 10 | 12800 |
| 32 | 1024 | 5 | 10 | 51200 |
| 64 | 4096 | 5 | 10 | 204800 |
| 128 | 16384 | 1 | 10 | 163840 |
| | | | | 436680 (≈53KB) |

B

| TRANSFORM SIZE N | NUMBER OF ELEMENTS | TYPE OF TRANSFORM MATRIX | BIT PRECISION bit | LUT SIZE bits |
|---|---|---|---|---|
| 2 | 4 | 1 | 10 | 40 |
| 4 | 16 | 7 | 10 | 1120 |
| 8 | 64 | 7 | 10 | 4480 |
| 16 | 256 | 7 | 10 | 17920 |
| 32 | 1024 | 7 | 10 | 71680 |
| 64 | 4096 | 7 | 10 | 286720 |
| 128 | 16384 | 1 | 10 | 163840 |
| TOTAL | | | | 545800 (≈67KB) |

F I G. 7

DCT2  $\quad C_N^2[k, l] = \text{round}\left(2^m \frac{2}{\sqrt{2N}} \delta_k \cos\left\{\frac{\left(l+\frac{1}{2}\right)k\pi}{N}\right\}\right),\quad (l, k = 0, 1, \ldots, N-1)$ DST7  $\quad S_N^7[k, l] = \text{round}\left(2^m \frac{2}{\sqrt{2N+1}} \sin\left\{\frac{2(l+1)\left(k+\frac{1}{2}\right)\pi}{2N+1}\right\}\right),\quad (l, k = 0, 1, \ldots, N-1)$ DCT8  $\quad C_N^8[k, l] = \text{round}\left(2^m \frac{2}{\sqrt{2N+1}} \cos\left[\frac{2\left(l+\frac{1}{2}\right)\left(k+\frac{1}{2}\right)\pi}{2N+1}\right]\right),\quad (l, k = 0, 1, \ldots, N-1)$ DST1  $\quad S_N^1[k, l] = \text{round}\left(2^m \sqrt{\frac{2}{N+1}} \sin\left[\frac{(l+1)(k+1)\pi}{N+1}\right]\right),\quad (l, k = 0, 1, \ldots, N-1)$ , where $m = 8 + \log 2(N)/2$ $\delta_k$ is $\frac{1}{\sqrt{2}}$ for $k = 0$ and 1 for otherwise

FIG. 16

| TRANSFORM MATRIX TO BE DERIVED ($2^{(N-1)} \times 2^{(N-1)}$) | BASE TRANSFORM MATRIX ($2^N \times 2^N$) | OPERATION FOR TRANSFORM MATRIX | | | | | | | EFFECT | CORRESPONDING FORMULA |
|---|---|---|---|---|---|---|---|---|---|---|
| | | SAMPLING (SUBMATRIX) | | | | SIGN INVERSION | | FLIP | TRANSPOSITION | |
| | | EVEN MATRIX (LOW-ORDER) | EVEN MATRIX (HIGH-ORDER) | ODD MATRIX (LOW-ORDER) | ODD MATRIX (HIGH-ORDER) | ODD LOCATION | EVEN LOCATION | | | |
| $2^{(N-1)}$-pt DCT2 | $2^N$-pt DCT2 | X | | | | | | | | • TRANSFORM MATRIX OF $2^{(N-1)}$-pt DCT2 IS DERIVED (TRANSFORM MATRIX IN HEVC) (REFERENCE) | A-1 |
| $2^{(N-1)}$-pt DCT3 | $2^N$-pt DCT2 | X | | | | | | | X | • TRANSFORM MATRIX OF $2^{(N-1)}$-pt DCT3 IS DERIVED | A-2 |
| $2^{(N-1)}$-pt AltDCT2 | $2^N$-pt DCT2 | | X | | | | | | | • DCT2 COMPATIBLE TRANSFORM MATRIX EQUIVALENT TO $2^{(N-1)}$-pt DCT2 IS DERIVED (SIGN OF ODD BASIS VECTOR IS OPPOSITE) | A-3 |
| $2^{(N-1)}$-pt DCT4 | $2^N$-pt DCT2 | | X | | | X | | | | • TRANSFORM MATRIX OF $2^{(N-1)}$-pt DCT4 IS DERIVED | A-4 |
| $2^{(N-1)}$-pt DCT4 | $2^N$-pt DCT2 | | | X | | | | | | • TRANSFORM MATRIX OF $2^{(N-1)}$-pt DCT4 IS DERIVED | A-5 |
| $2^{(N-1)}$-pt FlipDST4 | $2^N$-pt DCT2 | | | X | X | | | | | • DST4 COMPATIBLE TRANSFORM MATRIX (FlipDCT4) EQUIVALENT TO $2^{(N-1)}$-pt DST4 IS DERIVED | A-6 |
| $2^{(N-1)}$-pt AltDST4 | $2^N$-pt DCT2 | | | | X | | X | | | • DST4 COMPATIBLE TRANSFORM MATRIX (AltDCT4) EQUIVALENT TO $2^{(N-1)}$-pt DST4 IS DERIVED (SIGN OF EVEN BASIS VECTOR IS OPPOSITE) | A-7 |
| $2^{(N-1)}$-pt DST4 | $2^N$-pt DCT2 | | | | | X | | X | | • TRANSFORM MATRIX OF $2^{(N-1)}$-pt DST4 IS DERIVED | A-8 |
| $2^{(N-1)}$-pt DST4 | $2^N$-pt DCT2 | X | | | | | | X | | • TRANSFORM MATRIX OF $2^{(N-1)}$-pt DST4 IS DERIVED | A-9 |
| | | | | | | | | | | COMMON EFFECT: • TRANSFORM MATRICES OF TRANSFORM MATRIX OF $2^N$-pt AND TRANSFORM MATRIX OF $2^{(N-1)}$-pt CAN BE SHARED -> LUT SIZE IS REDUCED • MATRIX COMPUTATION CAN BE SHARED BETWEEN TRANSFORM MATRIX OF $2^{(N-1)}$-pt AND TRANSFORM MATRIX OF $2^{(N-1)}$-pt -> CIRCUIT SCALE CAN BE REDUCED | |

COMMON VIEWPOINT:
• FOCUS IS PLACED ON SIMILARITY (AXISYMMETRIC, TRANSPOSED, SIGNS ARE OPPOSITE) BETWEEN SUBMATRIX (EVEN MATRIX (LOW-ORDER), EVEN MATRIX (HIGH-ORDER), ODD MATRIX (LOW-ORDER), ODD MATRIX (HIGH-ORDER)) OF TRANSFORM MATRIX OF $2^N$-pt AND TRANSFORM MATRIX OF $2^{(N-1)}$-pt TO DERIVE TRANSFORM MATRIX OF $2^{(N-1)}$-pt FROM SUBMATRIX OF TRANSFORM MATRIX OF $2^N$-pt

FIG. 17

| TRANSFORM MATRIX TO BE DERIVED ($2^{(N-1)} \times 2^{(N-1)}$) | BASE TRANSFORM MATRIX ($2^N \times 2^N$) | OPERATION FOR TRANSFORM MATRIX | | | | | | | EFFECT | CORRESPONDING FORMULA |
|---|---|---|---|---|---|---|---|---|---|---|
| | | SAMPLING (SUBMATRIX) | | | | SIGN INVERSION | | FLIP | TRANSPOSITION | |
| | | EVEN MATRIX (LOW-ORDER) | EVEN MATRIX (HIGH-ORDER) | ODD MATRIX (LOW-ORDER) | ODD MATRIX (HIGH-ORDER) | ODD LOCATION | EVEN LOCATION | | | |
| $2^{(N-1)}$-pt DST7 | $2^N$-pt DST7 | X | | | | | | | | · TRANSFORM MATRIX OF $2^{(N-1)}$-pt DST7 IS DERIVED | B-1 |
| $2^{(N-1)}$-pt FlipDST7 | $2^N$-pt DST7 | X | | | | | | X | | · DCT8 COMPATIBLE TRANSFORM MATRIX EQUIVALENT TO $2^{(N-1)}$-pt DCT8 IS DERIVED (SIGN OF ODD BASIS VECTOR IS OPPOSITE) | B-2 |
| $2^{(N-1)}$-pt FlipDST7 | $2^N$-pt DST7 | | X | | | | | | | · DCT8 COMPATIBLE TRANSFORM MATRIX EQUIVALENT TO $2^{(N-1)}$-pt DCT8 IS DERIVED (SIGN OF ODD BASIS VECTOR IS OPPOSITE) | B-3 |
| $2^{(N-1)}$-pt DCT8 | $2^N$-pt DST7 | | X | | | X | | | | · TRANSFORM MATRIX OF $2^{(N-1)}$-pt DCT8 IS DERIVED | B-4 |
| $2^{(N-1)}$-pt DST5 | $2^N$-pt DST5 | | | X | | | | | | · TRANSFORM MATRIX OF $2^{(N-1)}$-pt DST5 IS DERIVED | B-5 |
| $2^{(N-1)}$-pt FlipDST5 | $2^N$-pt DST5 | | | X | | | | X | | · TRANSFORM MATRIX OF $2^{(N-1)}$-pt FlipDST5 IS DERIVED | B-6 |
| $2^{(N-1)}$-pt AltDST6 | $2^N$-pt DST5 | | | | X | | X | | | · DST6 COMPATIBLE TRANSFORM MATRIX EQUIVALENT TO $2^{(N-1)}$-pt DST6 IS DERIVED (SIGN OF EVEN BASIS VECTOR IS OPPOSITE) | B-7 |
| $2^{(N-1)}$-pt DST6 | $2^N$-pt DST7 | | X | | | | X | | | · TRANSFORM MATRIX OF $2^{(N-1)}$-pt DST6 IS DERIVED | B-8 |
| $2^{(N-1)}$-pt DST6 | $2^N$-pt DST7 | | X | | | | X | X | | · TRANSFORM MATRIX OF $2^{(N-1)}$-pt DST6 IS DERIVED | B-9 |

COMMON VIEWPOINT:
· FOCUS IS PLACED ON SIMILARITY (AXISYMMETRIC, TRANSPOSED, SIGNS ARE OPPOSITE) BETWEEN SUBMATRIX (EVEN MATRIX (LOW-ORDER), EVEN MATRIX (HIGH-ORDER), ODD MATRIX (LOW-ORDER), ODD MATRIX (HIGH-ORDER)) OF TRANSFORM MATRIX OF $2^N$-pt AND TRANSFORM MATRIX OF $2^{(N-1)}$-pt TO DERIVE TRANSFORM MATRIX OF $2^{(N-1)}$-pt FROM SUBMATRIX OF TRANSFORM MATRIX OF $2^N$-pt

COMMON EFFECT:
· TRANSFORM MATRICES OF TRANSFORM MATRIX OF $2^N$-pt AND TRANSFORM MATRIX OF $2^{(N-1)}$-pt CAN BE SHARED -> LUT SIZE IS REDUCED
· MATRIX COMPUTATION CAN BE SHARED BETWEEN TRANSFORM MATRIX OF $2^N$-pt AND TRANSFORM MATRIX OF $2^{(N-1)}$-pt -> CIRCUIT SCALE CAN BE REDUCED

F I G . 2 3

| TrTypeIdx | TRANSFORM TYPE TrType | BASE TRANSFORM MATRIX C | DERIVATION TRANSFORM MATRIX T | DERIVATION METHOD OF N×N TRANSFORM MATRIX T CORRESPONDING TO TRANSFORM TYPE TrType FROM BASE SUBMATRIX |
|---|---|---|---|---|
| 0 | DCT2 | $C_{2N,DCT2}$ | $T_{N,DCT2}$ | DERIVED BY EQUATION (A-1) OR EQUATION (A-4) |
| 1 | DST7 | $C_{2N,DST1}$ | $T_{N,DST7}$ | DERIVED BY EQUATION (B-1) |
| 2 | DCT8 | $C_{2N,DST1}$ | $T_{N,DCT8}$ | DERIVED BY EQUATION (B-4) |
| 3 | DST4 | $C_{2N,DCT2}$ | $T_{N,DST4}$ | DERIVED BY EQUATION (A-8) |
| 4 | DCT4 | $C_{2N,DCT2}$ | $T_{N,DCT4}$ | DERIVED BY EQUATION (A-5) |
| 5 | DST1 | $C_{N,DST1}$ | | SET N×N TRANSFORM MATRIX C OF DST1 AS TRANSFORM MATRIX T TO BE DERIVED |
| ⋮ | ⋮ | ⋮ | | |
| X | TRANSFORM Z | ⋮ | $T_{N,Z}$ | USE CORRESPONDING METHOD TO DERIVE N×N TRANSFORM MATRIX OF TRANSFORM Z |
| ⋮ | ⋮ | ⋮ | | ⋮ |

$C_{2N,DST1}$: INDICATES 2N×2N TRANSFORM MATRIX C OF DST1

F I G. 2 5

A

| TRANSFORM SIZE N | NUMBER OF ELEMENTS | TYPE OF SUBMATRIX OF UNIQUE TRANSFORM | BIT PRECISION bit | LUT SIZE bits |
|---|---|---|---|---|
| 4 | 16 | 1 | 10 | 40 |
| 8 | 64 | 1 | 10 | 160 |
| 16 | 256 | 1 | 10 | 640 |
| 32 | 1024 | 1 | 10 | 2560 |
| 64 | 4096 | 3 | 10 | 61440 |
| TOTAL | | | | 64840 (≒7.9KB) |

→ SUBMATRIX OF DST1
↗ UPPER LEFT SUBMATRIX OF DST1/DCT2/DST7/DST4

B

| TRANSFORM SIZE N | NUMBER OF ELEMENTS | TYPE OF UNIQUE TRANSFORM MATRIX | BIT PRECISION bit | LUT SIZE bits |
|---|---|---|---|---|
| 4 | 16 | 6 | 10 | 960 |
| 8 | 64 | 6 | 10 | 3840 |
| 16 | 256 | 6 | 10 | 15360 |
| 32 | 1024 | 6 | 10 | 61440 |
| 64 | 4096 | 6 | 10 | 245760 |
| TOTAL | | | | 327360 bits (≒40KB) |

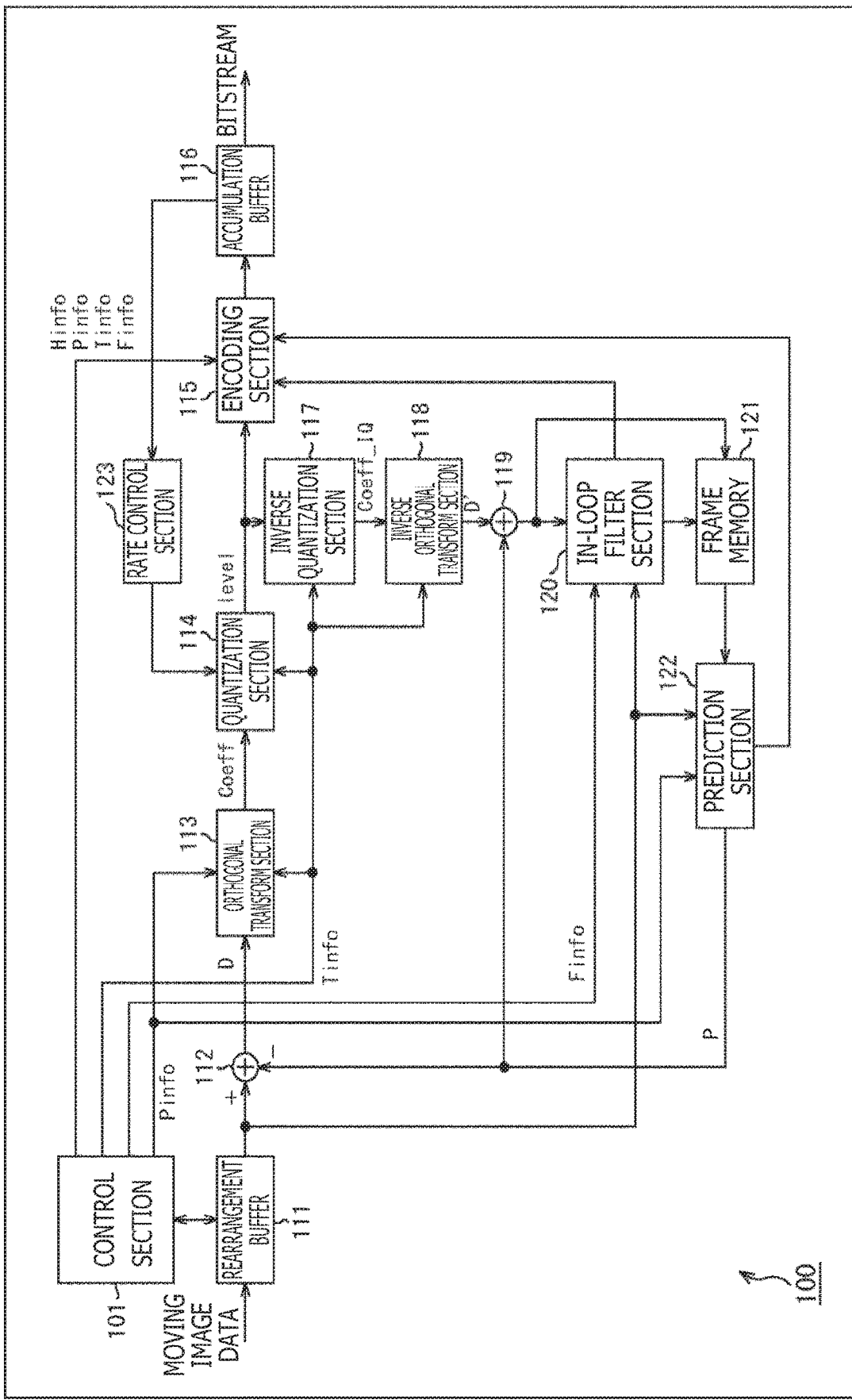
F I G. 27

F I G. 43

F I G . 4 5

A

| TrTypeIdx | TRANSFORM TYPE TrType | BASE TRANSFORM MATRIX C | DERIVATION TRANSFORM MATRIX T | DERIVATION METHOD OF N×N TRANSFORM MATRIX T CORRESPONDING TO TRANSFORM TYPE TrType FROM BASE SUBMATRIX |
|---|---|---|---|---|
| 0 | DCT2 | transMatrix$_{maxTbS,DCT2}$ | transMatrix$_{nTbS,DCT2}$ | DERIVED BY EQUATION (X1) |
| 1 | DCT4 | transMatrix$_{maxTbS,DCT2}$ | transMatrix$_{nTbS,DCT4}$ | DERIVED BY EQUATION (X2) |
| 2 | DST4 | transMatrix$_{maxTbS,DCT2}$ | transMatrix$_{nTbS,DST4}$ | DERIVED BY EQUATION (X4) OR EQUATION (X6) |
| 3 | DST2 | transMatrix$_{maxTbS,DCT2}$ | transMatrix$_{nTbS,DST2}$ | DERIVED BY EQUATION (X5) |

B

| TrTypeIdx | TRANSFORM TYPE TrType | BASE TRANSFORM MATRIX C | DERIVATION TRANSFORM MATRIX T | DERIVATION METHOD OF N×N TRANSFORM MATRIX T CORRESPONDING TO TRANSFORM TYPE TrType FROM BASE SUBMATRIX |
|---|---|---|---|---|
| 0 | DCT2 | transMatrix$_{maxTbS,DCT2}$ | transMatrix$_{nTbS,DCT2}$ | DERIVED BY EQUATION (X1) |
| 1 | DCT4 | transMatrix$_{maxTbS,DCT2}$ | transMatrix$_{nTbS,DCT4}$ | DERIVED BY EQUATION (X2) |
| 2 | FlipDCT4 | transMatrix$_{maxTbS,DCT2}$ | transMatrix$_{nTbS,FlipDCT4}$ | DERIVED BY EQUATION (X3) |
| 3 | DST2 | transMatrix$_{maxTbS,DCT2}$ | transMatrix$_{nTbS,DST2}$ | DERIVED BY EQUATION (X5) |

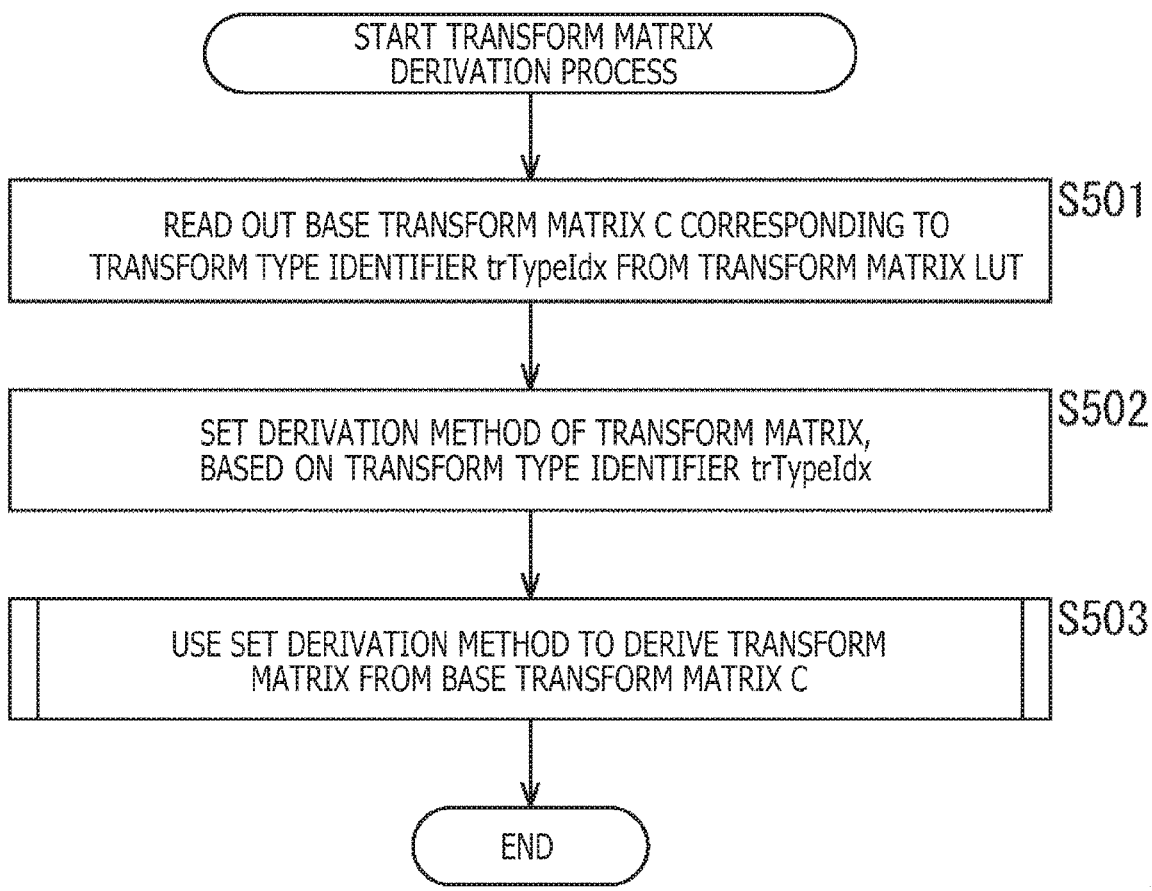

FIG. 49

A — 16×16 DCT2 TRANSFORM MATRIX

B — MATRIX ELEMENTS ARE USED TO OBTAIN 8×8 DCT2 TRANSFORM MATRIX

C — MATRIX ELEMENTS ARE USED TO OBTAIN 4×4 DCT2 TRANSFORM MATRIX

D transMatrix$_{DCT2,nTbS}$[ j ][ i ] = transMatrix$_{DCT2,maxTbS}$[ j * stepsize + offsetCol ][ i + offsetRow ] = transMatrix$_{DCT2,maxTbS}$[ j * stepsize j [ i ]   ... (X1)
stepsizeCol = 1 << ( (log2(maxTbS) − log2(nTbS) )
offsetCol = offsetRow = 0

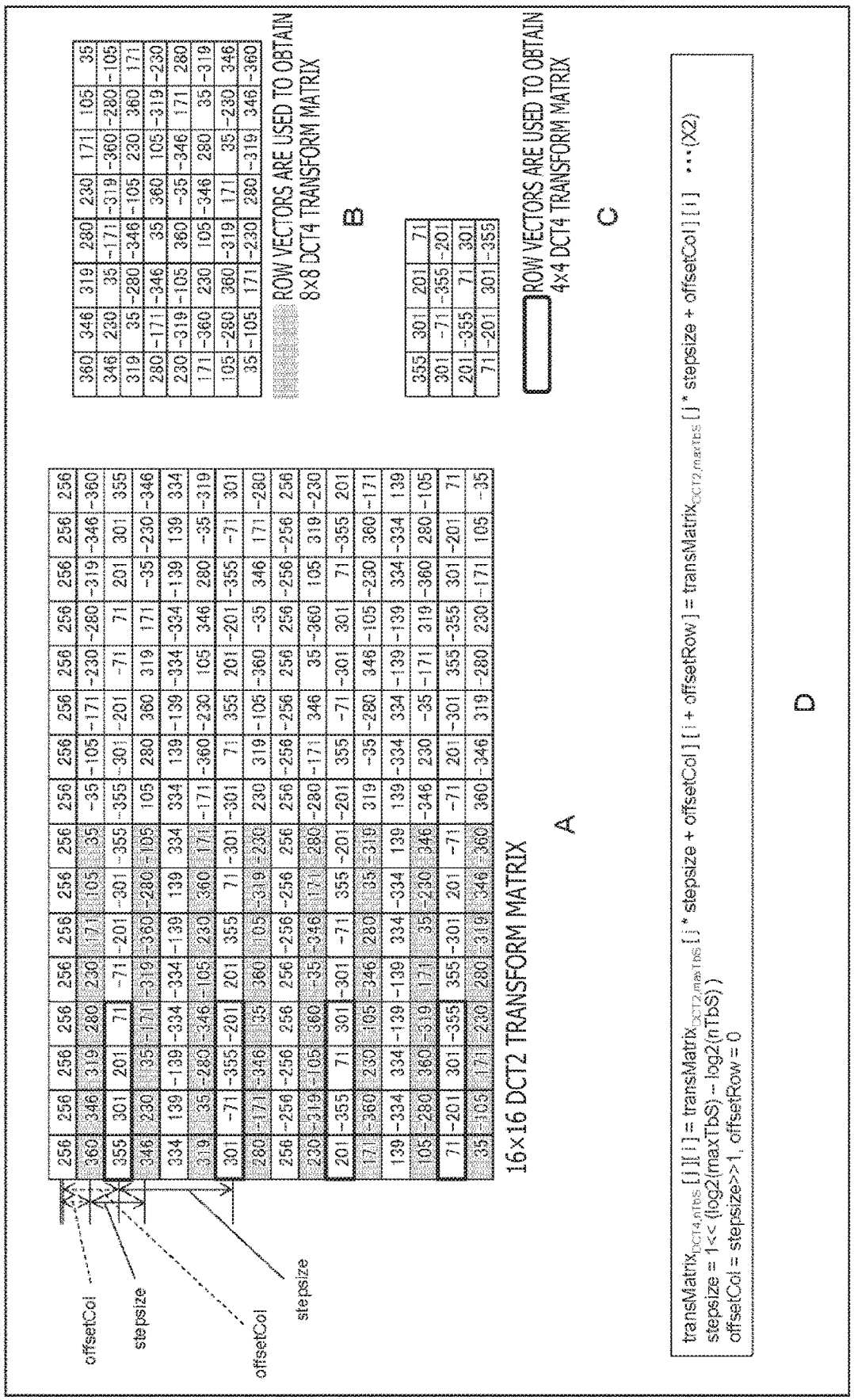

FIG. 51

A — 16×16 DCT2 TRANSFORM MATRIX

B — 8×8 FlipDCT4 TRANSFORM MATRIX (ROW VECTORS ARE FLIPPED IN HORIZONTAL DIRECTION TO OBTAIN 8×8 FlipDCT4 TRANSFORM MATRIX)

C — 4×4 FlipDCT4 TRANSFORM MATRIX (ROW VECTORS ARE FLIPPED IN HORIZONTAL DIRECTION TO OBTAIN 4×4 FlipDCT4 TRANSFORM MATRIX)

D

$$\text{transMatrix}_{\text{FlipDCT4},n\text{TbS}}[j][i] = \text{transMatrix}_{\text{DCT2},\text{maxTbS}}[j \ast \text{stepsize} + \text{offsetCol}][n\text{TbS} - 1 - i + \text{offsetRow}]$$
$$= \text{transMatrix}_{\text{DCT2},\text{maxTbS}}[j \ast \text{stepsize} + \text{offsetCol}][n\text{TbS} - 1 - i] \quad \cdots (X3)$$

$$\text{stepsize} = 1 << (\log2(\text{maxTbS}) - \log2(n\text{TbS}))$$
$$\text{offsetCol} = \text{stepsize} >> 1, \text{offsetRow} = 0$$

F I G. 5 2

A: 16×16 DCT2 TRANSFORM MATRIX

B: ROW VECTORS ARE FLIPPED IN HORIZONTAL DIRECTION, AND SIGNS OF ODD ROWS ARE INVERTED, TO OBTAIN 8×8 DST4 TRANSFORM MATRIX

C: ROW VECTORS ARE FLIPPED IN HORIZONTAL DIRECTION, AND SIGNS OF ODD ROWS ARE INVERTED, TO OBTAIN 4×4 DST4 TRANSFORM MATRIX

D:
$$\text{transMatrix}_{DST4,nTbS}[j][i] = \text{sign} * \text{transMatrix}_{DCT2,maxTbS}[j * \text{stepsize} + \text{offsetCol}][nTbS - 1 - i + \text{offsetRow}]$$
$$= \text{sign} * \text{transMatrix}_{DCT2,maxTbS}[j * \text{stepsize} + \text{offsetCol}][nTbS - 1 - i] \quad \cdots (X4)$$
$$\text{stepsize} = 1 << (\log2(\text{maxTbS}) - \log2(nTbS))$$
offsetCol = stepsize >> 1, offsetRow = 0
sign = (i%2==0) ? 1 : -1

FIG. 53

EXAMPLE OF 16×16 DCT2 TRANSFORM MATRIX

A

COLUMN VECTORS ARE FLIPPED IN VERTICAL DIRECTION, AND SIGNS OF ODD COLUMNS ARE INVERTED, TO OBTAIN 8×8 DST2 TRANSFORM MATRIX IN EXAMPLE

B

COLUMN VECTORS ARE FLIPPED IN VERTICAL DIRECTION, AND SIGNS OF ODD COLUMNS ARE INVERTED, TO OBTAIN 4×4 DST2 TRANSFORM MATRIX IN EXAMPLE

C transMatrix$_{DST2,nTbS}$[ ][ i ][ j ] = sign * transMatrix$_{DCT2,maxTbS}$( nTbS − 1 − j ) * stepsize + offsetCol ][ i + offsetRow ]
= sign * transMatrix$_{DCT2,maxTbS}$( nTbS − 1 − j ) * stepsize ][ i ]

stepsize = 1 << (log2(maxTbS) − log2(nTbS))
offsetCol = offsetRow = 0
sign = (j%2==0) ? 1 : −1 ...(X5)

D

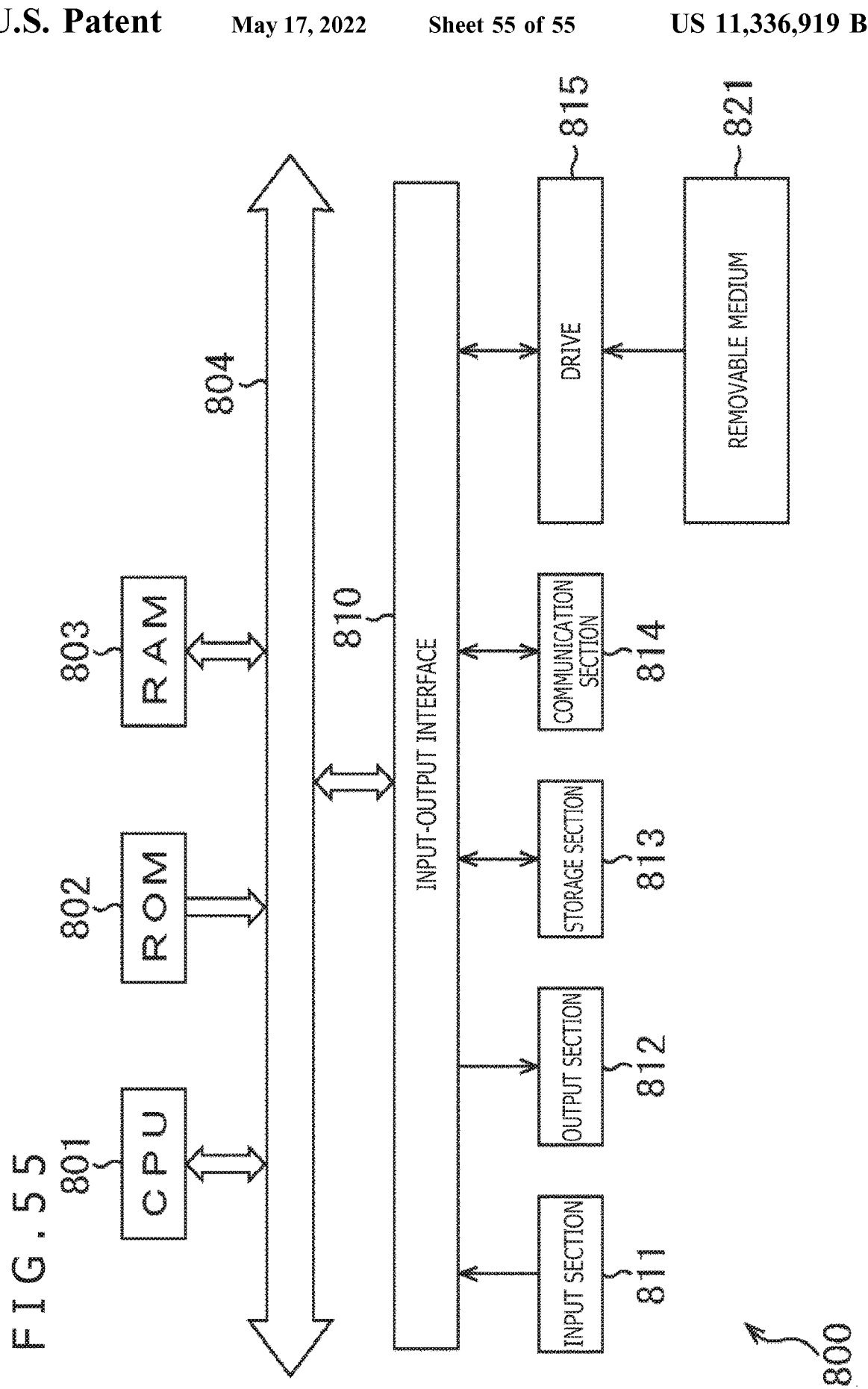

IMAGE PROCESSING APPARATUS AND METHOD

CROSS REFERENCE TO PRIOR APPLICATION

This application is a National Stage Patent Application of PCT International Patent Application No. PCT/JP2019/011049 (filed on Mar. 18, 2019) under 35 U.S.C. § 371, which claims priority to Japanese Patent Application Nos. 2018-067808 (filed on Mar. 30, 2018) and 2018-124008 (filed on Jun. 29, 2018), which are all hereby incorporated by reference in their entirety.

TECHNICAL FIELD

The present disclosure relates to an image processing apparatus and a method, and particularly, to an image processing apparatus and method that can suppress an increase in the memory capacity necessary for an orthogonal transform and an inverse orthogonal transform.

BACKGROUND ART

Conventionally, disclosed are adaptive primary transforms (AMT: Adaptive Multiple Core Transforms) in which a primary transform is adaptively selected from plural different orthogonal transforms for each primary transform PThor in a horizontal direction (also referred to as a primary horizontal transform) and each primary transform PTver in a vertical direction (also referred to as a primary vertical transform) in each unit of TU (Transform Unit) in relation to the luminance (for example, see NPL 1).

In NPL 1, candidates for the primary transforms include five one-dimensional orthogonal transforms including DCT-II, DST-VII, DCT-VIII, DST-I, and DST-VII. It is also proposed that two one-dimensional orthogonal transforms including DST-IV and IDT (Identity Transform: one-dimensional transform skip) are further added and that a total of seven one-dimensional orthogonal transforms are set as candidates for the primary transforms (for example, see NPL 2).

CITATION LIST

Patent Literature

[NPL 1]
Jianle Chen, Elena Alshina, Gary J. Sullivan, Jens-Rainer, Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017
[NPL 2]
V. Lorcy, P. Philippe, "Proposed improvements to the Adaptive multiple Core transform", JVET-O0022, Joint Video Exploration Team (JVET) of ITU-T SG 16 WP 3 and ISO/IEC JIG 1/SC 29/WG 11 3rd Meeting: Geneva, CH, 26 May-1 Jun. 2016

SUMMARY

Technical Problems

However, the size of an LUT (Look Up Table) required for holding all the transform matrices of the primary transforms may increase in the cases of the methods. That is, considering the hardware implementation of the primary transforms, the memory size required for holding the coefficients of the transform matrices may increase.

The present disclosure has been made in view of the circumstances, and the present disclosure can suppress an increase in the memory capacity necessary for an orthogonal transform and an inverse orthogonal transform.

Solution to Problems

An aspect of the present technique provides an image processing apparatus including a decoding section that decodes a bitstream to generate coefficient data in which a predicted residual of an image is orthogonally transformed, a derivation section that derives, from a submatrix as part of a first transform matrix in a first size, a second transform matrix in a second size that is a size smaller than the first size, and as inverse orthogonal transform section that uses the second transform matrix derived by the derivation section, to apply an inverse orthogonal transform to the coefficient data generated by the decoding section.

The derivation section derives, as the submatrix, a matrix obtained by sampling matrix elements of the first transform matrix.

An aspect of the present technique provides an image processing method including decoding a bitstream to generate coefficient data in which a predicted residual of an image is orthogonally transformed, deriving, from a submatrix as part of a first transform matrix in a first size, a second transform matrix in a second size that is a size smaller than the first size, and using the derived second transform matrix to apply an inverse orthogonal transform to the generated coefficient data.

An aspect of the present technique provides an image processing apparatus including a derivation section that derives, from a submatrix as part of a first transform matrix in a first size, a second transform matrix in a second size that is a size smaller than the first size, an orthogonal transform section that uses the second transform matrix derived by the derivation section, to orthogonally transform a predicted residual of an image and generate coefficient data, and as encoding section that encodes the coefficient data generated by the orthogonal transform section, to generate a bitstream.

The derivation section derives, as the submatrix, a matrix obtained by sampling matrix elements of the first transform matrix.

An aspect of the present technique provides as image processing method including deriving, from a submatrix as part of a first transform matrix in a first size, a second transform matrix in a second size that is a size smaller than the first size, using the derived second transform matrix to orthogonally transform a predicted residual of an image and generate coefficient data, and encoding the generated coefficient data to generate a bitstream.

Advantageous Effects of Invention

According to the present disclosure, an image can be processed. Particularly, an increase in the memory capacity necessary for an orthogonal transform and an inverse orthogonal transform can be suppressed. Note that the abovementioned advantageous effects are not necessarily limitative, and any of the advantageous effects illustrated in the present specification or other advantageous effects that can be understood from the present specification may be obtained in addition to the abovementioned advantageous effects or in place of the abovementioned advantageous effects.

BRIEF DESCRIPTION OF DRAWINGS

FIG. 1 is a diagram illustrating a correspondence between transform sets and orthogonal transforms to be selected.

FIG. 2 is a diagram illustrating a correspondence between types of orthogonal transforms and functions to be used.

FIG. 3 is a diagram illustrating a correspondence between transform sets and prediction modes.

FIG. 5 is a diagram illustrating an example of LUT sizes required for holding transform matrices in HEVC.

FIG. 6 is a diagram illustrating an example of LUT sizes required for holding transform matrices.

FIG. 7 is a diagram illustrating an example in which basis functions of orthogonal transforms are scaled and approximated to integers.

FIG. 16 is a diagram illustrating an overview of operations and derivation formulas for base transform matrices.

FIG. 17 is a diagram illustrating an overview of operations and derivation formulas for base transform matrices.

FIG. 23 is a diagram illustrating an overview of a derivation method of transform matrices corresponding to transform types.

FIG. 25 is a diagram illustrating an example of LUT sizes required for holding transform matrices.

FIG. 27 is a block diagram illustrating a main configuration example of an image encoding apparatus.

FIG. 43 is a diagram illustrating an overview of operations and derivation formulas for base transform matrices.

FIG. 45 is a block diagram illustrating a main configuration example of a transform matrix derivation apparatus.

FIG. 46 is a flowchart describing an example of a flow of a transform matrix derivation process.

FIG. 49 is a diagram describing an example of a situation of transform matrix derivation in a case where the transform type is DCT2.

FIG. 50 is a diagram describing an example of a situation of transform matrix derivation in a case where the transform type is DCT4.

FIG. 51 is a diagram describing an example of situation of transform matrix derivation in a case where the transform type is FlipDCT4.

FIG. 52 is a diagram describing an example of a situation of transform matrix derivation in a case where the transform type is DST4.

FIG. 53 is a diagram describing an example of situation of transform matrix derivation in a case where the transform type is DST2.

FIG. 55 is a block diagram illustrating a main configuration example of a computer.

DESCRIPTION OF EMBODIMENTS

Figure 4:
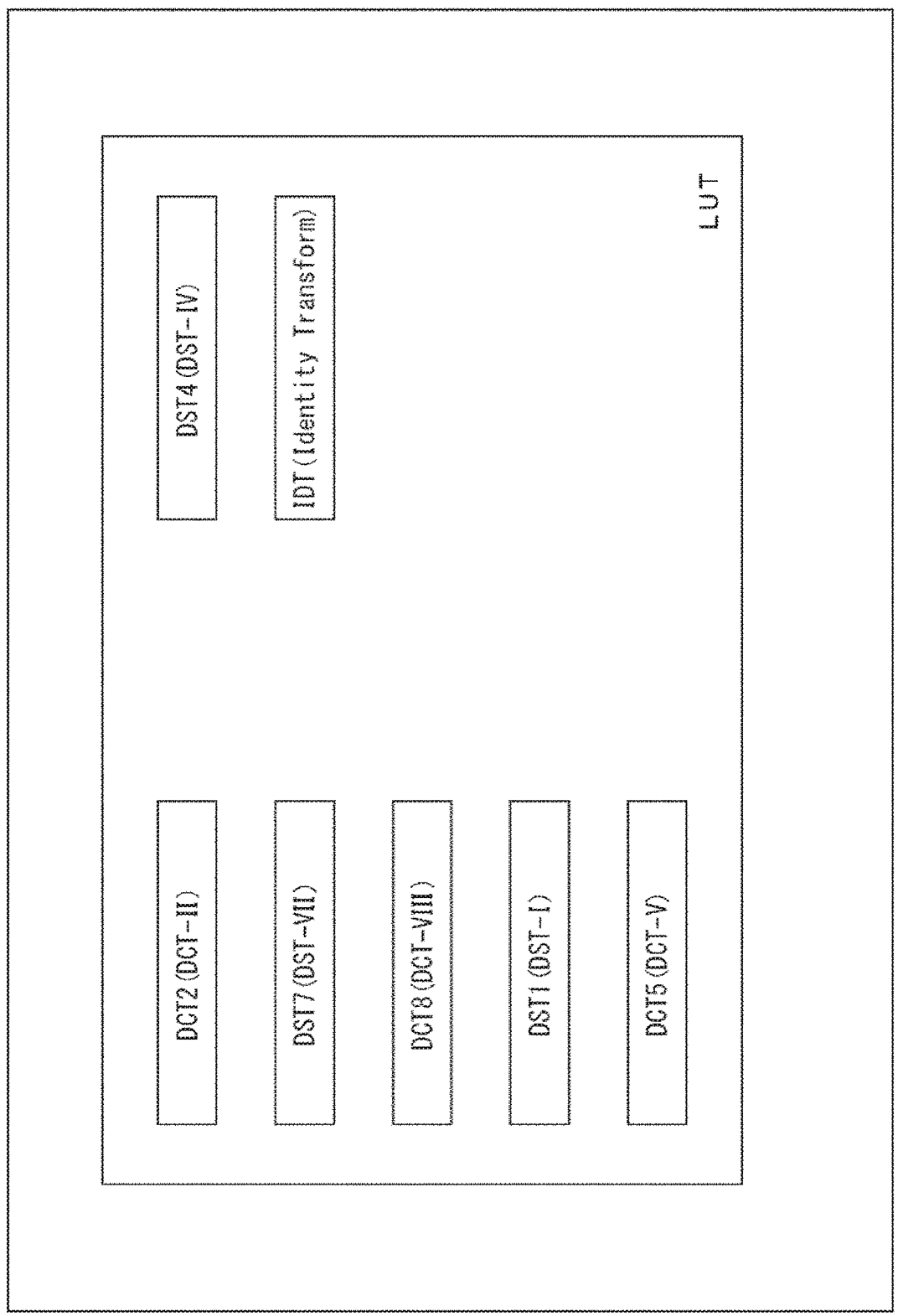
FIG. 4 is a diagram illustrating an example of types of orthogonal transforms stored in an LUT.

Hereinafter, modes for carrying out the present disclosure (hereinafter, referred to as embodiments) will be described. Note that the embodiments will be described in the following order.

1. Literature etc. Supporting Technical Content and Technical Terms

2. Adaptive Primary Transform

3. Viewpoints of Concept
4. Concept
5. Transform Matrix Derivation Section
6. Advantageous Effect
7. Sharing of Process and Implementation Cost
8. Embodiment in Encoding and Orthogonal Transform
9. Embodiment in Decoding and inverse Orthogonal Transform
10. Embodiment in Primary Transform
11. Embodiment in Inverse Primary Transform
12. Derivation of Transform Matrix
13. Note <1. Literature etc. Supporting Technical Content and Technical Terms>

The scope disclosed by the present technique includes not only the contents described in the embodiments but also the contents described in the following pieces of NPL publicly known at the time of the application.

NPL 1: (described above)

NPL 3: TELECOMMUNICATION STANDARDIZATION SECTOR OF ITU (International Telecommunication Union), "Advanced video coding for generic audiovisual services", H.264, 04/2017

NPL 4: TELECOMMUNICATION STANDARDIZATION SECTOR OF ITU (International Telecommunication Union), "High efficiency video coding", H.265, 12/2016

That is, the contents described in the abovementioned pieces of NPL also serve as a basis for determining the support requirements. For example, even in a case where the Quad-Tree Block Structure described in NPL 4 or the QTBT (Quad Tree Plus Binary Tree) Block Structure described in NPL 1 is not directly described in the embodiments, they are within the disclosed scope of the present technique, and the support requirements of the claims are satisfied. Moreover, even in a case where, for example, technical terms, such as parse (Parsing), syntax. (Syntax), and semantics (Semantics), are not directly described in the embodiments, they are similarly within the disclosed scope of the present technique, and the support requirements of the claims are satisfied.

Further, in the present specification, a "block" (not a block indicating a processing section) used for describing a partial region or a section of processing of an image (picture) indicates any partial region in the picture unless otherwise stated, and the dimension, the shape, the characteristics, and the like of the "block" are not limited. For example, the "block" includes any partial region (unit of processing), such as TB (Transform Block), TU (Transform Unit), PB (Prediction Block), PU (Prediction Unit), SCU (Smallest Coding Unit), CU (Coding Unit), LCU (Largest Coding Unit), CTB (Coding Tree Block), CTU (Coding Tree Unit), transform block, sub-block, macroblock, tile, and slice, described in NPL 1, NPL 3, and NPL 4.

In addition, encoding in the present specification includes not only the entire process of transforming an image into a bitstream but also part of the process. For example, the encoding includes not only a process including a prediction process, an orthogonal transform, quantization, arithmetic coding, and the like but also a process representing the quantization and the arithmetic coding as a whole, a process including the prediction process, the quantization, and the arithmetic coding, and the like. Similarly, decoding includes not, only the entire process of transforming a bitstream into an image but also part of the process. For example, the decoding includes not only a process including inverse arithmetic decoding, inverse quantization, an inverse orthogonal transform, a prediction process, and the like but also a process including the inverse arithmetic decoding and the inverse quantization, a process including the inverse arithmetic coding, the inverse quantization, and the prediction process, and the like.

<2. Adaptive Primary Transform>

In a test model (JEM4 (Joint Exploration Test Model 4)) described in NPL 1, disclosed are adaptive primary transforms (AMT (Adaptive Multiple Core Transforms)) in which a primary transform is adaptively selected from plural different one-dimensional orthogonal transforms for each primary transform PThor in a horizontal direction (also referred to as a primary horizontal transform) and each primary transform PTver in a vertical direction (also referred to as a primary vertical transform) in relation to a transform block of luminance.

Specifically, in a case where an adaptive primary transform flag apt_flag indicating whether or not to carry out the adaptive primary transform is 0 (false) in relation to the transform block of luminance, DCT (Discrete Cosine Transform)-II or DST (Discrete Sine Transform)-VII is uniquely determined (TrSetIdx=4) as a primary transform, based on mode information, as illustrated, for example, in a table (LUT_TrSetToTrTypeIdx) of FIG. 1.

In a case where the adaptive primary transform flag apt_flag is 1 (true) and the current CU (Coding Unit) including the transform block of luminance to be processed is an intra CU, a transform set TrSet including orthogonal transforms as candidates for the primary transform in each of the horizontal direction (x direction) and the vertical direction (y direction) is selected from three transform sets TrSet (TrSetIdx=0,1,2) illustrated in FIG. 1, as in the table illustrated in FIG. 1. Note that, DST-VII, DCT-VIII, and the like illustrated in FIG. 1 indicate types of orthogonal transforms, and functions as illustrated in a table of FIG. 2 are used in each.

The transform set TrSet is uniquely determined based on a correspondence table (intra prediction mode information of the correspondence table) of mode information and transform sets illustrated in FIG. 3. For example, as in the following Equation (1) and Equation (2), a transform set identifier TrSetIdx for designating the corresponding transform set TrSet is set for each transform set TrSetH and TrSetV.

[Math. 1]

$$TrSetH=LUT\_IntraModeToTrSet[IntraMode][0] \quad (1)$$

$$TrSetV=LUT\_IntraModeToTrSet[IntraMode][1] \quad (2)$$

Here, TrSetH denotes a transform set of the primary horizontal transform PThor, and TrSetV denotes a transform set of the primary vertical transform PTver. A lookup table LUT_IntraModeToTrSet is the correspondence table of FIG. 3. An intra prediction mode IntraMode is an argument of a first array in the lookup table LUT_IntraModeToTrSet[ ][ ], and {H=0, V=1} are arguments of a second array.

For example, in a case of an intra prediction mode number 19 (IntraMode==19), a transform set with a transform set identifier TrSetIdx=0 indicated in the table of FIG. 1 is selected as the transform set TrSetH (also referred to as a primary horizontal transform set) of the primary horizontal transform PThor, and a transform set with a transform set identifier TrSetIdx=2 indicated in the table of FIG. 1 is selected as the transform set TrSetV (also referred to as a primary vertical transform set) of the primary vertical transform saver.

Note that, in the case where the adaptive primary transform flag apt_flag is 1 (true) and the current CU including the transform block of luminance to be processed is an inter CU, a transform set InterTrSet (TrSetIdx=3) dedicated to the inter CU is allocated to the transform set TrSetH of the primary horizontal transform and the transform set TrSetV of the primary vertical transform.

Next, for each of the horizontal direction and the vertical direction, which orthogonal transform is the selected transform set TrSet is to be applied is selected according to the corresponding one of a primary horizontal transform designation flag_pt_hor_flag and a primary vertical transform designation flag_pt_ver_flag.

For example, as in the following Equations (3) and (4), a primary {horizontal, vertical} transform set TrSet{H,V} and a primary {horizontal, vertical} transform designation flag pt_{hor, ver}_flag are set as arguments for derivation from the definition table (LUT_TrSetToTrTypeIdx) of the transform sets illustrated in FIG. 1.

[Math. 2]

$$TrTypeIdxH=LUT\_TrSetToTrTypeIdx[TrSetH][pt\_hor\_flag] \quad (3)$$

$$TrTypeIdxV=LUT\_TrSetToTrTypeIdx[TrSetV][pt\_ver\_flag] \quad (4)$$

For example, in a case of an intra prediction mode number 34 (IntraMode==34) (that is, the primary horizontal transform set TraSetH is 0) and a primary horizontal transform designation flag pt_hor_flag of 0, the value of the transform type identifier TrTypeIdxH of Equation (3) is four with reference to the transform set definition table (LUT_TrSetToTrTypeIdx) of FIG. 1, and the transform type TrTypeH corresponding to the value of the transform type identifier TrTypeIdxH is DST-VII with reference to FIG. 2. That is, DST-VII of the transform set with the transform set identifier TrSetIdx of 0 is selected as the transform type of the primary horizontal transform PThor. Moreover, in a case where the primary horizontal transform designation flag pt_hor_flag is 1, DCT-VIII is selected as the transform type. Note that selecting the transform type TrType includes using the transform type identifier TrTypeIdx to select the transform type designated by the transform type identifier TrTypeIdx.

Note that a primary transform identifier pt_idx is derived from the primary horizontal transform designation flag pt_hor_flag and the primary vertical transform designation flag pt_ver_flag, based on the following Equation (5). That is, an upper 1 bit of the primary transform identifier pt_idx corresponds to the value of the primary vertical transform designation flag, and a lower 1 bit corresponds to the value of the primary horizontal transform designation flag.

[Math. 3]

$$pt\_idx=(pt\_ver\_flag<<1)+pt\_hor\_flag \quad (5)$$

Arithmetic coding is applied to a bin string of the derived primary transform identifier pt_idx to generate a bit string and thereby carry out the encoding. Note that the adaptive primary transform flag apt_flag and the primary transform identifier pt_idx are signaled in the transform block of luminance.

In this way, five one-dimensional orthogonal transforms including DCT-II (DCT2), DST-VII (DST7), DCT-VIII (DCT8), DST-I (DST1), and DCT-V (DCT5) are proposed as the candidates for the primary transform in NPL 1. In addition, two one-dimensional orthogonal transforms including DST-IV (DST4) and IDI (identity Transform: one-dimensional transform skip) are further added to them in NPL 2, and a total of seven one-dimensional orthogonal transforms are proposed as the candidates for the primary transform.

That is, in the case of NPL 1, one-dimensional orthogonal transforms are stored as candidates for the primary transform in the LUT as illustrated in FIG. 4. Moreover, in the case of NPL 2, DST-IV (DST4) and IDT are further stored in the LUT in addition to them (see FIG. 4).

In a case of HEVC (High Efficiency Video Coding), the size of an LUT (Look UpTable: lookup table) necessary for holding the transform matrix is as in a table illustrated in FIG. 5. That is, the size of the LUT is approximately 1.3 KB in total. On the other hand, is the case of the method described in NPL 1, transform matrices for each size of 2/4/8/16/32/64/128 points need to be held on the LUT in DCT2, for example. In addition, transform matrices for each size of 4/8/16/32/64 points need to be held on the LUT is the other one-dimensional transforms (DST7/DST1/DCT8). In this case, assuming that the bit precision of each coefficient of the transform matrices is 10 bits, the size of the LUT necessary for holding the entire transform matrices of the primary transforms are as illustrated in A of FIG. 6. That is, the size of the LUT in this case is approximately 53 KB in total. In other words, the size of the LUT in this case increases approximately 50 times the case of the HEVC.

Similarly, in the case of the method described in NPL 2, the size of the LUT required for holding all the transform matrices of the primary transforms is as in a table illustrated in B of FIG. 6. That is, the size of the LUT in this case is approximately 67 KB in total. In other words, the size of the LUT in this case increases to approximately 60 times the case of the HEVC.

Considering the hardware implementation of the primary transforms, the size of the LUT is reflected on the storage capacity (memory capacity). That is, in the cases of the methods described in NPL 1 and NPL 2, the circuit scale (memory capacity necessary for holding the coefficients of the transform matrices) may increase to approximately 50 times to 60 times the case of the HEVC.

<3. Viewpoints of Concept>

In the case of NPL 1 or NPL 2, the transform matrix of the one-dimensional orthogonal transform, such as DCT2/DST7 of $2^N$-pt, is obtained by scaling a basis function of the one-dimensional orthogonal transform by $2^{(const.+\log 2(N)/2)}$ and calculating an integer approximation as illustrated in FIG. 7. The present disclosure focuses on the similarity between a submatrix of the integer-approximated transform matrix of the orthogonal transform of $2^N$-pt and a transform matrix of the integer-approximated orthogonal transform of the orthogonal transform of $2^{(N-1)}$-pt, to derive a small-sized transform matrix from a large-sized transform matrix and thereby reduce the LUT size.

One of the main roles of the transform matrix is to bias a signal of low-order (particularly, 0th-order) frequency components toward a direction of DC components, and the method of collecting the frequency components is an important characteristic. Waveform components of a low-order (particularly, 0th-order) basis vector (row vector) are important in how to bias the frequency components. That is, similar performance in relation to an orthogonal transform and an inverse orthogonal transform can be expected from transform matrices with similar tendency in the waveform components of the basis vectors (methods of biasing the frequency components are similar).

Therefore, focus is placed on the resemblance of a waveform of a low-order (particularly, 0th-order and first-order) basis vector (row vector) of the transform matrix in a first size (2N) and a low-order (particularly, 0th-order) waveform of the transform matrix in a second size (N) that is ½ the first size.

Hereinafter, the shapes of waveforms may be referred to as a flat type, a decrease type, an increase type, a mountain type, and a point-symmetry type.

The flat type is a type of waveform in which the values are substantially uniform in the frequency components. Note that, in the case of the flat type, the waveform does not have to be strictly flat as long as the values are substantially uniform as a whole. That is, there may be some variations in value. In other words, a type that cannot be classified into the other four types may be set as the flat type.

The increase type is a type of waveform in which the value tends to increase from low-frequency components to high-frequency components. Note that, in the case of the increase type, the waveform is not required to strictly monotonically increase from the lower-frequency side to the higher-frequency side as long as the value tends to increase from the lower-frequency side to the higher-frequency side as a whole.

The decrease type is a type of waveform in which the value tends to decrease from low-frequency components to high-frequency components. Note that, in the case of the decrease type, the waveform is not required to strictly monotonically decrease from the lower-frequency side to the higher-frequency side as long as the value tends to decrease from the lower-frequency side to the higher-frequency side as a whole.

The mountain type is a type of waveform that tends to have a peak (maximum value) in the middle. That is, in the case of the mountain type, the value of the waveform tends to decrease toward the low-frequency components on the lower-frequency component side, and the value tends to decrease toward the high-frequency components on the higher-frequency component side. Note that in the case of the mountain type, the value does not have to monotonically decrease in the directions away from the peak on both sides of the peak as long as the waveform has the peak (maximum value) near the center, as a whole, and the value tends to decrease in the directions away from the peak on both sides of the peak. In addition, the peak may not be formed by one component, and, for example, approximate location and value of the peak may be specified from a plurality of components. In addition, the location of the peak may not be strictly the center.

The point-symmetry type is a type of waveform that tends to have a waveform with positive values from low-frequency components to medium-frequency components and a waveform in the same shape with an opposite sign from the medium-frequency components to high-frequency components, and the value tends to be zero near the center. Note that the point-symmetry type may have a shape with negative values from the low region to the medium region and a waveform in the same shape with an opposite sign from the medium region to the high region.

Figure 8:
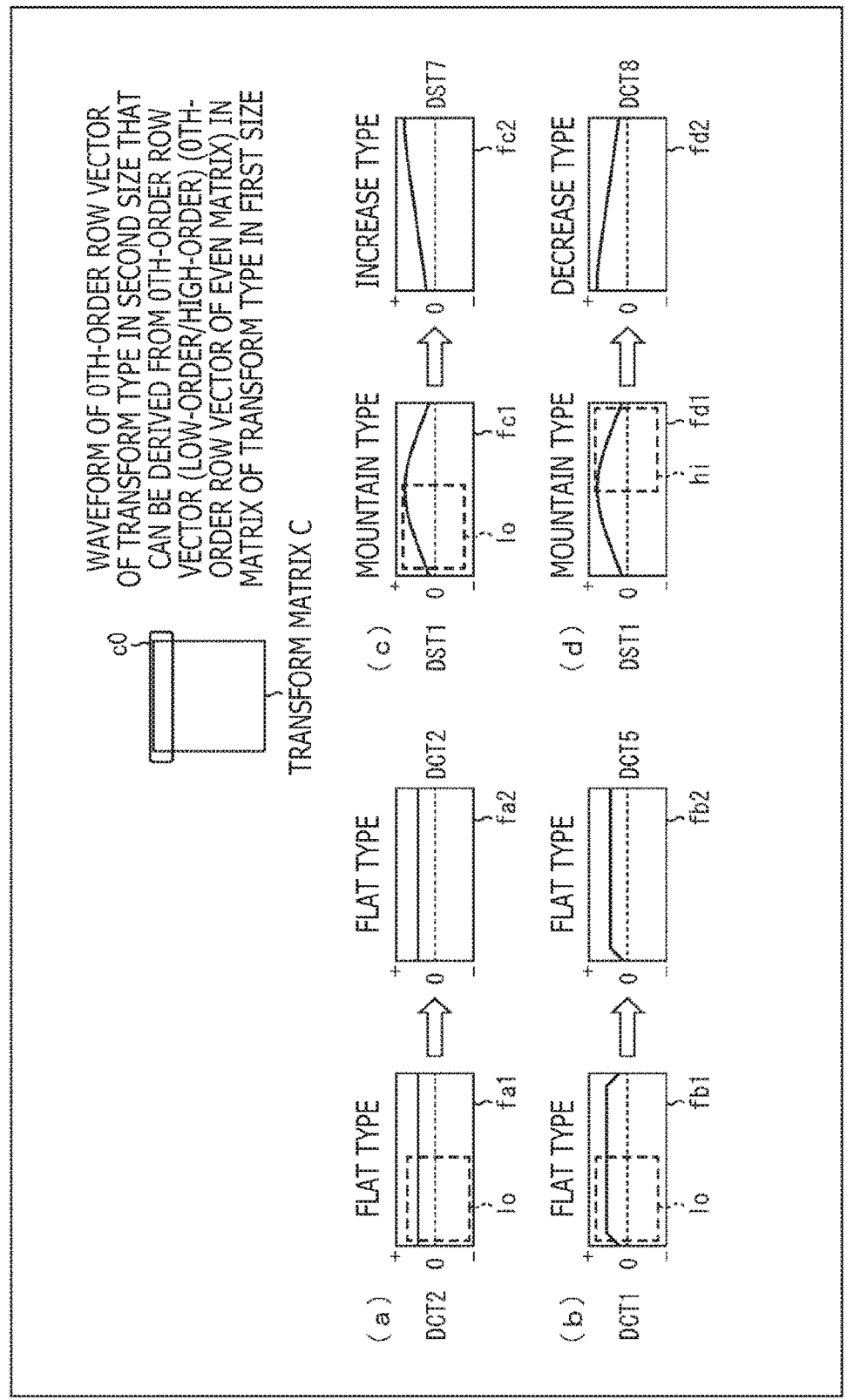
FIG. 8 is a diagram describing an example of similarity between transform matrices.
Figure 9:
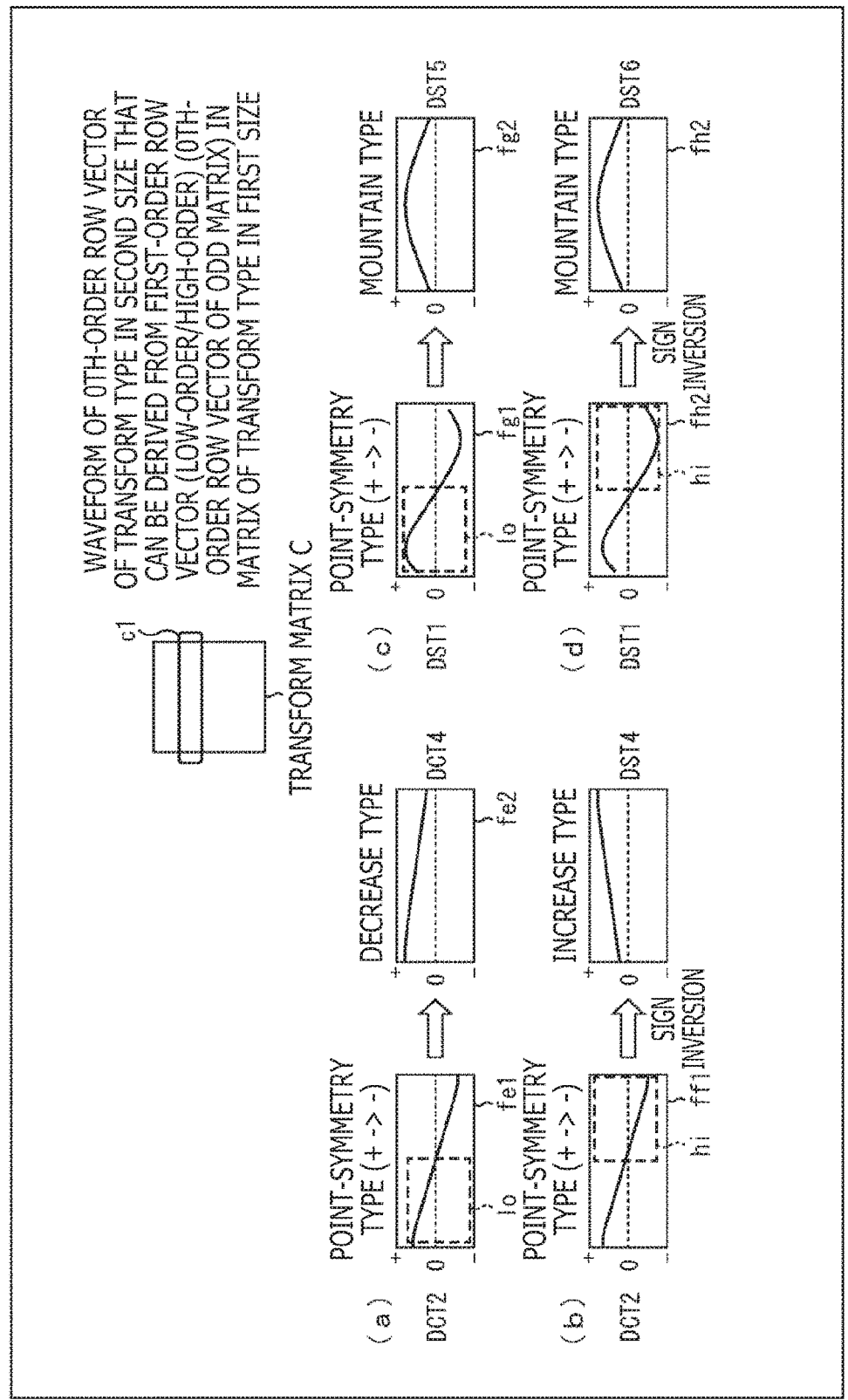
FIG. 9 is a diagram describing an example of similarity between transform matrices.
Figure 10:
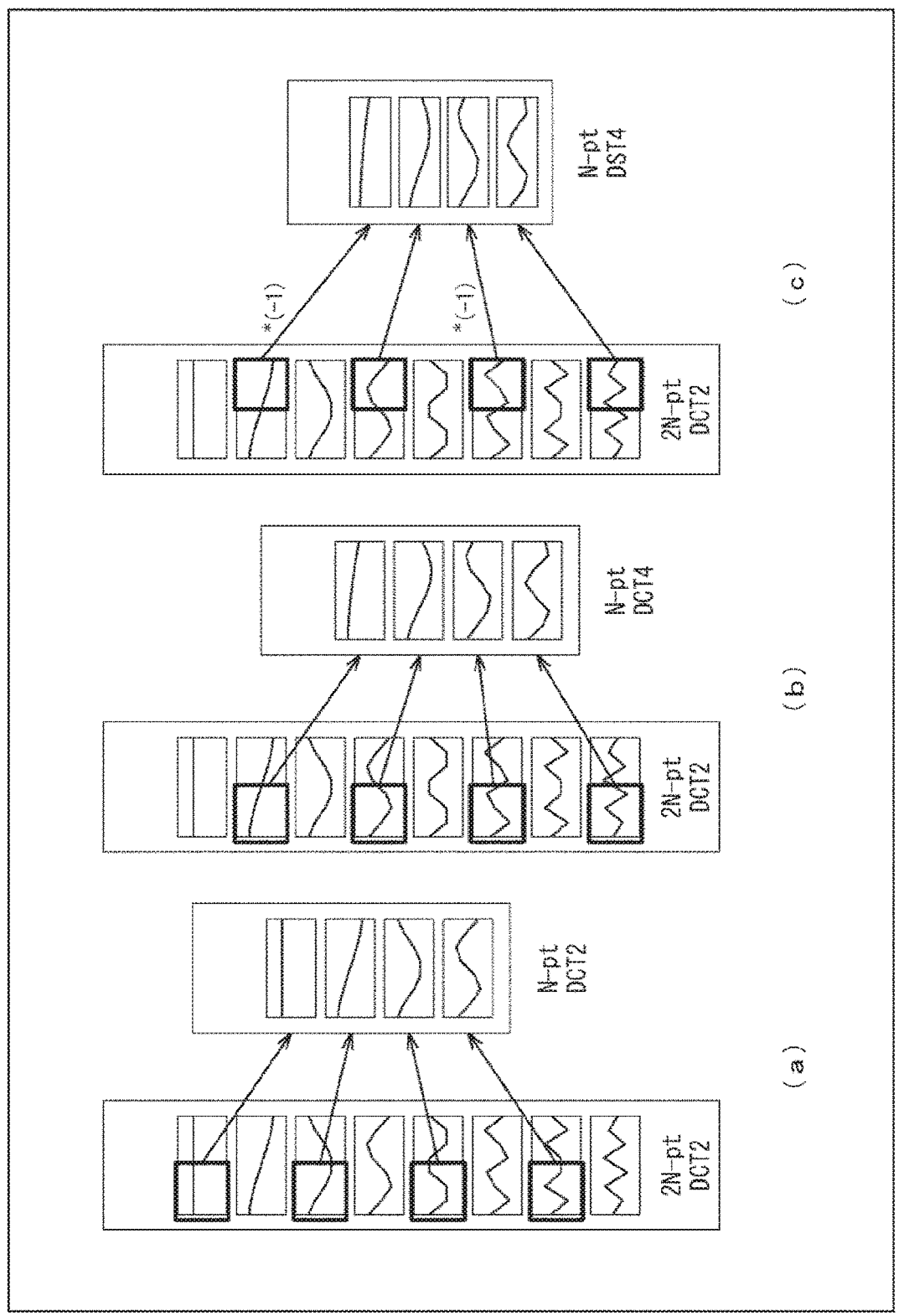
FIG. 10 is a specific example illustrating similarity between basis vectors of transform matrices.
Figure 11:
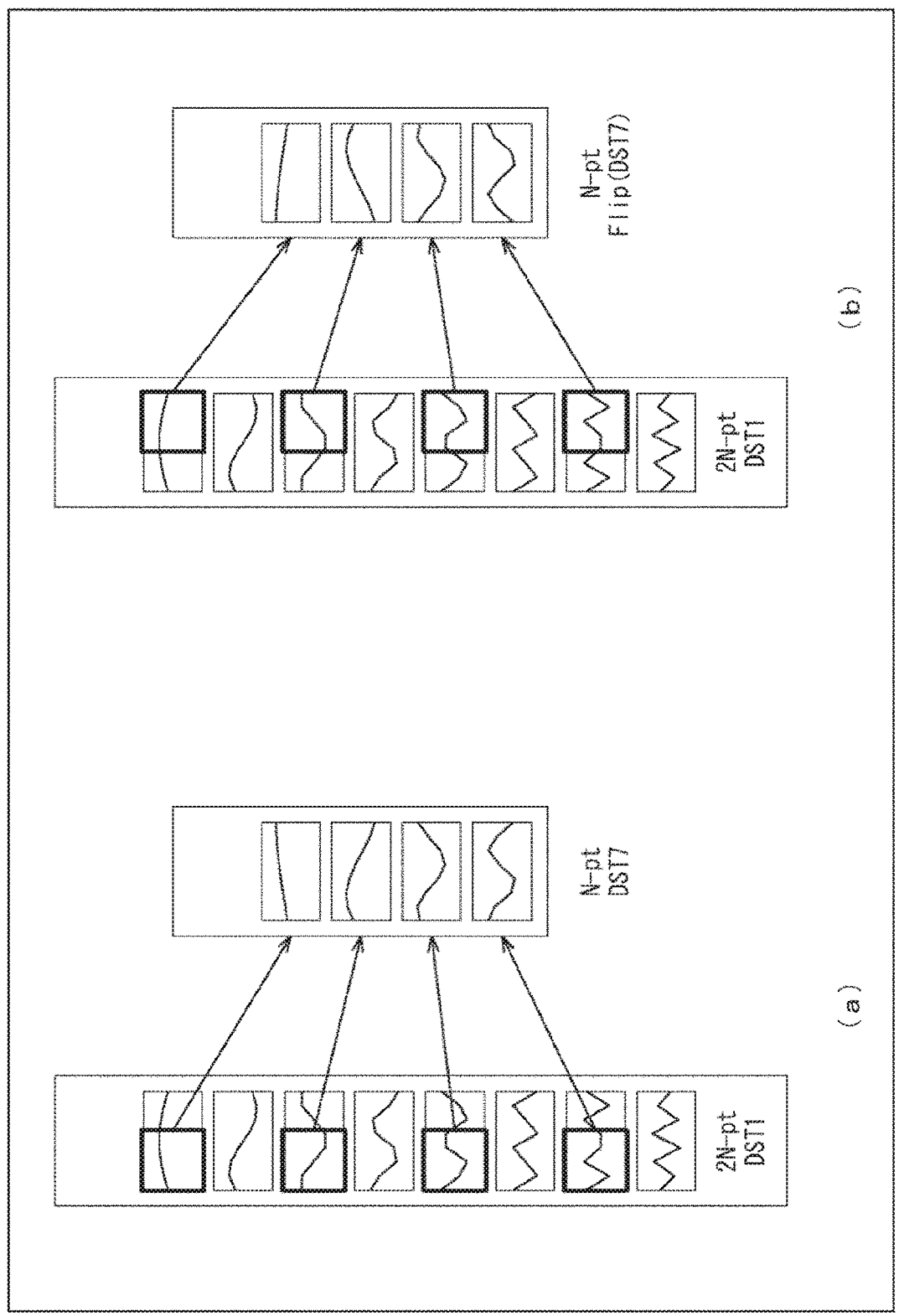
FIG. 11 is a specific example illustrating similarity between basis vectors of transform matrices.
Figure 12:
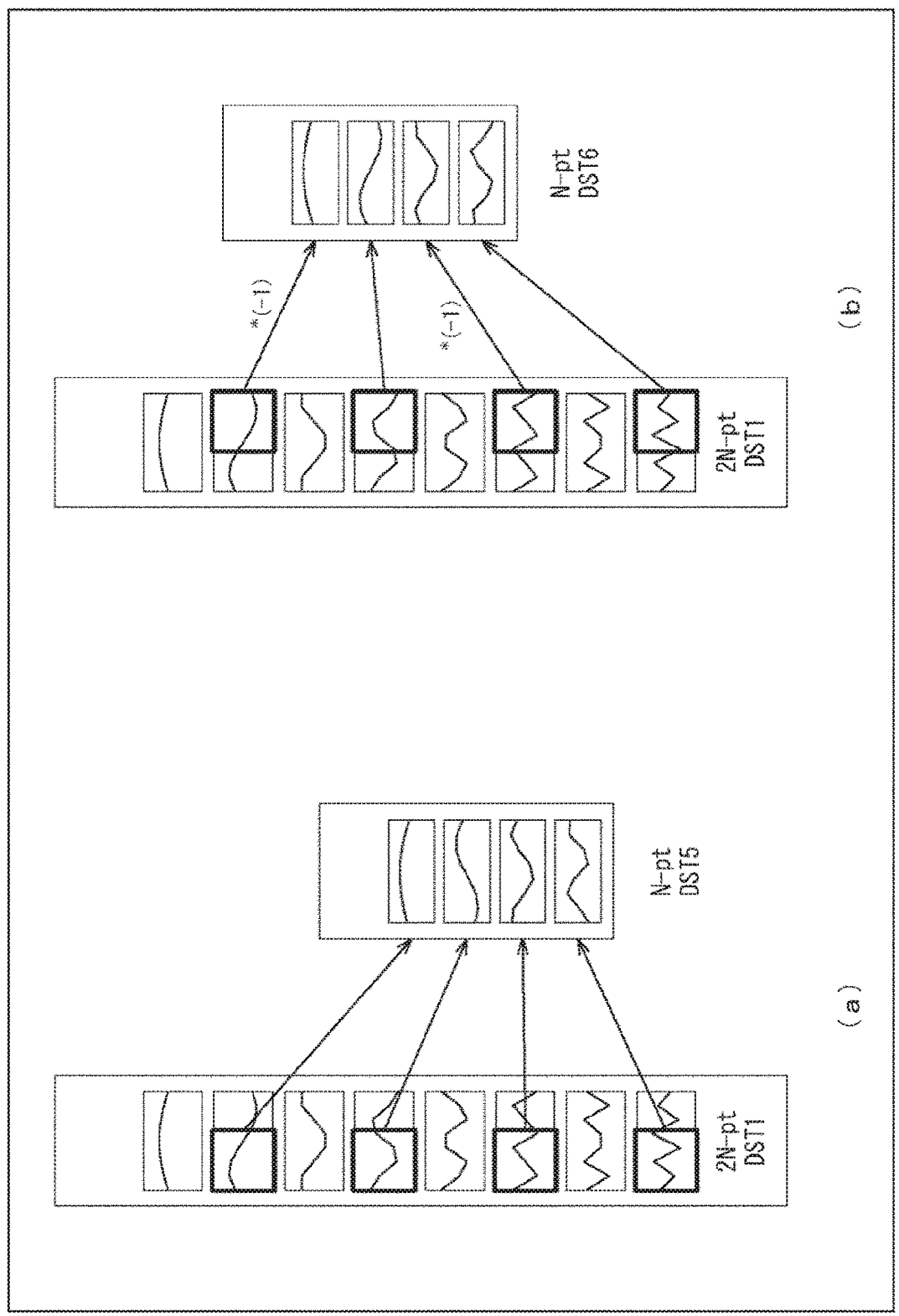
FIG. 12 is a specific example illustrating similarity between basis vectors of transform matrices.

For example, FIG. 8 illustrates an example of waveforms (tendency of values of elements) of a low-order (particularly, 0th-order) row vector of a frame c0 in a transform matrix C in the first size and waveforms of a low-order (particularly, 0th-order) row vector of a corresponding transform matrix in the second size. In addition, FIG. 9 illustrates an example of waveforms (tendency of values of elements) of a low-order (particularly, first-order) row vector of a frame c1 in the transform matrix C in the first size and waveforms of a low-order (particularly, 0th-order) row vector of the corresponding transform matrix in the second size. Further, the content of FIGS. 8 and 9 will be described with reference to FIGS. 10, 11, and 12 that are specific examples illustrating the similarity between the basis vectors of the transform matrices. In FIGS. 10 to 12, the vertical axis indicates a basis vector, and the horizontal axis indicates elements of the basis vector. Note that, although FIGS. 10 to 12 are illustrated on the basis of rows, the description can similarly be applied to cases where the drawings are illustrated on the basis of columns.

In FIG. 8, (a) illustrates an example in which low-order components (frame lo) in a waveform (graph fa1) of a flat-type 0th-order row vector of the transform matrix in the first size resemble a waveform (graph fa2) of a flat-type 0th-order row vector of the transform matrix in the second size. In the case of (a) of FIG. 8, the transform type of the transform matrix in the first size is DCT2, and the transform type of the transform matrix in the second size is DCT2. Therefore, a resembling transform matrix of DCT2 in the second size can be derived from low-frequency components of an EVEN matrix including even-order row vectors of the transform matrix of DCT2 in the first size. In this case, (a) of FIG. 10 is a specific example illustrating that basis vectors of 8-pt DCT2 and basis vectors of 4-pt DCT2 resemble. Speaking more generally, an N×N transform matrix of the transform type including 0th-order row vectors of the flat type can be derived from a 2N×2N transform matrix of the transform type including 0th-order row vectors of the flat type.

In FIG. 8, (b) illustrates another example in which low-order components (frame lo) in a waveform (graph fb1) of a flat-type 0th-order row vector of the transform matrix in the first size resemble a waveform (graph fb2) of a flat-type 0th-order row vector of the transform matrix in the second size. In the case of (b) of FIG. 8, the transform type of the transform matrix in the first size is DCT1, and the transform type of the transform matrix in the second size is DCT5. The 0th-order row vector of DCT1 has a flat-type waveform in which the values of the lowest-order and highest-order elements are smaller than the values of the other elements. On the other hand, the 0th-order row vector of DCT5 has a flat-type waveform in which the values of the lowest-order elements are smaller than the values of the other elements. Therefore, a resembling transform matrix of DCT5 in the second size can be derived from low-frequency components of an EVEN matrix including even-order row vectors of the transform matrix of DCT1 in the first size.

In FIG. 8, (c) illustrates an example in which low-order components (frame lo) in a waveform (graph fc1) of a mountain-type 0th-order row vector of the transform matrix in the first size resemble a waveform (graph fc2) of an increase-type 0th-order row vector of the transform matrix in the second size. In the case of (c) of FIG. 8, the transform type of the transform matrix in the first size is DST1, and the transform type of the transform matrix in the second size is DST7. The 0th-order row vector of DST1 has a bilaterally symmetrical waveform including a peak at the center. On the other hand, the 0th-order row vector of DST7 has a type of waveform in which the value increases from the lower-frequency side to the higher-frequency side. Therefore, a resembling transform matrix of DST7 in the second size can be derived from low-frequency components of an EVEN matrix including even-order row vectors of the transform matrix of DST1 in the first size. In this case, (a) of FIG. 11 is a specific example illustrating that basis vectors of 8-pt DST1 and basis vectors of 4-pt DST7 resemble. Speaking more generally, an N×N transform matrix of the transform type including 0th-order row vectors of the increase type can be derived from a 2N×2N transform matrix of the transform type including 0th-order row vectors of the mountain type.

In FIG. 8, (d) illustrates an example in which high-order components (frame hi) in a waveform (graph fd1) of a mountain-type 0th-order row vector of the transform matrix in the first size resemble a waveform (graph fd2) of a decrease-type 0th-order row vector of the transform matrix in the second size. In the case of (d) of FIG. 8, the transform type of the transform matrix in the first size is DST1, and the transform type of the transform matrix in the second size is DCT8 (or FlipDST7). The 0th-order row vector of DST1 has a bilaterally symmetrical waveform including a peak at the center. On the other hand, the 0th-order row vector of DCT8 has a type of waveform in which the value decreases from the lower-frequency side to the higher-frequency side. Therefore, a resembling transform matrix of DCT8 (or FlipDST7) in the second size can be derived from high-frequency components of an EVEN matrix including even-order row vectors of the transform matrix of DST1 in the first size. In this case, (b) of FIG. 11 is a specific example illustrating that basis vectors of 8-pt DST1 and basis vectors of 4-pt FlipDST7 resemble. Note that 4-pt DCT8 can be obtained by inverting the signs of even-order basis vectors of 4-pt FlipDST7 in (b) of FIG. 11. Speaking more generally, an N×N transform matrix of the transform type including 0th-order row vectors of the decrease type can be derived from a 2N×2N transform matrix of the transform type including 0th-order row vectors of the mountain type.

In FIG. 9, (a) illustrates an example in which low-order components (frame lo) in a waveform (graph fe1) of a point-symmetry-type first-order row vector decreasing from positive to negative of the transform matrix in the first size resemble a waveform (graph fe2) of a decrease-type 0th-order row vector of the transform matrix in the second size. In the case of (a) of FIG. 9, the transform type of the transform matrix in the first size is DCT2, and the transform type of the transform matrix in the second size is DCT4. The first-order row vector of DCT2 has a point-symmetric waveform that attenuates from positive to zero in the region from the low order to the center and that attenuates from zero to negative in the region from the center to the high order. On the other hand, the 0th-order row vector of DCT4 has a type of waveform in which the value decreases from the low-frequency side to the high-frequency side. Therefore, a resembling transform matrix of DCT4 in the second size can be derived from low-frequency components of an ODD matrix including odd-order row vectors of the transform matrix of DCT2 in the first size. In this case, (b) of FIG. 10 is a specific example illustrating that basis vectors of 8-pt DCT2 and basis vectors of 4-pt DCT4 resemble. Speaking more generally, an N×N transform matrix of the transform type including 0th-order row vectors of the decrease type can be derived from a 2N×2N transform matrix of the transform type including first-order row vectors of the point-symmetry type that decreases from positive to negative.

In FIG. 9, (b) illustrates an example in which high-order components (frame hi) in a waveform (graph ff1) of a point-symmetry-type first-order row vector decreasing from positive to negative of the transform matrix in the first size resemble a waveform (graph ff2) of an increase-type 0th-order row vector of the transform matrix in the second size. In the case of (b) of FIG. 9, the transform type of the transform matrix in the first size is DCT2, and the transform type of the transform matrix in the second size is DST4. The first-order row vector of DCT2 has a point-symmetric waveform that attenuates from positive to zero in the region from the low order to the center and that attenuates from zero to negative in the region from the center to the high order. On the other hand, the 0th-order row vector of DST4 has a type of waveform in which the value increases from the lower-frequency side to the higher-frequency side. Therefore, a resembling transform matrix of DST4 in the second size can be derived by inverting the signs of high-frequency components of an ODD matrix including odd-order row vectors of the transform matrix of DCT2 in the first size. In this case, (c) of FIG. 10 is a specific example illustrating that basis vectors of 8-pt DCT2 and basis vectors of 4-pt DST4 resemble. Speaking more generally, an N×N transform matrix of the transform type including 0th-order row vectors of the increase type can be derived from a 2N×2N transform matrix of the transform type including first-order row vectors of the point-symmetry type that decreases from positive to negative.

In FIG. 9, (c) illustrates an example in which low-order components (frame lo) in a waveform (graph fg1) of a point-symmetry-type first-order row vector decreasing from positive to negative of the transform matrix in the first size resemble a waveform. (graph fg2) of a mountain-type 0th-order row vector of the transform matrix in the second size. In the case of (c) of FIG. 9, the transform type of the transform matrix in the first size is DST1, and the transform type of the transform matrix in the second size is DST5. The first-order row vector of DST1 has a point-symmetric waveform in which the values form a mountain shape in the positive direction between the low order and the center and form a mountain shape in the negative direction between the center and the high order. On the other hand, the 0th-order row vector of DST5 has a mountain-type waveform including a peak on the left side of the center. Therefore, a resembling transform matrix of DST5 in the second size can be derived from low-frequency components of an ODD matrix including odd-order row vectors of the transform matrix of DST1 in the first size. In this case, (a) of FIG. 12 is a specific example illustrating that basis vectors of 8-pt DST1 and basis vectors of 4-pt DST5 resemble. Speaking more generally, an N×N transform matrix of the transform type including 0th-order row vectors of the mountain type can be derived from a 2N×2N transform matrix of the transform type including point-symmetric 0th-order row vectors that form a mountain shape in the positive direction between the low order and the center and that form a mountain shape in the negative direction between the center and the high order.

In FIG. 9, (d) illustrates an example in which high-order components (frame hi) in a waveform (graph fh1) of a point-symmetry-type first-order row vector decreasing from positive to negative of the transform matrix in the first size resemble a waveform (graph fh2) of a mountain-type 0th-order row vector of the transform matrix in the second size. In the case of (d) of FIG. 9, the transform type of the transform matrix in the first size is DST1, and the transform type of the transform matrix in the second size is DST6. The first-order row vector of DST1 has a point-symmetric waveform in which the values form a mountain shape in the positive direction between the low order and the center and form a mountain shape in the negative direction between the center and the high order. On the other hand, the 0th-order row vector of DST6 has a mountain-type waveform including a peak on the right side of the center. Therefore, a resembling transform matrix of DST6 in the second size can be derived by inverting the signs of low-frequency components of an ODD matrix including odd-order row vectors of the transform matrix of DST1 in the first size. In this case, (b of FIG. 12 is a specific example illustrating that basis vectors of 8-pt DST1 and basis vectors of 4-pt DST6 resemble. Speaking more generally, an N×N transform matrix of the transform type including 0th-order row vectors of the mountain type can be derived from a 2N×2N transform matrix of the transform type that is a point-symmetry type decreasing from positive to negative which includes point-symmetric 0th-order row vectors that form a mountain shape in the positive direction between the low order and the center and that form a mountain shape in the negative direction between the center and the high order.

As described above, focus is placed on the resemblance of the waveforms between the transform matrices in different sizes, and a transform matrix in the second size (N) can be derived from a submatrix including {low-frequency, high-frequency} components of {even, odd}—ordered basis vectors of a transform matrix in the first size (2N) to thereby reduce the storage capacity (LUT) for holding the transform matrices.

<4. Concept>

Figure 13:
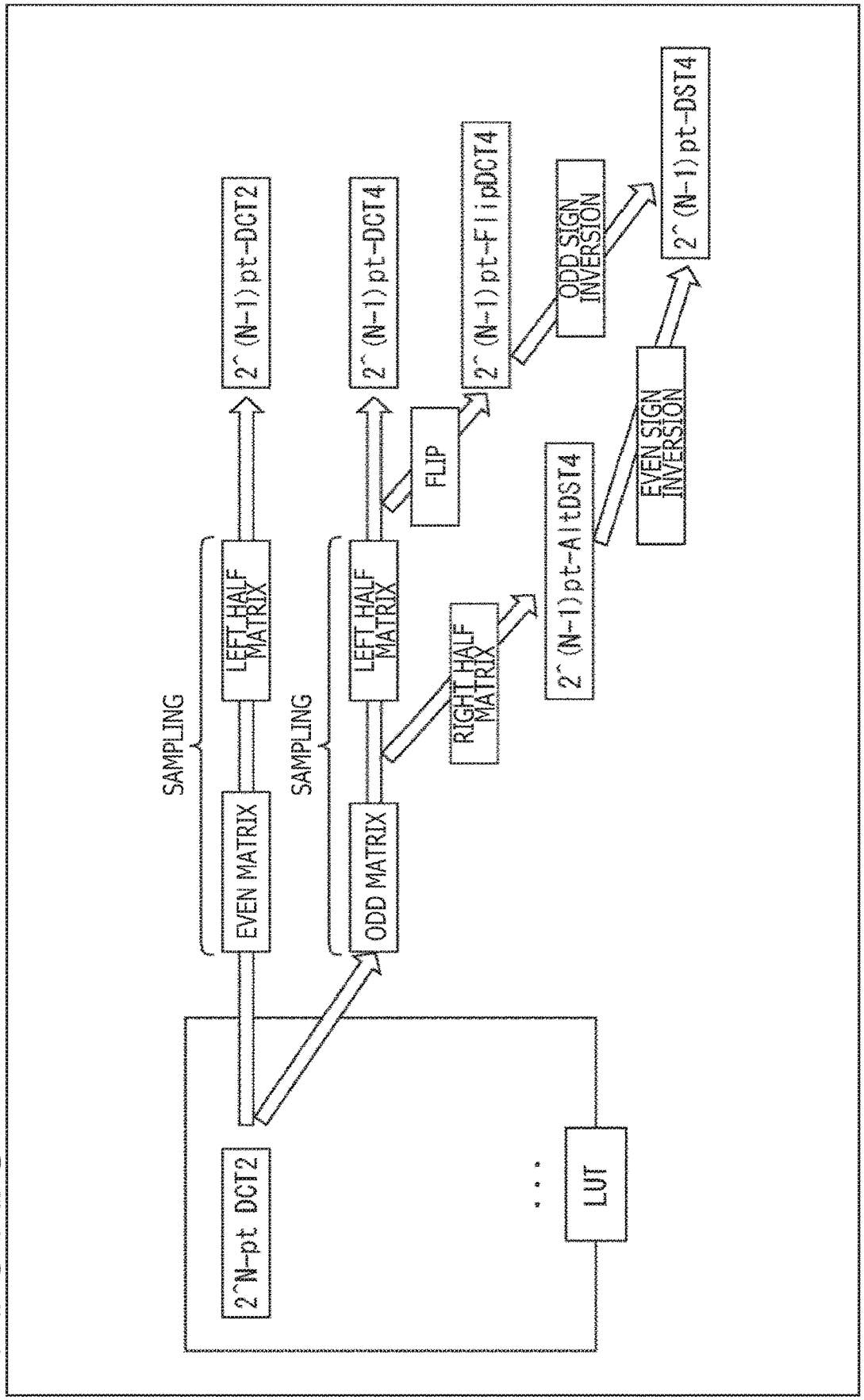
FIG. 13 is a diagram illustrating an example of transform matrices derived from a base transform matrix.

FIG. 13 is a diagram illustrating an example in which a transform matrix of $2^N$-pt DCT2 scaled by $2^{(const.+\log 2(N))}$ and approximated to an integer as illustrated in FIG. 7 is held on the lookup table and an operation (such as flip and sign inversion) is applied to a submatrix obtained by reading out and sampling the transform matrix, to thereby derive a transform matrix of $2^{(N-1)}$-pt {DCT2, DCT4, FlipDCT4, AltDST4, DST4} in a size half the size of $2^N$.

The submatrix is a matrix including part of the elements of the base transform matrix as a target of deriving the transform matrix. Typically, the submatrix is a matrix including elements obtained by sampling the elements of the base transform matrix. Examples of the submatrix obtained by sampling include the following matrices.

X matrix (low-order): Left half matrix of an X matrix (also referred to as an X matrix (row direction low-order)) or upper half matrix of X matrix (also referred to as an X matrix (column direction low-order)).

X matrix (high-order): Right half matrix of an X matrix (also referred to as an X matrix (row direction high-order)) or lower half matrix of an X matrix (also referred to as an X matrix (column direction high-order)).

EVEN matrix: Matrix including even rows of an X matrix (also referred to as an even row matrix) (example: 0, 2, 4, 6 rows and the like) or matrix including even columns of an X matrix (also referred to as an even column matrix) (example: 0, 2, 4, 6 columns and the like).

ODD matrix: Matrix including odd rows of an X matrix (referred to as an odd row matrix) (example: 1 5, 7 rows and the like) or matrix including odd columns of an X matrix (also referred to as an odd column matrix) (example: 1, 3, 5, 7 columns and the like). Examples of the operation applied to the elements of the matrix include rearrangement of elements and the like. More specifically, for example, the arrangement of the element group of the matrix can be flipped (inverted) in a predetermined direction, or the element group can be transposed to exchange the rows and the columns. Note that the transposition is equivalent to flipping (inverting) the element group about a diagonal connecting the upper left edge and the lower right edge of the matrix. That is, it can be said that the transposition is part of the flipping. In addition, the sign of each element can also be easily inverted (from positive to negative or from negative to positive). Note that the terms used in the drawings are as follows.

EVEN sign inversion: Signs of even-order row vectors are inverted. Also referred to as EVEN row sign inversion or even row sign inversion.

ODD sign inversion: Signs of odd-order row vectors are inverted. Also referred to as ODD row sign inversion or odd row sign inversion.

Note that the operation of inverting the sign of each element also includes EVEN column sign inversion for inverting the signs of even-order column vectors (also referred to as even column sign inversion) and ODD column sign inversion for inverting the signs of odd-order column vectors (also referred to as odd column sign inversion).

(a) $2^N$-pt DCT2→$2^{(N-1)}$-pt DCT2

For example, an EVEN matrix (low-order) (=left half matrix of EVEN matrix) obtained by sampling the even-order row vectors of $2^N$-pt DCT2 is set as a transform matrix of $2^{(N-1)}$-pt DCT2.

(b) $2^N$-pt DCT2→$2^{(N-1)}$-pt DCT4

For example, an ODD matrix (low-order) (=left half matrix of ODD matrix) obtained by sampling the odd-order row vectors of $2^N$-pt DCT2 is set as a transform matrix of $2^{(N-1)}$-pt DCT4.

(c) $2^N$-pt DCT2→$2(N-1)$-pt FlipDCT4

Further, the transform matrix of $2(N-1)$-pt DCT4 obtained in (b) is flipped to obtain a transform matrix of $2^{(N-1)}$-pt FlipDCT4.

(d) $2^N$-pt DCT2→$2^{(N-1)}$-pt DST4

Further, the signs of the odd-order row vectors are inverted (ODD sign inversion) in the transform matrix of $2^{(N-1)}$-pt FlipDCT4 obtained in (c) to obtain a transform matrix of $2^{(N-1)}$-pt DST4.

(e) $2^N$-pt DCT2→$2^{(N-1)}$-pt AltDST4

For example, an ODD matrix (high-order) (=right half matrix of ODD matrix) obtained by sampling the odd-order row vectors of $2^N$-pt DCT2 corresponds to a transform matrix obtained by inverting the signs of the even-order row vectors of $2^{(N-1)}$-pt DST4. The transform matrix will be referred to as $2^{(N-1)}$-pt AltDST4.

(f) $2^N$-pt DCT2→$2^{(N-1)}$-pt DST4

The signs of the even-order row vectors are inverted (EVEN sign inversion) in the transform matrix of $2^{(N-1)}$-pt AltDST4 obtained in (e), to derive a transform matrix of $2^{(N-1)}$-pt DST4.

Figure 14:
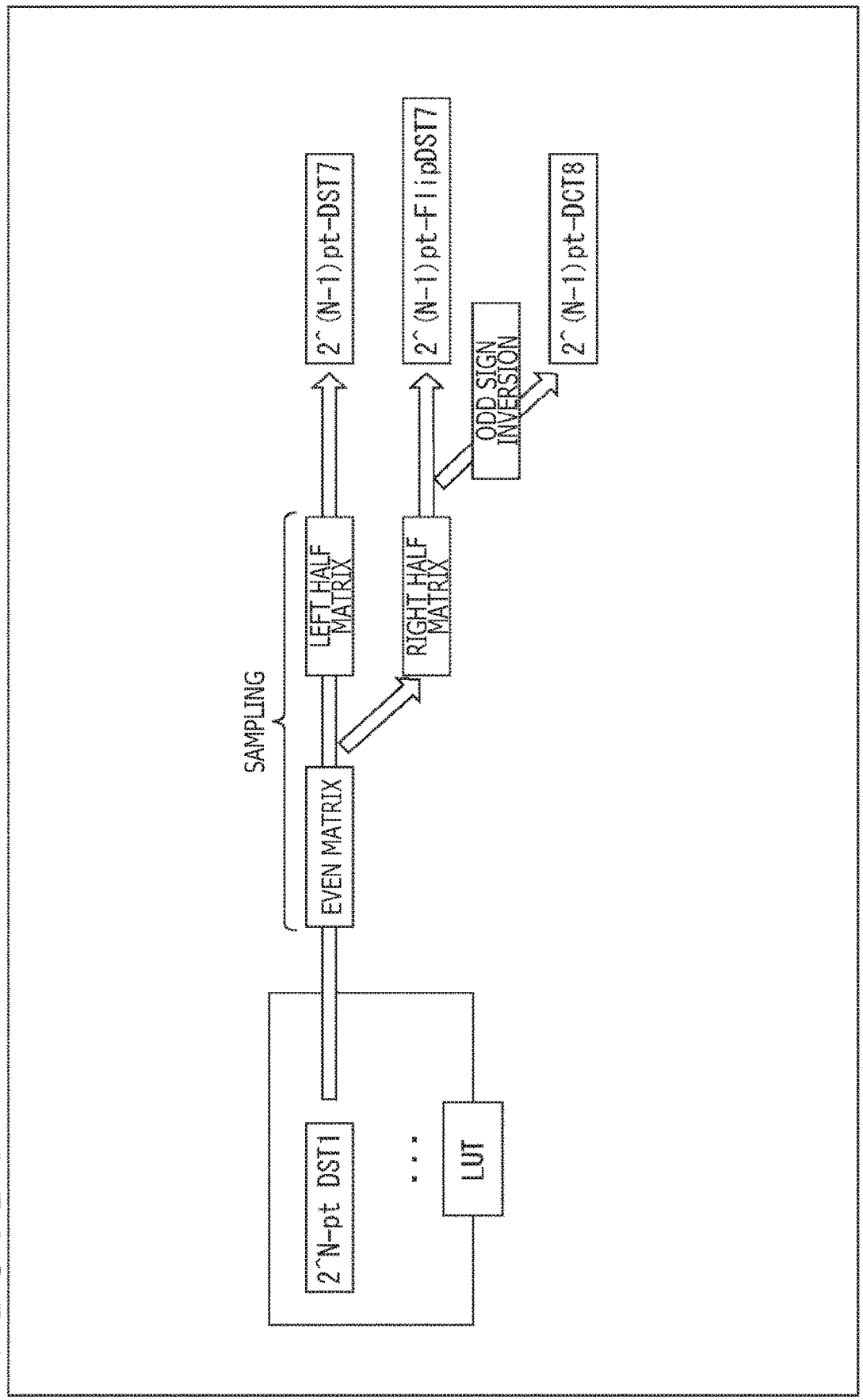
FIG. 14 is a diagram illustrating an example of transform matrices derived from a base transform matrix.
Figure 15:
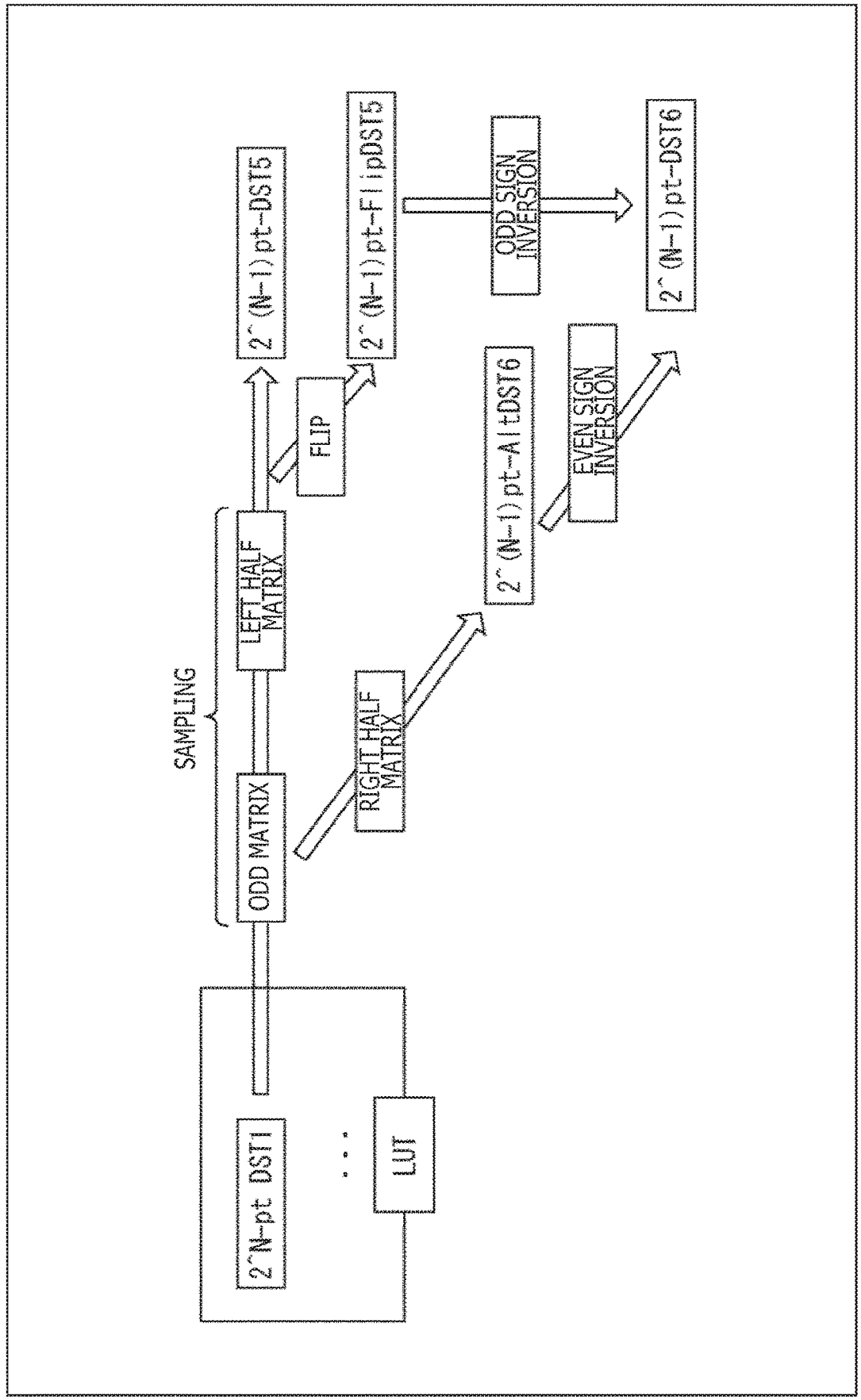
FIG. 15 is a diagram illustrating an example of transform matrices derived from a base transform matrix.

FIGS. 14 and 15 are diagrams illustrating an example in which a transform matrix of $2^N$-pt DST1 scaled by $2^{(const.+\log 2(N))}$ and approximated to an integer as illustrated in FIG. 7 is held on the lookup table and an operation (such as flip, transposition, and sign inversion) is applied to a submatrix obtained by reading out and sampling the transform matrix, to thereby derive a transform matrix of $2^{(N-1)}$-pt {DST7, FlipDST7, DST5, FlipDST5, AltDST6, DST6} in a size half the size of $2^N$.

(a) $2^N$-pt DST1→$2^{(N-1)}$-pt DST7

For example, an EVEN matrix (low-order) (=left half matrix of EVEN matrix) obtained by sampling the even-order row vectors of $2^N$-pt DST1 is set as a transform matrix of $2^{(N-1)}$-pt DST7.

(b) $2^N$-pt DST1→$2^{(N-1)}$-pt FlipDST7

For example, an EVEN matrix (high-order) (=right half matrix of EVEN matrix) obtained by sampling the even-order row vectors of $2^N$-pt DST1 is set as a transform matrix of $2^{(N-1)}$-pt FlipDST7.

(c) $2^N$-pt DST1→$2^{(N-1)}$-pt DCT8

Further, the ODD sign inversion is applied to the transform matrix of $2^{(N-1)}$-pt FlipDST7 obtained in (b), to obtain the transform matrix of $2^{(N-1)}$-pt DCT8.

(d) 2^N-pt DST1→2^(N−1)-pt DST5

For example, an ODD matrix (low-order) (=left half matrix of ODD matrix) obtained by sampling the odd-order row vectors of 2^N-pt DST1 is set as a transform matrix of 2^(N−1)-pt DST5.

(e) 2^N-pt DST1→2^(N−1)-pt FlipDST5

Further, the ODD sign inversion is applied to the transform matrix of 2^N-pt FlipDST5 obtained in (d), to obtain a transform matrix of 2^(N−1)-pt DST6.

(f) 2^N-pt DST1→2^(N−1)-pt AltDST6

For example, an ODD matrix (high-order) (=right half matrix of ODD matrix) obtained by sampling the odd-order row vectors of 2^N-pt DST1 corresponds to a transform matrix obtained by inverting the signs of the even-order row vectors of 2^(N−1)-pt DST6. The transform matrix will be referred to as 2^(N−1)-pt AltDST6.

(g) 2^N-pt DCT2→2^(N−1)-pt DST6

The EVEN sign inversion is applied to the transform matrix of 2^(N−1)-pt AltDST6 obtained in (f), to derive a transform matrix of 2^(N−1)-pt DST6.

FIGS. 16 and 17 illustrate overviews of the operations applied to the base transform matrices and overviews of corresponding derivation formulas in deriving the transform matrix of each 2^(N−1)-pt from the base transform matrix of 2^N-pt. For example, in a case of a fifth stage from the top excluding the stage of item names in the list of FIG. 16, 2^N-pt DCT2 is the base transform matrix, and the operation used to derive the transform matrix of 2^(N−1)-pt DCT4 is marked with "X." This case illustrates that sampling for extracting the ODD matrix (low-order) is applied to the base transform matrix to derive 2^(N−1)-pt DCT4.

Further, in a case of, for example, a second stage from the top excluding the stage of item names in the list of FIG. 17, 2^N-pt DST1 is the base transform matrix, and sampling for extracting the EVEN matrix (low-order) is applied to the base transform matrix. Furthermore, flipping is further performed in the horizontal direction to derive 2^(N−1)-pt FlipDST7 that is a 2^(N−1)-pt DCT8 compatible transform. The details of derivation processes (Equations (A-1) to (A-9) and (B-1) to (B-9)) corresponding to the stages will be described later.

In this way, a combination of flip, transposition, and ODD/EVEN sign inversion (ODD row/EVEN row sign inversion, ODD column/EVEN column sign inversion) can be applied to the submatrix (EVEN matrix (low-order), EVEN matrix (high-order), ODD matrix (low-order), ODD matrix (high-order)) included in the transform matrix of 2^N-pt, to derive the transform matrix of 2^(N−1)-pt. Therefore, the transform matrix of 2^N-pt and the transform matrix of 2^(N−1)-pt can be shared, and the LUT size can be reduced. In addition, the matrix computation can be shared between the transform matrix of 2^N-pt and the transform matrix of 2^(N−1)-pt, and the circuit scale can be reduced.

Figure 18:
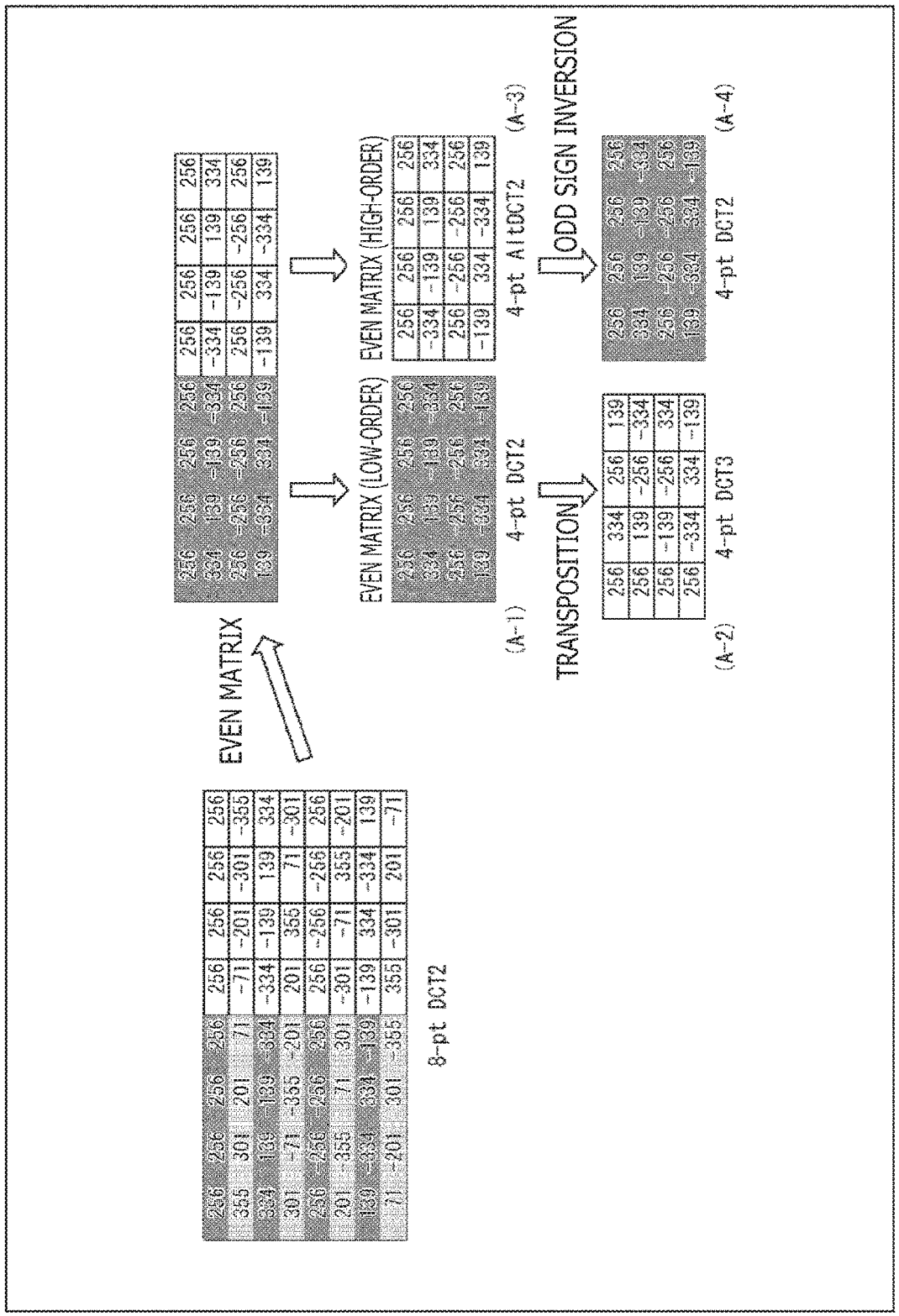
FIG. 18 is a diagram illustrating a specific example of transform matrices derived from a base transform matrix.

FIG. 18 is a diagram for describing an example of a method of deriving an N×N transform matrix T from the EVEN matrix of the 2N×2N transform matrix C. FIG. 18 illustrates 8-pt DCT2 as a specific example of the 2N×2N transform matrix for description. Here, the derivation processes (Equations (A-1) to (A-4)) will be described.

<Description of Equation (A-1)>

This is an example of setting the EVEN matrix (low-order) of the 2N×2N transform matrix C as the N×N transform matrix T. The EVEN matrix (low-order) of the 2N×2N transform matrix C (example: DCT2) is set as the N×N transform matrix T (example: DCT2), based on Equation (A-1). In other words, the even row matrix (row direction low-order) of the 2N×2N transform matrix C is set as the N×N transform matrix T. Here, A[y,x] denotes an element of row y, column x of matrix A.

$$T[y,x]=C[2y,x] \text{ for } x=0 \ldots N-1, y=0 \ldots N-1 \quad (A\text{-}1)$$

That is, the element of row 2y, column x of the transform matrix C is set for the element (x=0 ... N−1, y=0 ... N−1) of each row y, column x of the N×N transform matrix T. In this way, the transform matrix of N-pt DCT2 can be derived from the transform matrix of 2N-pt DCT2 in the example of FIG. 18. Therefore, the transform matrix of N-pt DCT2 does not have to be held in the LUT.

<Description of Equation (A-2)>

This is an example of transposing the EVEN matrix (low-order) of the 2N×2N transform matrix C to derive the N×N transform matrix T. The EVEN matrix (low-order) of the 2N×2N transform matrix C (example: DCT2) is transposed and set as the N×N transform matrix T (example: DCT3), based on Equation (A-2). In other words, the even row matrix (row-direction low-order) of the 2N×2N transform matrix C is transposed and set as the N×N transform matrix T.

$$T[y,x]=C[x,2y] \text{ for } x=0 \ldots N-1, y=0 \ldots N-1 \quad (A\text{-}2)$$

That is, the element of row x, column 2y of the transform matrix C is set for the element (x=0 ... N−1, y=0 ... N−1) of each row y, column x of the N×N transform matrix T. In this way, the transform matrix of N-pt DCT3 can be derived from the transform matrix of 2N-pt DCT2 in the example of FIG. 18. Therefore, the transform matrix of N-pt DCT3 does not have to be held in the LUT.

<Description of Equation (A-3)>

This is an example of setting the EVEN matrix (high-order) of the 2N×2N transform matrix C as the N×N transform matrix T. The EVEN matrix (high-order) of the 2N×2N transform matrix C (example: DCT2) is set as the N×N transform matrix T (example: AltDCT2), based on Equation (A-3). The transform matrix with the signs opposite the signs of the odd-order row vectors in the transform matrix of DCT2 will be referred to as AltDCT2 for convenience. In other words, the even row matrix (row direction high-order) of the 2N×2N transform matrix C is set as the N×N transform matrix T.

$$T[y,x]=C[2y,N+x] \text{ for } x=0 \ldots N-1-1, y=0 \ldots N-1 \quad (A\text{-}3)$$

That is, the element of row 2y, column (N+x) of the transform matrix C is set for the element (x=0 ... N−1, y=0 ... N−1) of each row y, column x of the N×N transform matrix T. In this way, the transform matrix of N-pt AltDCT2 can be derived from the transform matrix of 2N-pt DCT2 in the example of FIG. 18. Therefore, the transform matrix of N-pt AltDCT2 does not have to be held in the LUT.

<Description of Equation (A-4)>

This is an example of applying the ODD sign inversion to the EVEN matrix (high-order) of the 2N×2N transform matrix C to derive the N×N transform matrix T. The signs of the odd-order row vectors in the EVEN matrix (low-order) of the 2N×2N transform matrix C (example: DCT2) are inverted (ODD sign inversion) to derive the N×N transform matrix T (example: DCT2), based on Equation (A-4). In other words, the odd row sign inversion is applied to the submatrix including the even row matrix (row direction low-order) of the 2N×2N transform matrix C, to derive the N×N transform matrix T.

$$T[y,x]=\text{sign}*C[2y,N+x] \text{ for } x=0 \ldots N-1, y=0 \ldots N-1 \text{ sign}=y\%2==1?-1:1 \quad (A\text{-}4)$$

That is, a value obtained by multiplying the element of row 2y, column x of the transform matrix C by a sign "sign"

is set for the element (x=0 ... N−1, y=0 ... N−1) of each row y, column x of the N×N transform matrix T. Here, the sign "sign" is a value of −1 in a case of an odd row vector (y %2==1) of the transform matrix C and is a value of 1 in other cases. In this way, the transform matrix of N-pt DCT2 can be derived from the transform matrix of 2N-pt DCT2 in the example of FIG. 18. Therefore, the transform matrix of N-pt DCT2 does not have to be held in the LUT.

Figure 19:
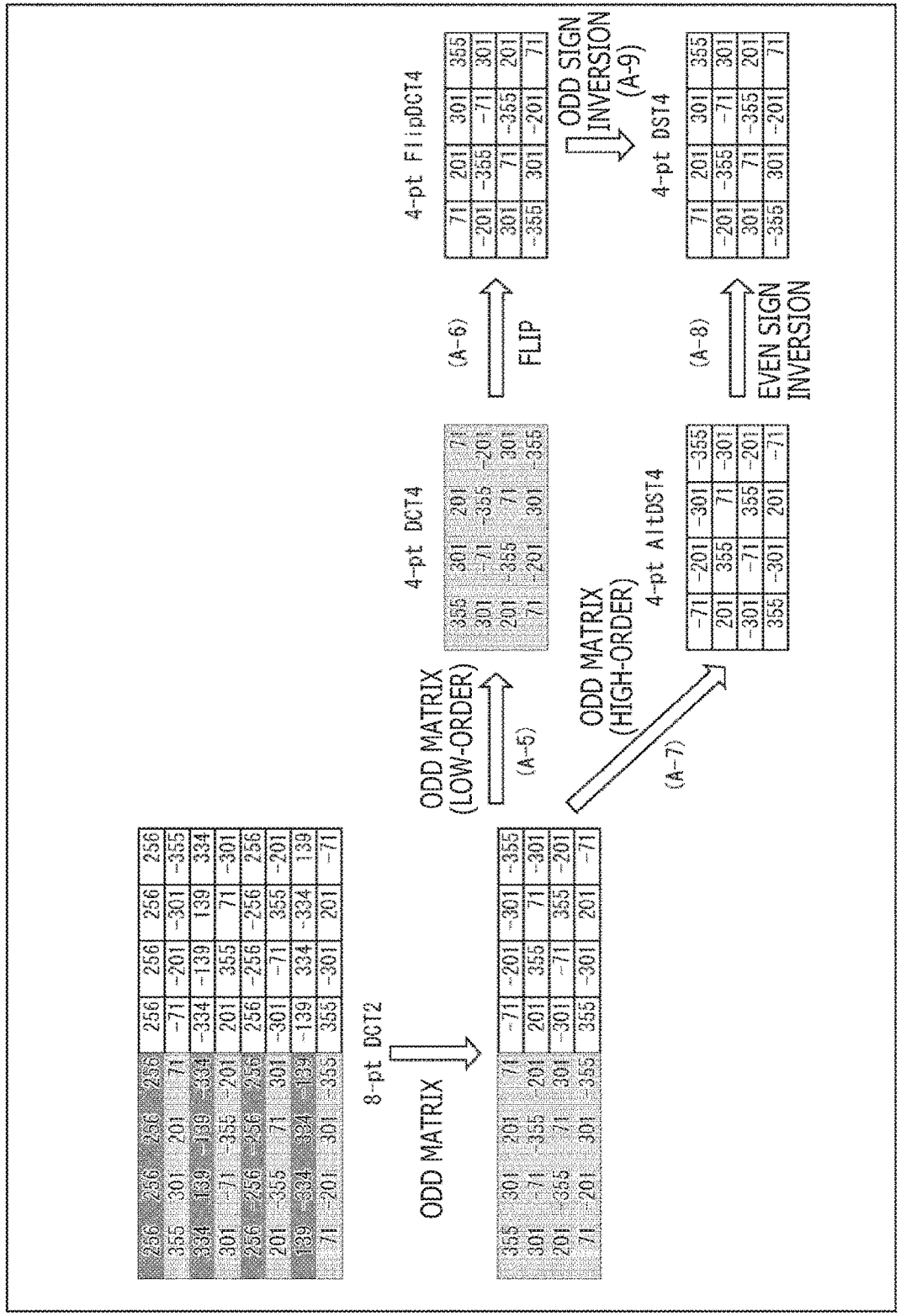
FIG. 19 is a diagram illustrating a specific example of transform matrices derived from a base transform matrix.

FIG. 19 is a diagram for describing an example of a method of deriving the N×N transform matrix T from the ODD matrix of the 2N×2N transform matrix C. FIG. 19 illustrates 8-pt DCT2 as a specific example of the 2N×2N transform matrix for description. Here, the derivation processes (Equations (A-5) to (A-8) and (A-9)) will be described.

<Description of Equation (A-5)>

This is an example of setting the ODD matrix (low-order) of the 2N×2N transform matrix C as the N×N transform matrix T. The ODD matrix (low-order) (example: DCT2) of the 2N×2N transform matrix C is set as the N×N transform matrix T (example: DCT4), based on Equation (A-5). In other words, the submatrix including the odd row matrix (row direction low-order) of the 2N×2N transform matrix C is set as the N×N transform matrix T.

$$T[y,x]=C[2y+1,x] \text{ for } x=0 \ldots N-1, y=0 \ldots N-1 \quad (A-5)$$

That is, the element of row (2y+1), column x of the transform matrix C is set for the element (x=0 ... N−1, y=0 ... N−1) of each row y, column x of the N×N transform matrix T. In this way, the transform matrix of N-pt DCT4 can be derived from the transform matrix of 2N-pt DCT2 in the example of FIG. 19. Therefore, the transform matrix of N-pt DCT4 does not have to be held in the LUT.

<Description of Equation (A-6)>

This is an example of flipping the ODD matrix (low-order) of the 2N×2N transform matrix C to derive the N×N transform matrix T. The ODD matrix (low order) of the 2N×2N transform matrix C (example: DCT2) is flipped to derive the N×N transform matrix T (example: FlipDCT4), based on Equation (A-6). In other words, the submatrix including the odd row matrix (row direction low-order) of the 2N×2N transform matrix C is flipped in the horizontal direction to derive the N×N transform matrix T.

$$T[y,x]=C[2y+1,2N-1-x] \text{ for } x=0 \ldots N-1, y=0 \ldots N-1 \quad (A-6)$$

That is, the element of row (2y+1), column (2N−1−x) of the transform matrix C is set for the element x=0 ... N−1, y=0 ... N−1) of each row y, column x of the N×N transform matrix T. In this way, the transform matrix of N-pt FlipDCT4 can be derived from the transform matrix of 2N-pt DCT2 in the example of FIG. 19. Therefore, the transform matrix of N-pt DCT4 does not have to be held in the LUT.

<Description of Equation (A-7)>

This is an example of setting the ODD matrix (high-order) of the 2N×2N transform matrix C as the N×N transform matrix T. The ODD matrix (high-order) of the 2N×2N transform matrix C (example: DCT2) is set as the N×N transform matrix T (example: AltDST4), based on Equation (A-7). The transform matrix with the signs opposite the signs of the even-order row vectors in the transform matrix of DST4 will be referred to as AltDST4 for convenience. In other words, the submatrix including the odd row matrix (row direction high-order) of the 2N×2N transform matrix C is set as the N×N transform matrix T.

$$T[y,x]=C[2y+1,N+x] \text{ for } x=0 \ldots N-1, y=0 \ldots N-1 \quad (A-7)$$

That is, the element of row (2y+1), column. (N+x) of the transform matrix C is set for the element (x=0 ... N−1, y=0 ... N−1) of each row y, column x of the N×N transform matrix T. In this way, the transform matrix of N-pt AltDST4 can be derived from the transform matrix of 2N-pt DCT2 in the example of FIG. 19. Therefore, the transform matrix of N-pt AltDST4 does not have to be held in the LUT.

<Description of Equation (A-8)>

This is an example of applying the EVEN sign inversion to the ODD matrix (high-order) of the 2N×2N transform matrix C to derive the N×N transform matrix T. The signs of the even-order row vectors in the ODD matrix (high-order) of the 2N×2N transform matrix C (example: DCT2) are inverted (EVEN sign inversion) to derive the N×N transform matrix T (example: DST4), based on Equation (A-8). In other words, the even row sign inversion is applied to the submatrix including the odd row matrix (row direction high-order) of the 2N×2N transform matrix C to derive the N×N transform matrix T.

$$T[y,x]=\text{sign}*C[2y,N+x] \text{ for } x=0 \ldots N-1, y=0 \ldots N-1 \text{ sign}=y\%2==0?-1:1 \quad (A-8)$$

That is, a value obtained by multiplying the element of row 2y, column (N+x) of the transform matrix C by the sign "sign" is set for the element (x=0 ... N−1, y=0 ... N−1) of each row y, column x of the N×N transform matrix T. Here, the sign "sign" is a value of −1 in a case of an even-order row vector (y %2==0) of the transform matrix C and is a value of 1 in other cases. In this way, the transform matrix of N-pt DST4 can be derived from the transform matrix of 2N-pt DCT2 in the example of FIG. 19. Therefore, the transform matrix of N-pt DST4 does not have to be held in the LUT.

<Description of Equation (A-9)>

This is an example of flipping the ODD matrix (low-order) of the 2N×2N transform matrix C and applying the ODD sign inversion, to derive the N×N transform matrix T. The ODD matrix (low-order) of the 2N×2N transform matrix C (example: DCT2) is flipped, and the signs of the odd row vectors of the submatrix are inverted (ODD sign inversion) to derive the N×N transform matrix T (example: DST4), based on Equation (A-9). In other words, the submatrix including the odd row matrix (row direction low-order) of the 2N×2N transform matrix C is flipped and subjected to odd row sign inversion, to derive the N×N transform matrix T.

$$T[y,x]=\text{sign}*C[2y+1,2N-1-x] \text{ for } x=0 \ldots N-1, y=0 \ldots N-1 \text{ sign } y\%2==1?-1:1 \quad (A-9)$$

That is, a value obtained by multiplying the element of row (2y+1), column (2N−1+x) of the transform matrix C by the sign "sign" is set for the element (x=0 ... N−1, y=0 ... N−1) of each row y, column x of the N×N transform matrix T. Here, the sign "sign" is a value of −1 in a case of an odd-order row vector (y %2==1) of the transform matrix C and is a value of 1 in other cases. In this way, the transform matrix of N-pt DST4 can be derived from the transform matrix of 2N-pt DCT2 in the example of FIG. 19. Therefore, the transform matrix of N-pt DST4 does not have to be held in the LUT.

Figure 20:
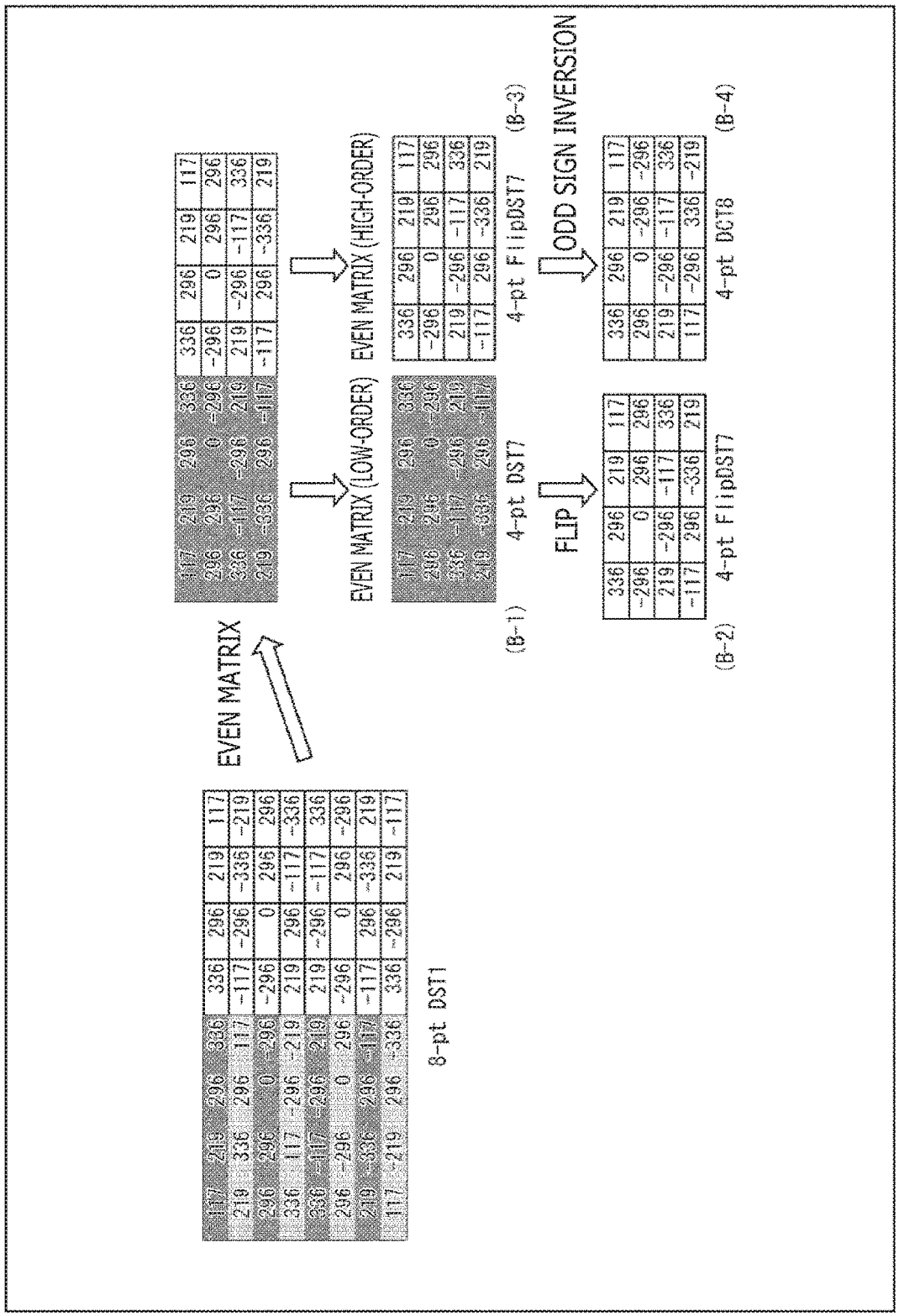
FIG. 20 is a diagram illustrating a specific example of transform matrices derived from a base transform matrix.

FIG. 20 is a diagram for describing another example of the method of deriving the N×N transform matrix T from the EVEN matrix of the 2N×2N transform matrix C. FIG. 20 illustrates 8-pt DST1 as a specific example of the 2N×2N transform matrix for description. Here, the derivation processes (Equations (B-1) to (B-4)) will be described.

<Description of Equation (B-1)>

This is an example of setting the EVEN matrix (low-order) of the 2N×2N transform matrix C as the N×N transform matrix T. The EVEN matrix (low-order) of the 2N×2N transform matrix C (example: DST1) is set as the N×N transform matrix T (example: DST7), based on Equation (B-1). In other words, the submatrix including the even row matrix (row direction low-order) of the 2N×2N transform matrix is set as the N×N transform matrix.

$$T[y,x]=C[2y,x] \text{ for } x=0 \ldots N-1, y=0 \ldots N-1 \quad \text{(B-1)}$$

That is, the element of row 2y, column x of the transform matrix C is set for the element (x=0 . . . N−1, y=0 . . . N−1) of each row y, column x of the N×N transform matrix T. In this way, the transform matrix of N-pt DST7 can be derived from the transform matrix of 2N-pt DST1 in the example of FIG. 20. Therefore, the transform matrix of N-pt DST7 does not have to be held in the LUT.

<Description of Equation (B-2)>

This is an example of flipping the EVEN matrix (low-order) of the 2N×2N transform matrix C to set the N×N transform matrix T. The EVEN matrix (low-order) of the 2N×2N transform matrix C (example: DST1) is flipped to derive the N×N transform matrix T (example: FlipDST7), based on Equation (B-2). In other words, the submatrix including the even row matrix (row direction low-order) of the 2N×2N transform matrix C is flipped in the horizontal direction to derive the N×N transform matrix T.

$$T[y,x]=C[2y,2N-1-x] \text{ for } x=0 \ldots N-1, y=0 \ldots N-1 \quad \text{(B-2)}$$

That is, the element of row (2y+1), column (2N−1−x) of the transform matrix C is set for the element. (x=0 . . . N−1, y=0 . . . N−1) of each row y, column x of the N×N transform matrix T. In this way, the transform matrix of N-pt FlipDST7 can be derived from the transform matrix of 2N-pt DST1 in the example of FIG. 20. Therefore, the transform matrix of N-pt FlipDST7 does not have to be held in the LUT.

<Description of Equation (B-3)>

This is an example of setting the EVEN matrix (high-order) of the 2N×2N transform matrix C as the N×N transform matrix T. The EVEN matrix (high-order) of the 2N×2N transform matrix C (example: DST1) is set as the N×N transform matrix T (example: FlipDST7), based on Equation (B-3). In other words, the submatrix including the even row matrix (row direction high-order) of the 2N×2N transform matrix C is set as the N×N transform matrix T.

$$T[y,x]=C[2y,N+x] \text{ for } x=0 \ldots N-1, y=0 \ldots N-1 \quad \text{(B-3)}$$

That is, the element of row (2y+1), column (N+x) of the transform matrix C is set for the element (x=0, . . . N−1, y=0 . . . N−1) of each row y, column x of the N×N transform matrix T. In this way, the transform matrix of N-pt FlipDST7 can be derived from the transform matrix of 2N-pt DST1 in the example of FIG. 20. Therefore, the transform matrix of N-pt FlipDST7 does not have to be held in the LUT. In addition, as compared to Equation (B-2), FlipDST7 can be derived without the flip operation.

<Description of Equation (B-4)>

This is as example of applying the ODD sign inversion to the EVEN matrix (high-order) of the 2N×2N transform matrix C to set the N×N transform matrix T. The signs of the odd-order row vectors in the EVEN matrix (high-order) of the 2N×2N transform matrix C (example: DST1) are inverted (ODD sign inversion) to derive the N×N transform matrix T (example: DCT8) based on Equation (B-4). In other words, the odd row sign inversion is applied to the submatrix including the even row matrix (row direction high-order) of the 2N×2N transform matrix C, to derive the N×N transform matrix T.

$$T[y,x]=\text{sign}*C[2y+1,N+x] \text{ for } x=0 \ldots N-1, y=0 \ldots N-1 \text{ sign}=y\%2==1?-1:1 \quad \text{(B-4)}$$

That is, a value obtained by multiplying the element of row (2y+1), column (N+x) of the transform matrix C by the sign "sign" is set for the element (x=0 . . . N−1, y=0 . . . N−1) of each row y, column x of the N×N transform matrix T. Here, the sign "sign" is a value of −1 in a case of an odd-order row vector (y %2==1) of the transform matrix C and is a value of 1 in other cases. In this way, the transform matrix of N-pt DCT8 can be derived from the transform matrix of 2N-pt DST1 in the example of FIG. 20. Therefore, the transform matrix of N-pt DCT8 does not have to be held in the LUT.

Figure 21:
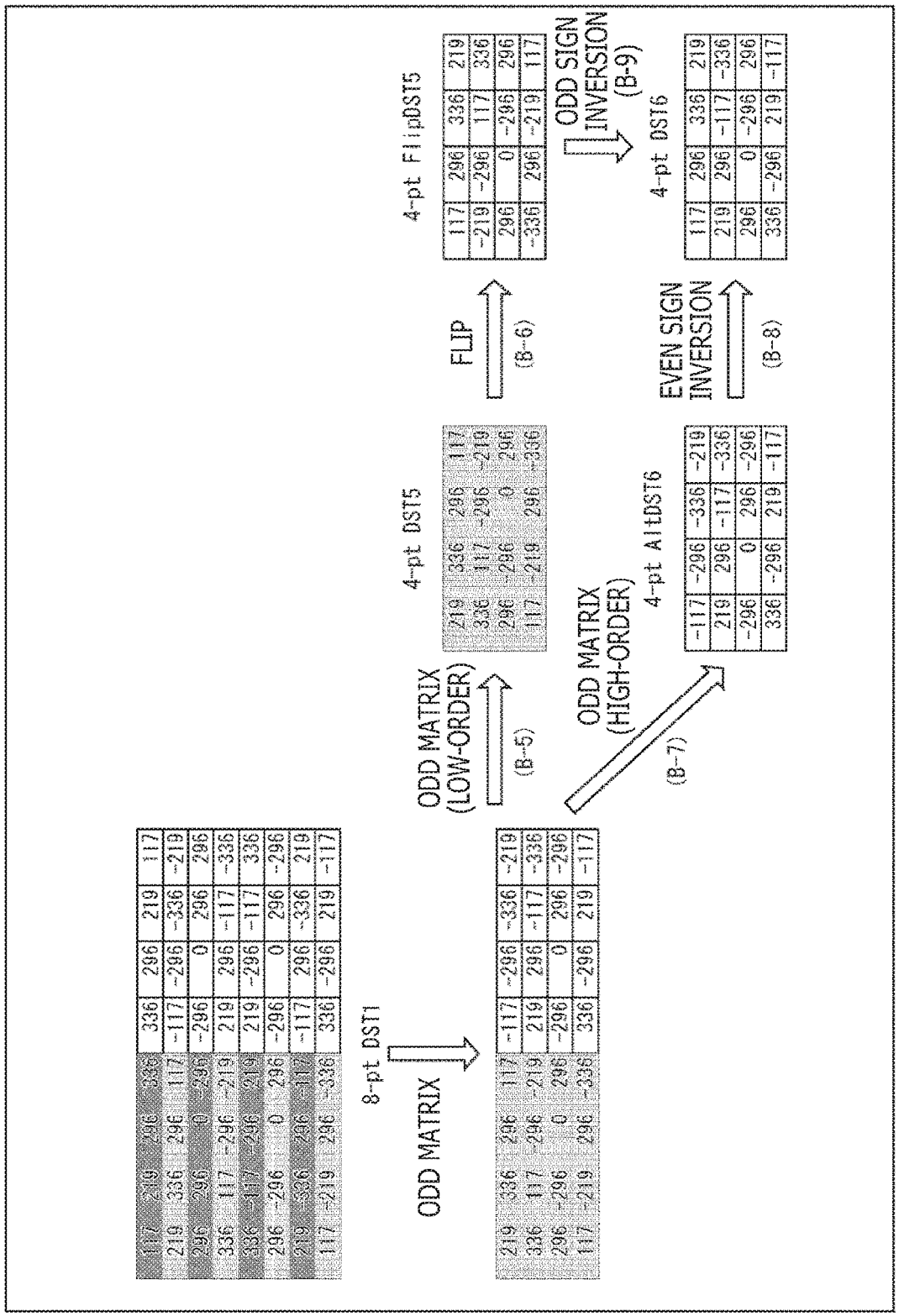
FIG. 21 is a diagram illustrating a specific example of transform matrices derived from a base transform matrix.

FIG. 21 is a diagram for describing another example of the method of deriving the N×N transform matrix T from the ODD matrix of the 2N×2N transform matrix C. FIG. 21 illustrates 8-pt DST1 as a specific example of the 2N×2N transform matrix for description. Here, the derivation processes (Equation (B-5) to (B-8) and (B-9)) will be described.

<Description of Equation (B-5)>

This is an example of setting the ODD matrix (low-order) of the 2N×2N transform matrix C as the N×N transform matrix T. The ODD matrix (low-order) of the 2N×2N transform matrix C is set as the N×N transform matrix T (example: DST5), based on Equation (B-5). In other words, the submatrix including the odd row matrix (row direction low-order) of the 2N×2N transform matrix C is set as the N×N transform matrix T.

$$T[y,x]=c[2y+1,x] \text{ for } x=0 \ldots N-1, y=0 \ldots N=1 \quad \text{(B-5)}$$

That is, the element of row (2y+1), column x of the transform matrix C is set for the element (x=0 . . . N−1, y=0 . . . N−1) of row y, column x of the N×N transform matrix T. In this way, the transform matrix of N-pt DST5 can be derived from the transform matrix of 2N-pt DST1 in the example of the figure. Therefore, the transform matrix of N-pt DST5 does not have to be held in the LUT.

<Description of Equation (B-6)>

This is an example of flipping the ODD matrix (low-order) of the 2N×2N transform matrix C to set the N×N transform matrix T. The ODD matrix (low-order) of the 2N×2N transform matrix C (example: DST1) is flipped to derive the N×N transform matrix T (example: FlipDST5), based on Equation (B-6). In other words, the submatrix including the odd row matrix (row direction low-order) of the 2N×2N transform matrix C is flipped in the horizontal direction to derive the N×N transform matrix T.

$$T[y,x]=C[2y+1,2N-1-x] \text{ for } x=0 \ldots N-1, y=0 \ldots ,N-1 \quad \text{(B-6)}$$

That is, the element of row (2y+1), column (2N1−x) of the transform matrix C is set for the element (x=0 . . . N−1, y=0 . . . N−1) of each row y, column x of the N×N transform matrix T. In this way, the transform matrix of N-pt FlipDST5 can be derived from the transform matrix of 2N-pt DST1 in the example of the figure. Therefore, the transform matrix of N-pt Eli DST5 does not have to be held in the LUT.

<Description of Equation (B-7)]

This is as example of setting the ODD matrix (high-order) of the 2N×2N transform matrix C as the N×N transform matrix T. The ODD matrix (high-order) of the 2N×2N transform matrix C (example: DST1) is set as the N×N transform matrix T (example: AltDST6), based on Equation (B-7). The transform matrix obtained by inverting the signs of the even-order row vectors of DST6 will be referred to as AltDST6 for convenience. In other words, the submatrix including the odd row matrix (row direction high-order) of the 2N×2N transform matrix C is set as the N×N transform matrix T.

$$T[y,x]=C[2y+1,N+x] \text{ for } x=0 \ldots N-1, y=0 \ldots, N-1 \quad \text{(B-7)}$$

That is, the element of row (2y+1), column (N+x) of the transform matrix C is set for the element (x=0 . . . N−1, y=0 . . . N−1) of each row y, column x of the N×N transform matrix T. In this way, the transform matrix of N-pt AltDST6 can be derived from the transform matrix of 2N-pt DST1 in the example of the figure. Therefore, the transform matrix of N-pt AltDST6 does not have to be held in the LUT.

<Description of Equation (B-8)>

This is an example of applying the EVEN sign inversion to the ODD matrix (high-order) of the 2N×2N transform matrix C to set the N×N transform matrix T. The signs of the even-order row vectors in the ODD matrix (high-order) of the 2N×2N transform matrix C (example: DST1) are inverted (EVEN sign inversion) to derive the N×N transform matrix T (example: DST6), based on Equation (B-8). In other words, the even row sign inversion is applied to the submatrix including the odd row matrix (row direction high-order) of the 2N×2N transform matrix C to derive the N×N transform matrix T.

$$T[y,x]=\text{sign}*C[2y,N+x] \text{ for } x=0 \ldots N-1, \\ y=0 \ldots, N-1 \text{ sign}=y\%2==0?-1:1 \quad \text{(B-8)}$$

That is, a value obtained by multiplying the element of row (2y+1), column (N+x) of the transform matrix C by the sign "sign" is set for the element (x=0 . . . N−1, y=0 . . . N−1) of each row y, column x of the N×N transform matrix T. Therefore, the sign "sign" is a value of −1 in a case of an even-order row vector (y %2==0) of the transform matrix C and is a value of 1 in other cases. In this way, the transform matrix of 2^(N−1)-pt DST6 can be derived from the transform matrix of 2N-pt DST1 in the example of the figure. Therefore, the transform matrix of N-pt DST6 does not have to be held in the LUT.

<Description of Equation (B-9)>

This is an example of flipping the ODD matrix (low-order) of the 2N×2N transform matrix C and applying the ODD sign inversion to derive N×N transform matrix T. The ODD matrix (low-order) of the 2N×2N transform matrix C (example: DST1) is flipped, and the signs of the odd-order row vectors of the submatrix are inverted (ODD sign inversion), to derive the N×N transform matrix T (example: DST6), based on Equation (B-9). In other words, the submatrix including the odd row matrix (row direction low-order) of the 2N×2N transform matrix C is flipped and is subjected to the odd row sign inversion, to derive the N×N transform matrix T.

$$T[y,x]=\text{sign}*C[2y+1,2N-1-x] \text{ for } x=0 \ldots N-1, y=0 \\ \ldots, N-1 \text{ sign}=y\%2==1?-1:1 \quad \text{(B-9)}$$

That is, a value obtained by multiplying the element of row (2y+1), column (2N−1+x) of the transform matrix C by the sign "sign" is set for the element (x=0 . . . N−1, y=0 . . . N−1) of each row y, column x of the N×N transform matrix T. Here, the sign "sign" is a value of −1 in a case of an odd-order row vector (y %2==1) of the transform matrix C and is a value of 1 in other cases. In this way, the transform matrix of N-pt DST6 can be derived from the transform matrix of 2N-pt DST1 in the example of the figure. Therefore, the transform matrix of N-pt DST6 does not have to be held in the LUT.

<Supplement>

In Equations (A-1) to (A-9) and Equations (B-1) to (B-9) described above, examples of a submatrix B obtained by sampling the 2N×2N transform matrix C include (a) the N×N submatrix (even row matrix (row direction low-order)) in the left half of the even row matrix including the even-order row vectors of the transform matrix C, (b) the N×N submatrix (even row matrix (row direction high-order)) in the right half of the even row matrix including the even-order row vectors of the transform matrix C, (c) the N×N submatrix (odd row matrix (row direction low-order)) in the left half of the odd row matrix including the odd-order row vectors of the transform matrix C, and (d) the N×N submatrix (odd row matrix (row direction high-order)) in the right half of the odd row matrix including the odd-order row vectors of the transform matrix C. However, the examples are not limited to these.

Other examples of the submatrix B obtained by sampling the 2N×2N transform matrix C include (e) an N×N submatrix (even column matrix (column direction low-order)) in the upper half of the even column matrix including the even-order column vectors of the transform matrix C, (f) an N×N submatrix (even column matrix (row direction low-order)) in the lower half of the even column matrix including the even-order column vectors of the transform matrix C, (g) an N×N submatrix (odd column matrix (column direction low-order)) in the upper half of the odd row matrix including the odd-order column vectors of the transform matrix C, and (h) an N×N submatrix (odd column matrix (column direction high-order)) in the lower half of the odd column matrix including the odd-order column vectors of the transform matrix C. Note that the following equations can be used to extract the submatrices of (e) to (h).

<Sampling Method of Even Column Matrix (Column Direction Low-Order)>

The 2N×2N matrix C is sampled to obtain the submatrix B including the even column matrix (column direction low-order), based on Equation (C-1).

$$B[y,x]=C[y,2x] \text{ for } x=0 \ldots N-1, y=0 \ldots, N-1 \quad \text{(C-1)}$$

That is, the element of row y, column 2x of the matrix C is set for the element (x=0 . . . N−1, of each row y, column x of the N×N matrix B.

<Sampling Method of Even Column Matrix (Column Direction High-Order)>

The 2N×2N matrix C is sampled to obtain the submatrix B including the even column matrix (column direction high-order), based on Equation (C-2).

$$B[y,x]=C[N+y,2x] \text{ for } x=0 \ldots N-1, y=0 \ldots, N-1 \quad \text{(C-2)}$$

That is, the element of row (N+y), column 2x of the matrix C is set for the element (x=0 . . . N−1, y=0 . . . N−1) of each row y, column x of the N×N matrix B.

<Sampling Method of Odd Column Matrix (Column Direction Low-Order)

The 2N×2N matrix C is sampled to obtain the submatrix B including the odd column matrix (column direction low-order), based on Equation (C-3).

$$B[y,x]=C[y,2x+1] \text{ for } x=0 \ldots N-1, y=0 \ldots, N-1 \quad \text{(C-3)}$$

That is, the element of row y, column (2x+1) of the matrix C is set for the element (x=0 . . . N−1, y=0 . . . N−1) of each row y, column x of the N×N matrix B.

<Sampling Method of Odd Column Matrix (Column Direction High-Order)>

The 2N×2N matrix C is sampled to obtain the submatrix B including the odd column matrix (column direction low-order), based on Equation (C-4).

$$B[y,x]=C[N+y,2x+1] \text{ for } x=0 \ldots N-1, y=0 \ldots, N-1 \quad \text{(C-4)}$$

That is, the element of row (N+y), column (2x+1) of the matrix C is set for the element (x=0 . . . N−1, y=0 . . . N−1) of each row (N+y), column x of the N×N matrix B.

Specific Examples

Hereinafter, other examples of the transform matrix T of 4-pt obtained from the integer-approximated transform matrix C of 8-pt DST3 will be described. For example, the integer-approximated transform matrix of 8-pt DST3 is provided by the following two-dimensional array (Equation (D-1)).

$$C=[[71,139,201,256,301,334,355,256],[201,334,355,\\256,71,-139,-301,-256],[301,334,71,-256,-\\355,-139,201,256],[355,139,-301,-256,201,\\334,-71,-256],[355,-139,-301,256,201,-334,-\\71,256],[301,-334,71,256,-355,139,201,-256]\\[201,-334,355,-256,71,139,-301,256],[71,-139,\\201,-256,301,-334,355,-256]]$$ (D-1)

<Example of Even Column Matrix (Column Direction Low-Order)>

The even column matrix (column direction low-order) is taken out from the transform matrix C based on Equation (C-1), and an integer-approximated transform matrix T of 4-pt DST4 (Equation (D-2)) is obtained.

$$T = [[71, 201, 301, 355], [201, 355, 71, -301],\\ [301, 71, -355, 201], [355, -301, 201, -71]]$$ (D-2)

<Example of Odd Column Matrix (Column Direction Low-Order)>

In addition, the odd column matrix (column direction low-order) is taken out from the transform matrix C, based on Equation (C-3), and an integer-approximated transform matrix T of 4-pt AltFlipDCT3 (Equation (D-3)) is obtained. The transform matrix obtained by flipping the transform matrix of DCT3 in the horizontal direction and inverting the signs of the row vectors of the odd rows will be referred to as AltFlipDCT3 for convenience. That is, the transform matrix of AltFlipDCT3 can be flipped in the horizontal direction, and the odd row sign inversion can be applied to obtain the transform matrix of DCT3 (Equation (D-3)). Furthermore, (D-3) can be transposed to obtain a transform matrix of DCT2.

$$T = [[139, 256, 334, 256], [334, 256, -139, -256],\\ [334, -256, -139, 256], [139, -256, 334, -256]]$$ (D-3)

$$T = [[256, 334, 256, 139], [256, 139, -256, -334],\\ [256, -139, -256, 334], [256, -334, 256, -139]]$$ (D-4)

Similarly, the flip in the horizontal direction, the flip in the vertical direction, the transposition, and the sign inversion (even row sign inversion, odd row sign inversion, even column sign inversion, and odd column sign inversion) can appropriately be applied to the even column matrix (column direction high-order) obtained by Equation (C-2) or the odd column matrix (column direction high-order) obtained by Equation (C-4), in addition to the submatrices, to thereby obtain transform matrices of DST4, DCT4, DCT3, and DCT2.

<5. Transform Matrix Derivation Section>

Figure 22:
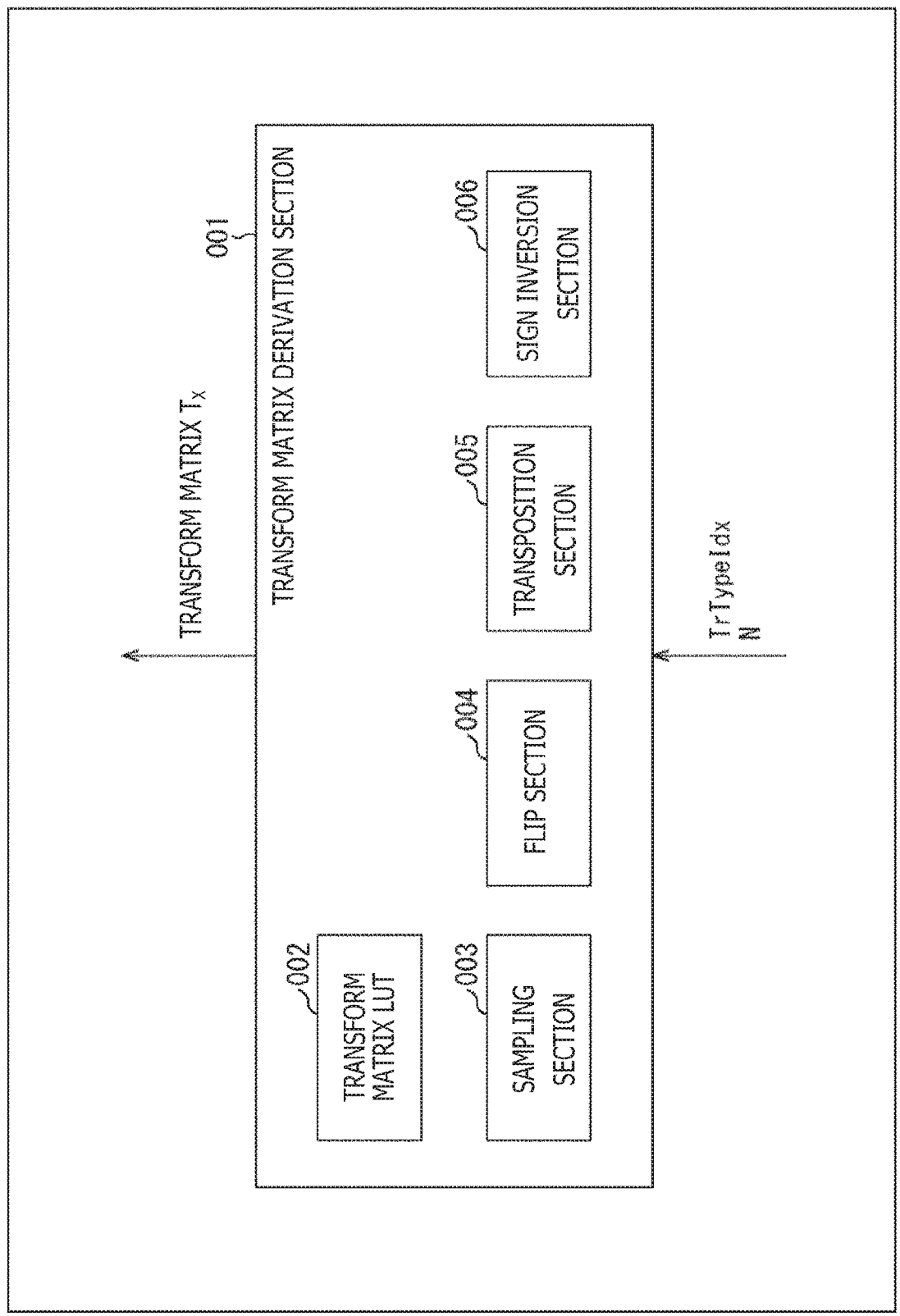
FIG. 22 is a block diagram illustrating a main configuration example of a transform matrix derivation section.

A transform matrix derivation section 001 that derives a transform matrix of N-pt from a submatrix of a transform matrix of 2N-pt will be described. FIG. 22 illustrates a block diagram of the transform matrix derivation section 001, and the transform matrix derivation section 001 further includes a transform matrix LUT 002, a sampling section 003, a flip section 004, a transposition section 005, and a sign inversion section 006. Note that although arrows indicating transfer of data are not illustrated in FIG. 22, the transform matrix derivation section 001 can transfer any data between any processing sections (processing blocks).

Once a transform type identifier trTypeIdx of the one-dimensional orthogonal transform and a size N of the transform block are designated, the transform matrix derivation section 001 derives and outputs a transform matrix Tx corresponding to them. The sampling section 003 samples a 2N×2N base transform matrix to derive a submatrix that is an EVEN matrix (low-order), an EVEN matrix (high-order), an ODD matrix (low-order), or an ODD matrix (high-order). The flip section 004 outputs a transform matrix in which the input transform matrix is flipped, for example, in the horizontal direction. The transposition section 005 outputs a transposed matrix of the input transform matrix. The sign inversion section 006 outputs a transform matrix in which the EVEN sign inversion or the ODD sign inversion is applied to the input transform matrix.

Once the transform type identifier trTypeIdx of the one-dimensional orthogonal transform and the size N of the transform block are designated, the transform matrix LUT 002 selects and outputs a transform matrix corresponding to them. For example, the transform matrix LUT 002 refers to a table of FIG. 23 and selects a base transform matrix C corresponding to the transform type identifier trTypeIdx and the size N.

The transform matrix derivation section 001 executes a process corresponding to each block in a derivation routine of the transform type corresponding to the transform type identifier trTypeIdx. That is, the transform matrix derivation section 001 reads out the base transform matrix from the transform matrix LUT 002 and appropriately uses a method of one of derivation examples illustrated in the table of FIG. 23 to derive the transform matrix Tx to be derived, from the base transform matrix, through the sampling section 003, the flip section 004, the transposition section 005, and the sign inversion section 006. The transform matrix derivation section 001 then outputs the transform matrix Tx to the outside of the transform matrix derivation section 001. In the example of the table of FIG. 23, DCT2, DST7, DCT8, DST4, DCT4, or DST1 can be selected as a one-dimensional orthogonal transform. Note that the table is not limited to this, and one of DCT2, DST4, and DCT4 may be selected. Alternatively, the transform type may be selected from DCT2, DST1, DST7, and DCT8. The configuration of the transform type may be changed within a possible range. For example, DCT8 may be replaced with FlipDST7, and DST4 may be replaced with FlipDCT4 or AltDST4.

For example, in a case of trTypeIdx==0 (second stage from the top) in the table of FIG. 23, the transform matrix derivation section 001 selects a 2N×2N DCT2 transform matrix $C_{2N, DCT2}$ as the base transform matrix C. Further, the transform matrix derivation section 001 sets the EVEN matrix (low-order) of the base transform matrix C as the transform matrix Tx to be derived through the sampling section 003, based on the derivation formula indicated in Equation (A-1).

Further, in a case of trTypeIdx==1 (third stage from the top) in the table of FIG. 23, the transform matrix derivation section 001 selects a 2N×2N DST1 transform matrix $C_{2N, DST1}$ as the base transform matrix C. In addition, the transform matrix derivation section 001 sets the EVEN matrix (low-order) of the base transform matrix C, as the transform matrix Tx to be derived, through the sampling section 003, based on the derivation formula indicated in Equation (B-1).

Further, in a case of trTypeIdx==2 (fourth stage from the top) in the table of FIG. 23, the transform matrix derivation section 001 selects a 2N×2N DST1 transform matrix $C_{2N,\ DST1}$ as the base transform matrix C. In addition, based on the derivation formula indicated in Equation (B-4), the transform derivation section 001 takes out the EVEN matrix (high-order) of the base transform matrix C through the sampling section 003 and flips the submatrix in the horizontal direction through the flip section 004. The transform derivation section 001 further applies the ODD sign inversion to the submatrix through the sign inversion section 006 to thereby derive the transform matrix Tx to be derived.

Further, is a case of trTypeIdx==3 (fifth stage from the top) in the table of FIG. 23, the transform matrix derivation section 001 selects a 2N×2N DCT2 transform matrix $C_{2N,\ DCT2}$ as the base transform matrix C. In addition, the transform matrix derivation section 001 takes out the ODD matrix (high-order) of the base transform matrix C through the sampling section 003 and applies the EVEN sign inversion to the submatrix through the sign inversion section 006 to thereby derive the transform matrix Tx to be derived, based on the derivation formula indicated in Equation (A-8).

Further, in a case of trTypeIdx==4 (sixth stage from the top) in the table of FIG. 23, the transform matrix derivation section 001 selects a 2N×2N DCT2 transform matrix $C_{2N,\ DCT2}$ as the base transform matrix C. In addition, the transform matrix derivation section 001 takes out the ODD matrix (low-order) of the base transform matrix C through the sampling section 003 and sets the submatrix as the transform matrix Tx to be derived, based on the derivation formula indicated in Equation (A-5).

Further, in a case of trTypeIdx==5 (seventh stage from the top) in the table of FIG. 23, the transform matrix derivation section 001 selects an N×N DST1 transform matrix $C_{N,\ DST1}$ as the base transform matrix C and sets the base transform matrix C as the transform matrix Tx to be derived.

The transform matrix derivation section 001 configured in this way can realize each derivation example is the table illustrated in the table of FIG. 23.

Figure 24:
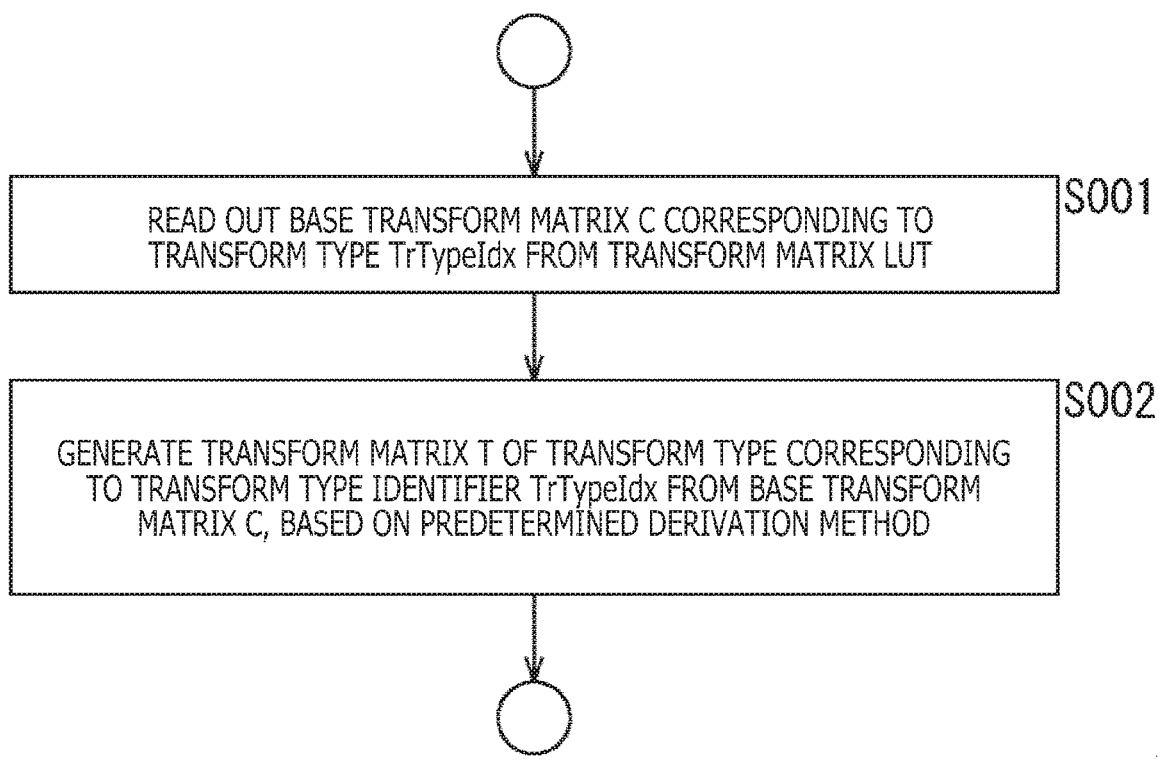
FIG. 24 is a flowchart illustrating an example of a flow of a transform matrix derivation process.

An operation of the transform matrix derivation section 001 will be described with reference to FIG. 24. In step S001, the transform matrix derivation section 001 reads out the base transform matrix C corresponding to the transform type trTypeIdx from the transform matrix LUT 002. In step S002, the transform matrix derivation section 001 generates the transform matrix T of the transform type corresponding to the transform type identifier trTypeIdx from the base transform matrix C illustrated in the table of FIG. 23, based on a predetermined derivation method.

<6. Advantageous Effect>

In FIG. 25, A is an example of combining the following operation (sampling+flip, sign inversion) and a method of generating the entire matrix from the submatrix, to estimate the necessary memory size of the transform matrix to be held in the LUT in a case where, for example, the transform types include six types {DCT2, DST7, DCT8, DST4, DCT4, DST1}.

64-pt DCT2→Generated by flipping the left half matrix of 64-pt DCT2 and inverting the signs.
64-pt DST4→Generated by horizontally/vertically flipping (rotating 180 degrees) the upper half matrix of 64-pt DST4.
64-pt DCT4→Generated by flipping 64-pt DST4 and inverting the signs.
64-pt DST7→Generated by flipping an upper right triangular matrix of 64-pt DST7 along a diagonal axis from the lower right to the lower left+inverting the signs.
64-pt DCT8→Generated by flipping 64-pt DST7 and inverting the signs.
N-pt DST1→The entire matrix is generated from an upper left submatrix of N-pt DST1.
32/16/8/4-pt DCT2→Generated from 2N-pt DCT2 (A-1). (obtained by recursively sampling 64-pt DCT2)
32/16/8/4-pt DST4→Generated from 2N-pt DCT2 (A-8). (obtained by recursively sampling 64-pt DCT2)
32/16/8/4-pt DCT4→Generated from 2N-pt DCT2 (A-5). (obtained by recursively sampling 64-pt DCT2)
32/16/8/4-pt DST7→Generated from 2N-pt DST1 (B-1).
32/16/8/4-pt DCT8→Generated from 2N-pt DST1 (B-4).

In this case, the LUT size can be reduced by approximately 80% from 40 KB to 7.9 KB in A of FIG. 25 compared to the comparison target illustrated in B of FIG. 25 (case of holding all the transform matrices in the LUT).

<7. Sharing of Process and Implementation Cost>

Figure 26:
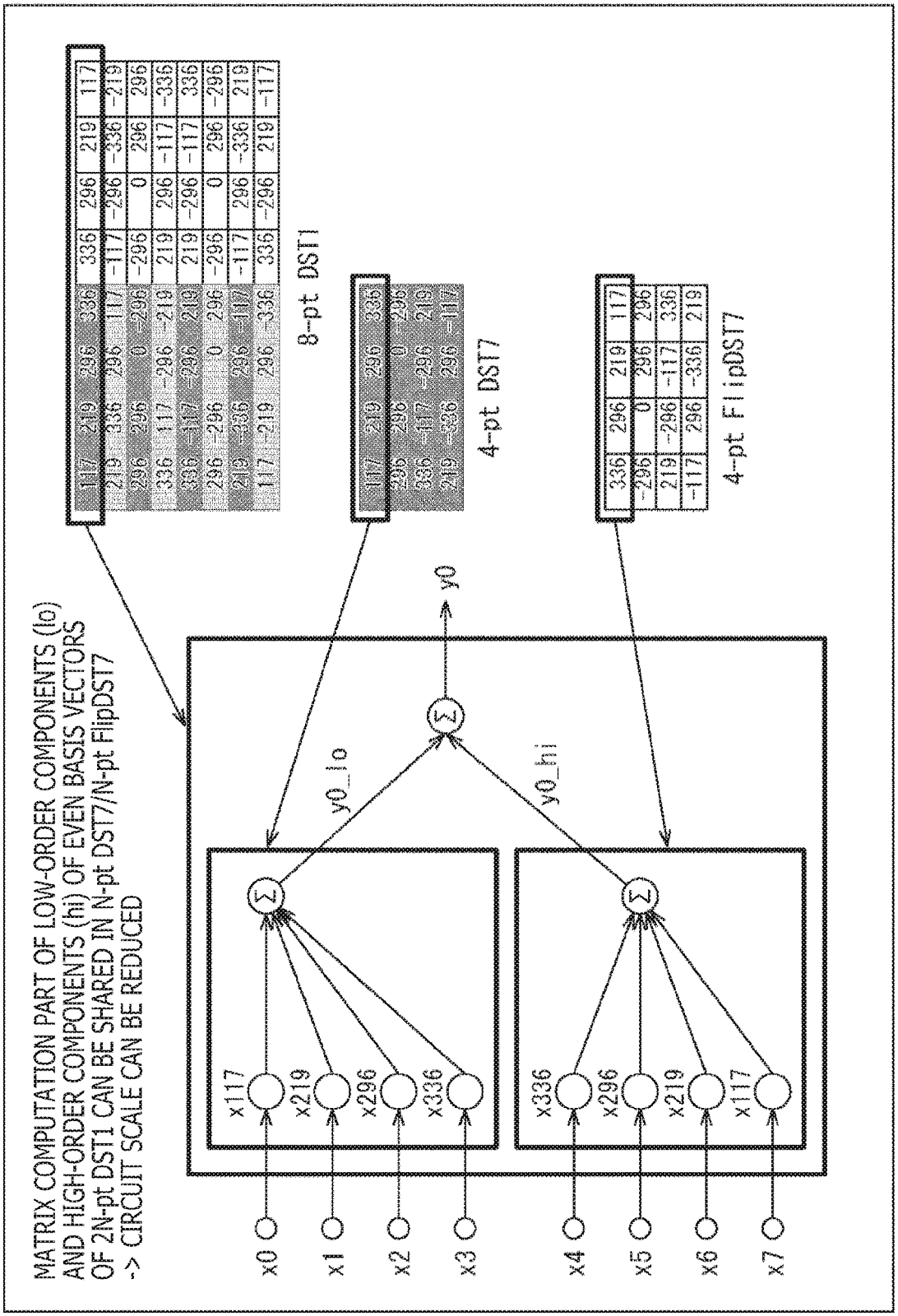
FIG. 26 is a diagram illustrating an example of sharing matrix computation.

FIG. 26 illustrates an example in which focus is placed on the similarity between the transform matrices in different sizes described in the present embodiment and part. (low-order components (lo), high-order components (hi)) of the matrix computation of the row vector (8-pt DST1 in FIG. 26) in the first size (2N) and 2N input signals can be shared in the matrix computation of the row vectors (4-pt DST7 and 4-pt FlipDST7 in FIG. 26) in the second size (N) and N input signals.

FIG. 26 illustrates a signal flow graph (SFG) of the matrix computation of 8-pt DST1 and eight input signals. In FIG. 26, the matrix computation of input signals x0 to x3 and the even-order row vectors (low-order) of 8-pt DST1 matches the matrix computation of 4-pt DST7, and the matrix computation of input signals x4 to x7 and the 8-pt DST1 even-order row vectors (high-order) matches the matrix computation of FlipDST7.

That is, not only the size of the LUT for holding the transform matrix can be reduced, but also part of the matrix computation part of the 2N×2N transform matrix can be shared in the matrix computation part of the N×N transform matrix. Therefore, the circuit scale can be reduced.

<8. Embodiment in Encoding and Orthogonal Transform>
<Image Encoding Apparatus>

Next, a configuration of deriving the transform matrix will be described. FIG. 27 is a block diagram illustrating an example of the configuration of an image encoding apparatus that is a mode of an image processing apparatus according to the present technique. An image encoding apparatus 100 illustrated in FIG. 27 is an apparatus that encodes image data of moving images. For example, the image encoding apparatus 100 is provided with the technique described in NPL 1, NPL 3, or NPL 4, and the image encoding apparatus 100 uses a method compliant with the standard described in one of the pieces of literature to encode the image data of the moving images.

Note that FIG. 27 illustrates main processing sections, flows of data, and the like, and FIG. 27 may not illustrate everything. That is, in the image encoding apparatus 100, there may be processing sections not illustrated as blocks in FIG. 27, and there may be flows of processes and data not indicated by arrows or the like in FIG. 27. This similarly applies to other drawings describing the processing sections and the like in the image encoding apparatus 100.

As illustrated in FIG. 27, the image encoding apparatus 100 includes a control section 101, a rearrangement buffer 111, a computation section 112, an orthogonal transform section 113, a quantization section 114, an encoding section 115, an accumulation buffer 116, an inverse quantization section 117, an inverse orthogonal transform section 118, a computation section 119, as in-loop filter section 120, a frame memory 121, a prediction section 122, and a rate control section 123.

<Control Section>

The control section 101 divides moving image data held in the rearrangement buffer 111 into blocks in a section of processing (such as CU, PU, and transform block), based on the block size of the section of processing designated from the outside or designated in advance. In addition, the control section 101 determines encoding parameters (such as header information Hinfo, prediction mode information Pinfo, transform information Tinfo, and filter information Finfo) to be supplied to each block, based on, for example, RDO (Rate-Distortion Optimization).

The details of the encoding parameters will be described later. Once the control section 101 determines the encoding parameters as described above, the control section 101 supplies the encoding parameters to each block. Specifically, the encoding parameters are supplied as follows.

The header information Hinfo is supplied to each block. The prediction mode information Pinfo is supplied to the encoding section 115 and the prediction section 122. The transform information Tinfo is supplied to the encoding section 115, the orthogonal transform section 113, the quantization section 114, the inverse quantization section 117, and the inverse orthogonal transform section 118. The filter information Finfo is supplied to the in-loop filter section 120.

<Rearrangement Buffer>

Each field (input image) of the moving image data is input to the image encoding apparatus 100 in the order of reproduction (order of display). The rearrangement buffer 111 acquires the input images in the order of reproduction (order of display) and holds (stores) the input images. The rearrangement buffer 111 rearranges the input images into the order of encoding (order of decoding) or divides the input images into blocks in the section of processing, based on the control of the control section 101. The rearrangement, buffer 111 supplies the processed input images to the computation section 112. In addition, the rearrangement buffer 111 also supplies the input images (original images) to the prediction section 122 and the in-loop filter section 120.

<Computation Section>

The computation section 112 receives an image I corresponding to the blocks in the section of processing and a predicted image P supplied from the prediction section 122. The computation section 112 subtracts the predicted image P from the image I as indicated in the following Equation (6), to derive a predicted residual D, and supplies the predicted residual D to the orthogonal transform section 113.

[Math. 4]

$$D = I - P \qquad (6)$$

<Orthogonal Transform Section>

The orthogonal transform section 113 receives the predicted residual D supplied from the computation section 112 and the transform information Tinfo supplied from the control section 101. The orthogonal transform section 113 applies an orthogonal transform to the predicted residual D, based on the transform information Tinfo, to derive a transform coefficient Coeff. The orthogonal transform section 113 supplies the obtained transform coefficient Coeff to the quantization section 114.

<Quantization Section>

The quantization section 114 receives the transform coefficient Coeff supplied from the orthogonal transform section 113 and the transform information Tinfo supplied from the control section 101 and scales (quantizes) the transform coefficient Coeff on the basis of the transform information Tinfo. Note that the rate of the quantization is controlled by the rate control section 123. The quantization section 114 supplies the quantized transform coefficient obtained by the quantization, that is, a quantization transform coefficient level "level," to the encoding section 115 and the inverse quantization section 117.

<Encoding Section>

The encoding section 115 receives the quantization transform coefficient level "level" supplied from the quantization section 114, the various encoding parameters (such as header information Hinfo, prediction mode information Pinto, transform information Tinfo, and filter information Finfo) supplied from the control section 101, information regarding a filter, such as a filter coefficient, supplied from the in-loop filter section 120, and information regarding an optimal prediction mode supplied from the prediction section 122. The encoding section 115 performs variable-length encoding (for example, arithmetic coding) of the quantization transform coefficient level "level" to generate a bit string (encoded data).

In addition, the encoding section 115 derives residual information Rinfo from the quantization transform coefficient level "level" and encodes the residual information Rinfo to generate a bit string.

Moreover, the encoding section 115 includes the information regarding the filter supplied from the in-loop filter section 120 in the filter information Finfo and includes the information regarding the optimal prediction mode supplied from the prediction section 122 in the prediction mode information Pinto. The encoding section 115 then encodes the various encoding parameters (such as header information Hinfo, prediction mode information Pinfo, transform information Tinfo, and filter information Finfo) and generates bit strings.

In addition, the encoding section 115 multiplexes the bit strings of various types of information generated in this way, to generate encoded data. The encoding section 115 supplies the encoded data to the accumulation buffer 116.

<Accumulation Buffer>

The accumulation buffer 116 temporarily holds the encoded data obtained by the encoding section 115. The accumulation buffer 116 outputs the held encoded data as, for example, a bitstream or the like to the outside of the image encoding apparatus 100 at a predetermined timing. For example, the encoded data is transmitted to the decoding side through any recording medium, any transmission medium, any information processing apparatus or the like. That is, the accumulation buffer 116 also serves as a transmission section that transmits the encoded data (bitstream).

<Inverse Quantization Section>

The inverse quantization section 117 executes a process regarding inverse quantization. For example, the inverse quantization section 117 receives the quantization transform coefficient level "level" supplied from the quantization section 114 and the transform information Tinfo supplied from the control section 101 and performs scaling (inverse quantization) on the value of the quantization transform coefficient level "level," based on the transform information Tinfo. Note that the inverse quantization is as opposite process of the quantization executed by the quantization section 114. The inverse quantization section 117 supplies a transform coefficient Coeff_IQ obtained by the inverse quantization to the inverse orthogonal transform section 118.

<Inverse Orthogonal Transform Section>

The inverse orthogonal transform section 118 executes a process regarding an inverse orthogonal transform. For example, the inverse orthogonal transform section 118 receives the transform coefficient Coeff_IQ supplied from the inverse quantization section 117 and the transform information Tinfo supplied from the control section 101 and applies an inverse orthogonal transform to the transform coefficient Coeff_IQ, based on the transform information Tinfo, to derive a predicted residual D'. Note that the inverse orthogonal transform is as opposite process of the orthogonal transform performed by the orthogonal transform section 113. The inverse orthogonal transform section 118 supplies the predicted residual D' obtained by such inverse orthogonal transform to the computation section 119. Note that the inverse orthogonal transform section 118 is similar to an inverse orthogonal transform section (described later) on the decoding side, and the description of the decoding side (given later) can be applied to the inverse orthogonal transform section 118.

<Computation Section>

The computation section 119 receives the predicted residual D' supplied from the inverse orthogonal transform section 118 and the predicted image P supplied from the prediction section 122. The computation section 119 adds the predicted residual D' to the predicted image P corresponding to the predicted residual D', to derive a local decoded image Rlocal. The computation section 119 supplies the derived local decoded image Rlocal to the in-loop filter section 120 and the frame memory 121.

<In-Loop Filter Section>

The in-loop filter section 120 executes a process regarding an in-loop filter process. For example, the in-loop filter section 120 receives the local decoded image Rlocal supplied from the computation section 119, the filter information Finfo supplied from the control section 101, and the input image (original image) supplied from the rearrangement buffer 111. Note that the information to be input to the in-loop filter section 120 may be selected freely, and information other than the abovementioned information may be input. For example, information, such as a prediction mode, motion information, a coding amount target value, a quantization parameter QP, a picture type, and blocks (such as CU and CTU), may be input to the in-loop filter section 120 as necessary.

The in-loop filter section 120 appropriately applies a filter process to the local decoded image Rlocal, based on the filter information Finfo. The in-loop filter section 120 also uses the input image (original image) and other input information in the filter process as necessary.

For example, the in-loop filter section 120 sequentially applies four in-loop filters including a bilateral filter, a deblocking filter (DBF (DeBlocking Filter)), an adaptive offset filter (SAO (Sample Adaptive Offset)), and an adaptive loop filter (ALF (Adaptive Loop Filter)) as described in NPL 1. Note that the filters to be applied and the order of applying the filters are optional and can be selected as appropriate.

Obviously, the filter process to be executed by the in-loop filter section 120 can be selected freely, and the filter process is not limited to the example. For example, the in-loop filter section 120 may apply a Wiener filter or the like.

The in-loop filter section 120 supplies the filtered local decoded image Rlocal to the frame memory 121. Note that in a case of transmitting, for example, information regarding the filter, such as a filter coefficient, to the decoding side, the in-loop filter section 120 supplies the information regarding the filter to the encoding section 115.

<Frame Memory>

The frame memory 121 executes a process regarding storage of data related to an image. For example, the frame memory 121 receives the local decoded image Rlocal supplied from the computation section 119 or the filtered local decoded image Rlocal supplied from the in-loop filter section 120 and holds (stores) the local decoded image Rlocal. In addition, the frame memory 121 uses the local decoded image Rlocal to reconstruct the decoded image R of each picture section and holds the decoded image R (stores the decoded image R in a buffer of the frame memory 121). The frame memory 121 supplies the decoded image R (or part of the decoded image R) to the prediction section 122 in response to a request from the prediction section 122.

<Prediction Section>

The prediction section 122 executes a process regarding generation of a predicted image. For example, the prediction section 122 receives the prediction mode information Pinfo supplied from the control section 101, the input image (original image) supplied from the rearrangement buffer 111, and the decoded image R (or part of the decoded image R) read out from the frame memory 121. The prediction section 122 uses the prediction mode information Pinfo and the input image (original image) to execute a prediction process, such as inter prediction and intra prediction, and refers to the decoded image R as a reference image, to perform prediction. The prediction section 122 executes a motion compensation process based on the prediction result, to generate a predicted image P. The prediction section 122 supplies the generated predicted image P to the computation section 112 and the computation section 119. In addition, the prediction section 122 supplies information regarding a prediction mode selected in the process, that is, an optimal prediction mode, to the encoding section 115 as necessary.

<Rate Control Section>

The rate control section 123 executes a process regarding rate control. For example, the rate control section 123 controls the rate of the quantization operation of the quantization section 114 to prevent an overflow or an underflow, based on the amount of encoding of the encoded data accumulated in the accumulation buffer 16.

In the image encoding apparats 100 configured in this way, the orthogonal transform section 113 serves as a derivation section and an orthogonal transform section to execute the process to which the present technique is applied. In addition, the encoding section 115 serves as an encoding section to execute the process to which the present technique is applied. Further, the inverse orthogonal transform section 118 serves as an inverse orthogonal transform section and a derivation section to execute the process to which the present technique is applied. Therefore, the image encoding apparatus 100 can suppress the increase in the memory capacity necessary for the orthogonal transform and the inverse orthogonal transform.

<Details of Orthogonal Transform Section>

Figure 28:
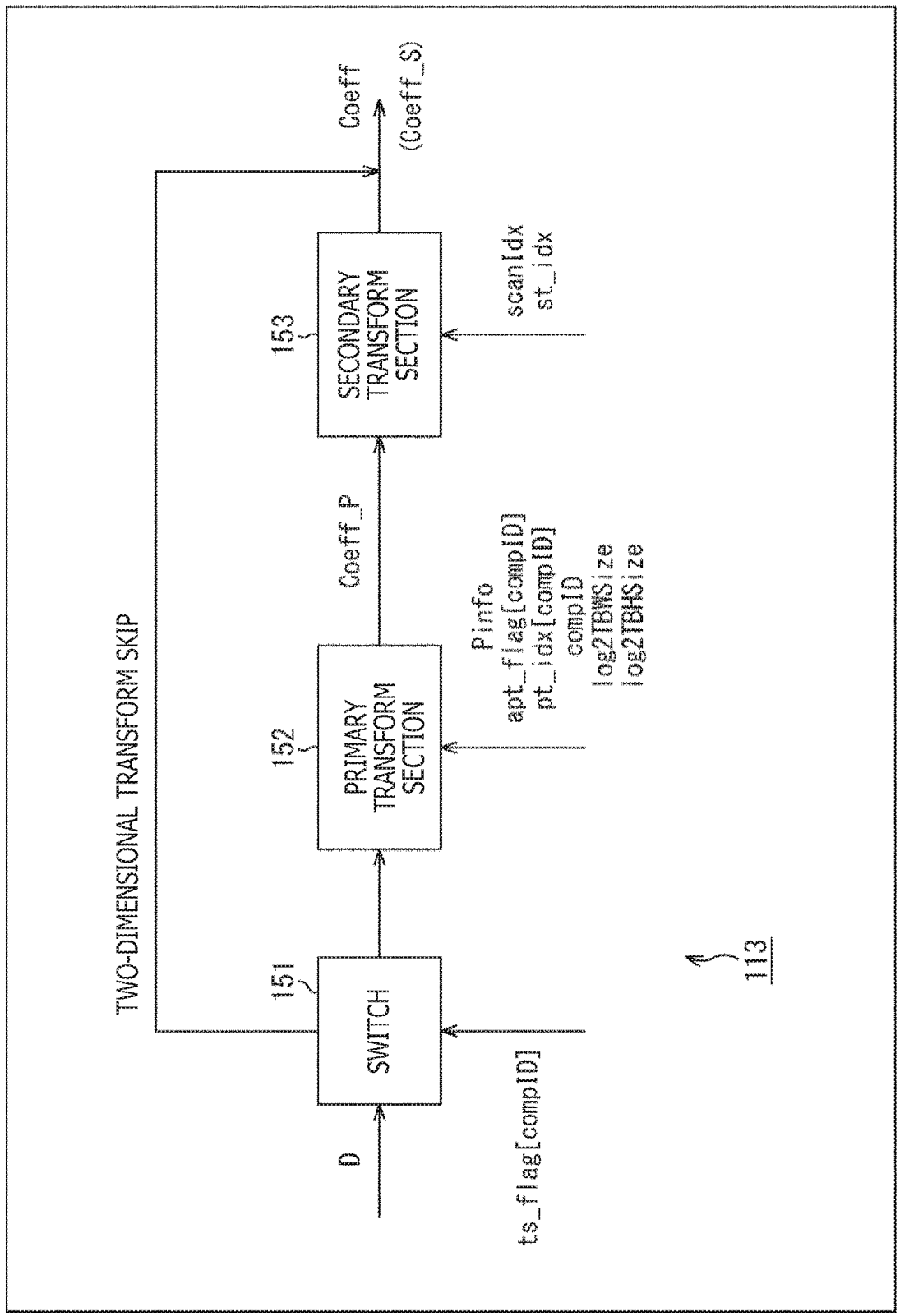
FIG. 28 is a block diagram illustrating a main configuration example of an orthogonal transform section.

FIG. 28 is a block diagram illustrating a main configuration example of the orthogonal transform section 113. As illustrated in FIG. 28, the orthogonal transform section 113 includes a switch 151, a primary transform section 152, and a secondary transform section 153.

The switch 151 receives the predicted residual D and a transform skip flag ts_flag[compID] corresponding to a component identifier compID, and in a case where the value of the transform skip flag ts_flag[compID] is NO_TS(=0) (in a case where the transform skip is not to be applied), the switch 151 supplies the predicted residual D to the primary transform section 152. Moreover, in a case where the value of the transform skip flag ts_flag[compID] is 2D_TS (=1) (in a case where the two-dimensional transform skip is to be applied), the switch 151 skips the primary transform section 152 and the secondary transform section 153 and outputs the predicted residual D as a transform coefficient Coeff to the outside of the orthogonal transform section 113 (supplies the predicted residual D as a transform coefficient Coeff to the quantization section 114).

The primary transform section 152 executes a process regarding a primary transform that is, for example, a predetermined transform process such as an orthogonal transform. For example, the primary transform section 152 receives the component identifier compID, the adaptive primary transform flag apt_flag[compID] of the component identifier compID, the primary transform identifier pt_idx [compID] of the component identifier compID, the prediction mode information PInfo, the size of the transform block (logarithm log 2TBWSize of width, logarithm log 2TBHSize of height), and the predicted residual D. Note that the width TBWSize of the transform block will also be referred to as TBWidth, and the logarithm will also be referred to as log 2TBWidth. Similarly, the height TBHSize of the transform block will also be referred to as TBHeight, and the logarithm will also be referred to as log 2TBHeight.

The primary transform section 152 refers to the prediction mode information PInfo, the component identifier compID, the adaptive primary transform flag apt_flag[compID] of the component identifier compID, and the primary transform identifier pt_idx[compID] of the component identifier compID and selects the transform type TrTypeH of the primary horizontal transform (and the primary horizontal transform type identifier TrTypeIdxH indicating the transform type) and the transform type TrTypeV of the primary vertical transform (and the primary vertical transform type identifier TrTypeIdxV indicating the transform type) corresponding to the component identifier compID.

In addition, the primary transform section 152 applies, to the predicted residual D, a primary horizontal transform defined by the primary horizontal transform type identifier TrTypeIdxH (or the primary horizontal transform type TrTypeH) and the width log 2TBWSize of the transform block and a primary vertical transform defined by the primary vertical transform type identifier TrTypeIdxV (or the primary vertical transform type TrTypeV) and the height log 2TBHSize of the transform block, to derive a transform coefficient Coeff_P after primary transform. The primary horizontal transform is a one-dimensional orthogonal transform in the horizontal direction, and the primary vertical transform is a one-dimensional orthogonal transform in the vertical direction.

The primary transform section 152 supplies the derived transform coefficient Coeff_P to the secondary transform section 153.

The secondary transform section 153 executes a process regarding a secondary transform that is, for example, a predetermined transform process such as an orthogonal transform. For example, the secondary transform section 153 receives a secondary transform identifier st_idx, a scan identifier scanIdx indicating the scan method of the transform coefficient, and the transform coefficient Coeff_P. The secondary transform section 153 applies a secondary transform to the transform coefficient Coeff_P, based on the secondary transform identifier st_idx and the scan identifier scanIdx, and derives a transform coefficient Coeff_S after secondary transform.

More specifically, in a case where the secondary transform identifier st_idx indicates that the second transform is to be applied (st_idx>0), the secondary transform section 153 applies, to the transform coefficient Coeff_P, a process of the secondary transform corresponding to the secondary transform identifier st_idx and derives the transform coefficient Coeff_S after secondary transform.

The secondary transform section 153 outputs the secondary transform coefficient Coeff_S as a transform coefficient Coeff to the outside of the orthogonal transform section 113 (supplies the transform coefficient Coeff to the quantization section 114).

Further, in a case where the secondary transform identifier st_idx indicates that the secondary transform is not to be applied (st_idx==0), the secondary transform section 153 skips the secondary transform and outputs the transform coefficient Coeff_P obtained by the primary transform, as a transform coefficient Coeff (transform coefficient Coeff_S obtained by the secondary transform), to the outside of the orthogonal transform section 113 (supplies the transform coefficient Coeff to the quantization section 114).

In the orthogonal transform section 113 configured in this way, the primary transform section 152 serves as a derivation section and an orthogonal transform section, to execute the process according to the present technique. That is, the derivation section uses a first transform matrix to derive a second transform matrix, and the orthogonal transform section uses the second transform matrix derived by the derivation section to apply a primary transform to a predicted residual. Therefore, the increase in the memory capacity necessary for the primary transform can be suppressed.

Note that as described above, the primary transform section 152 performs the primary horizontal transform and the primary vertical transform in the primary transform. That is, the derivation section derives a second transform matrix for one-dimensional orthogonal transform in the horizontal direction and a second transform matrix for one-dimensional orthogonal transform in the vertical direction, and in a primary transform, the orthogonal transform section uses the second transform matrix for one-dimensional orthogonal transform in the horizontal direction derived by the derivation section, to perform a one-dimensional orthogonal transform in the horizontal direction, and further uses the second transform matrix for one-dimensional orthogonal transform in the vertical direction derived by the derivation section, to perform a one-dimensional orthogonal transform in the vertical direction. Therefore, this can suppress the increase in the memory capacity necessary for the primary transform in which the one-dimensional orthogonal transform in the horizontal direction and the one-dimensional orthogonal transform in the vertical direction are performed.

<Flow of Image Encoding Process>

Next, flows of processes executed by the image encoding apparatus 100 will be described. First, an example of a flow of an image encoding process will be described with reference to a flowchart of FIG. 29.

Once the image encoding process is started, the rearrangement buffer 111 rearranges the order of the frames of the moving image data controlled and input the control section 101, from the order of display to the order of encoding in step S101.

In step S102, the control section 101 sets the section of processing for the input image held by the rearrangement buffer 111 (divides the input image into blocks).

In step S103, the control section 101 determines (sets) the encoding parameters of the input image held by the rearrangement buffer 111.

In step S104, the prediction section 122 executes the prediction process to generate the predicted image and the like of the optimal prediction mode. For example, in the prediction process, the prediction section 122 performs the intra prediction to generate the predicted image and the like of the optimal intra prediction mode and performs the inter prediction to generate the predicted image and the like of the optimal inter prediction mode. The prediction section 122 selects the optimal prediction mode from them based on the cost function value and the like.

In step S105, the computation section 112 computes the difference between the input image and the predicted image of the optimal mode selected in the prediction process of step S104. That is, the computation section 112 generates the predicted residual D of the input image and the predicted image. The amount of data of the predicted residual D obtained in such way is reduced compared to the original image data. Therefore, the amount of data can be compressed compared to the case in which the image is encoded as it is.

In step S106, the orthogonal transform section 113 applies the orthogonal transform process to the predicted residual D generated in the process of step S105, to derive the transform coefficient Coeff.

In step S107, the quantization section 114 quantizes the transform coefficient Coeff obtained in the process of step S106 by, for example, using the quantization parameters calculated by the control section 101 and derives the quantization transform coefficient level "level."

In step S108, the inverse quantization section 117 uses the characteristics corresponding to the characteristics of the quantization of step S107, to apply inverse quantization to the quantization transform coefficient level "level" generated in the process of step S107, and derives the transform coefficient Coeff_IQ.

In step S109, the inverse orthogonal transform section 118 uses the method corresponding to the orthogonal transform process of step S106, to apply inverse orthogonal transform to the transform coefficient Coeff_IQ obtained in the process of step S108, and derives the predicted residual D'. Note that the inverse orthogonal transform process is similar to an inverse orthogonal transform process (described later) executed on the decoding side, and the description of the decoding side (given later) can be applied to the inverse orthogonal transform process of step S109.

In step S110, the computation section 119 adds the predicted image obtained in the prediction process of step S104 to the predicted residual D' derived in the process of step S109, to generate the decoded image that is locally decoded.

In step S111, the in-loop filter section 120 applies the in-loop filter process to the decoded image that is locally decoded and derived in the process of step S110.

In step S112, the frame memory 121 stores the decoded image that is locally decoded and derived in the process of step S110 and the decoded image that is locally decoded and filtered in step S112.

In step S113, the encoding section 115 encodes the quantization transform coefficient level "level" obtained in the process of step S107. For example, the encoding section 115 uses the arithmetic coding or the like to encode the quantization transform coefficient level "level" that is information regarding the image and generates the encoded data. In addition, at this time, the encoding section 115 encodes various encoding parameters (header information Hinfo, prediction mode information Pinfo, and transform information Tinfo). Furthermore, the encoding section 115 derives the residual information RInfo from the quantization transform coefficient level "level" and encodes the residual information RInfo.

In step S114, the accumulation buffer 116 accumulates the encoded data obtained in such way and outputs the encoded data as, for example, a bitstream to the outside of the image encoding apparatus 100. The bitstream is transmitted to the decoding side through, for example, the transmission path or the recording medium. In addition, the rate control section 123 performs the rate control as necessary.

Once the process of S114 is finished, the image encoding process ends.

In the image encoding process flowing in this way, the process to which the present technique is applied is executed in the process of step S106. In addition, the process to which the present technique is applied is executed in the process of step S109. Therefore, the image encoding process can be executed to suppress the increase in the memory capacity necessary for the orthogonal transform and the inverse orthogonal transform.

<Flow of Orthogonal Transform Process>

Figure 29:
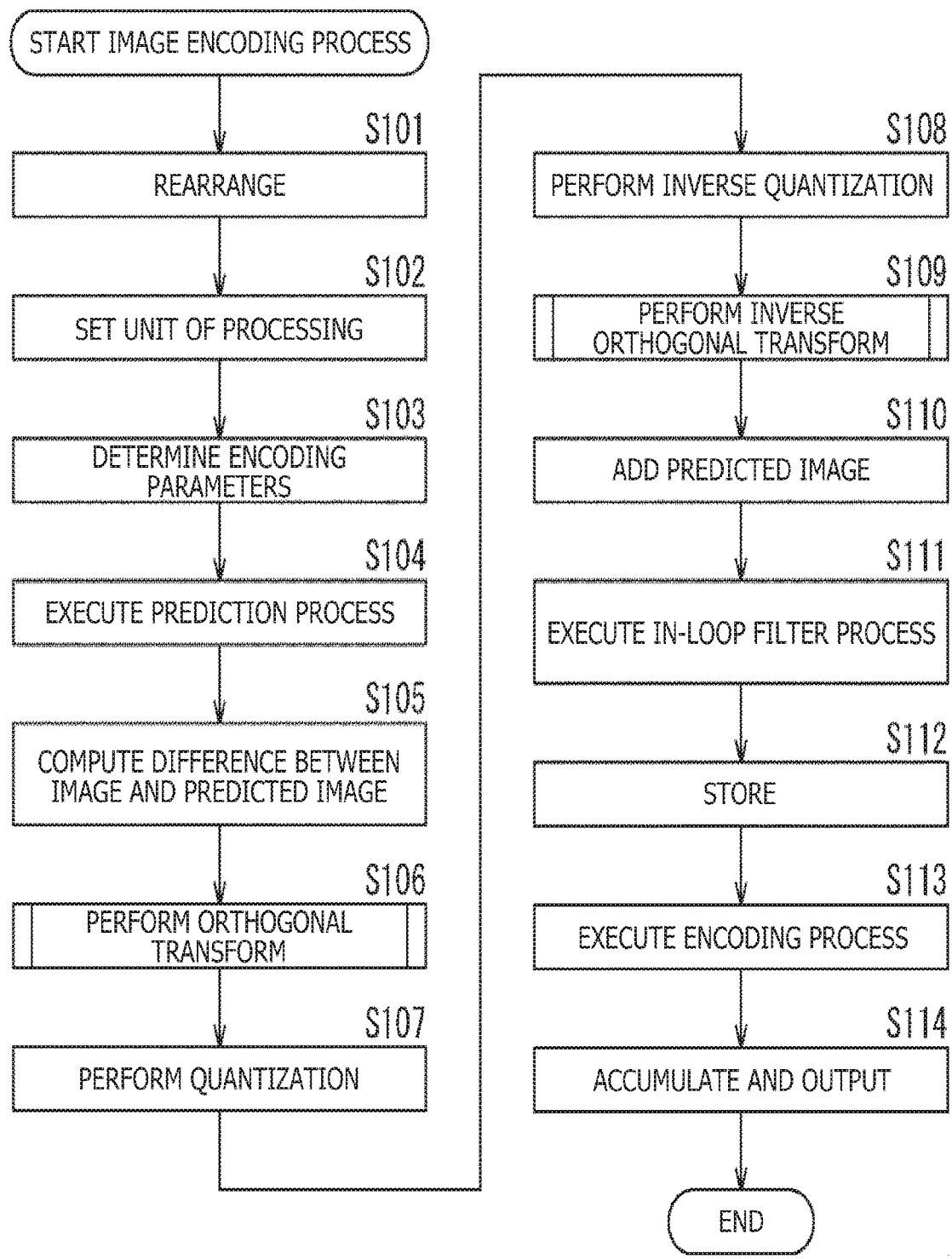
FIG. 29 is a flowchart describing an example of a flow of an image encoding process.

Next, an example of a flow of the orthogonal transform process executed in step S106 of FIG. 29 will be described with reference to a flowchart of FIG. 30.

Once the orthogonal transform process is started, the switch 151 determines whether or not the transform skip flag ts_flag is 2D_TS (indicating two-dimensional transform skip) (for example, 1 (true)) or a transform quantization bypass flag transquant_bypass_flag is 1 (true) in step S131. In a case where the switch 151 determines that the transform skip flag ts_flag is 2D_TS (for example, 1 (true)) or the transform quantization bypass flag is 1 (true), the orthogonal transform process ends, and the process returns to FIG. 29. In this case, the orthogonal transform process (primary transform and second transform) is skipped, and the input predicted residual D is set as the transform coefficient Coeff.

Figure 30:
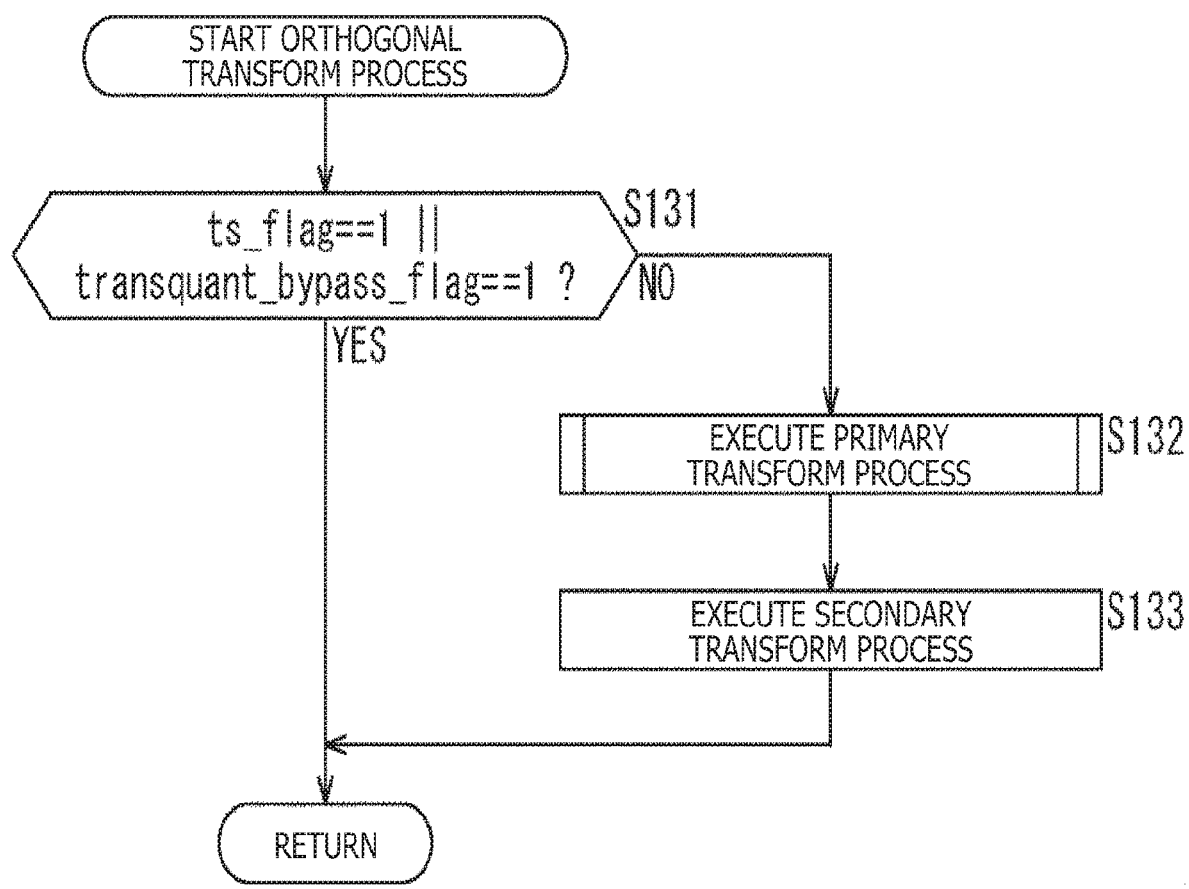
FIG. 30 is a flowchart describing an example of a flow of an orthogonal transform process.

Moreover, in a case where the switch 151 determines that the transform skip flag ts_flag is not 2D_TS (no two-dimensional transform skip) (for example, 0 (false)) and the transform quantization bypass flag transquant_bypass_flag is 0 (false) in step S131 of FIG. 30, the process proceeds to step S132. In this case, the primary transform process and the secondary transform process are executed.

In step S132, the primary transform section 152 applies the primary transform process to the input predicted residual D, based on the adaptive primary transform information designated by the component identifier compID, and derives the transform coefficient Coeff_P after primary transform.

In step S133, the secondary transform section 153 applies the secondary transform process to the transform coefficient Coeff_P to derive the coefficient Coeff_S (transform coefficient Coeff) after secondary transform.

Once the process of step S133 is finished, the orthogonal transform process ends.

In the orthogonal transform process described above, the process according to the present technique is executed in the process of step S132. Therefore, the orthogonal transform process can be executed to suppress the increase in the memory capacity necessary for the primary transform.

<9. Embodiment in Decoding and Inverse Orthogonal Transform>
<Image Decoding Apparatus>

Figure 31:
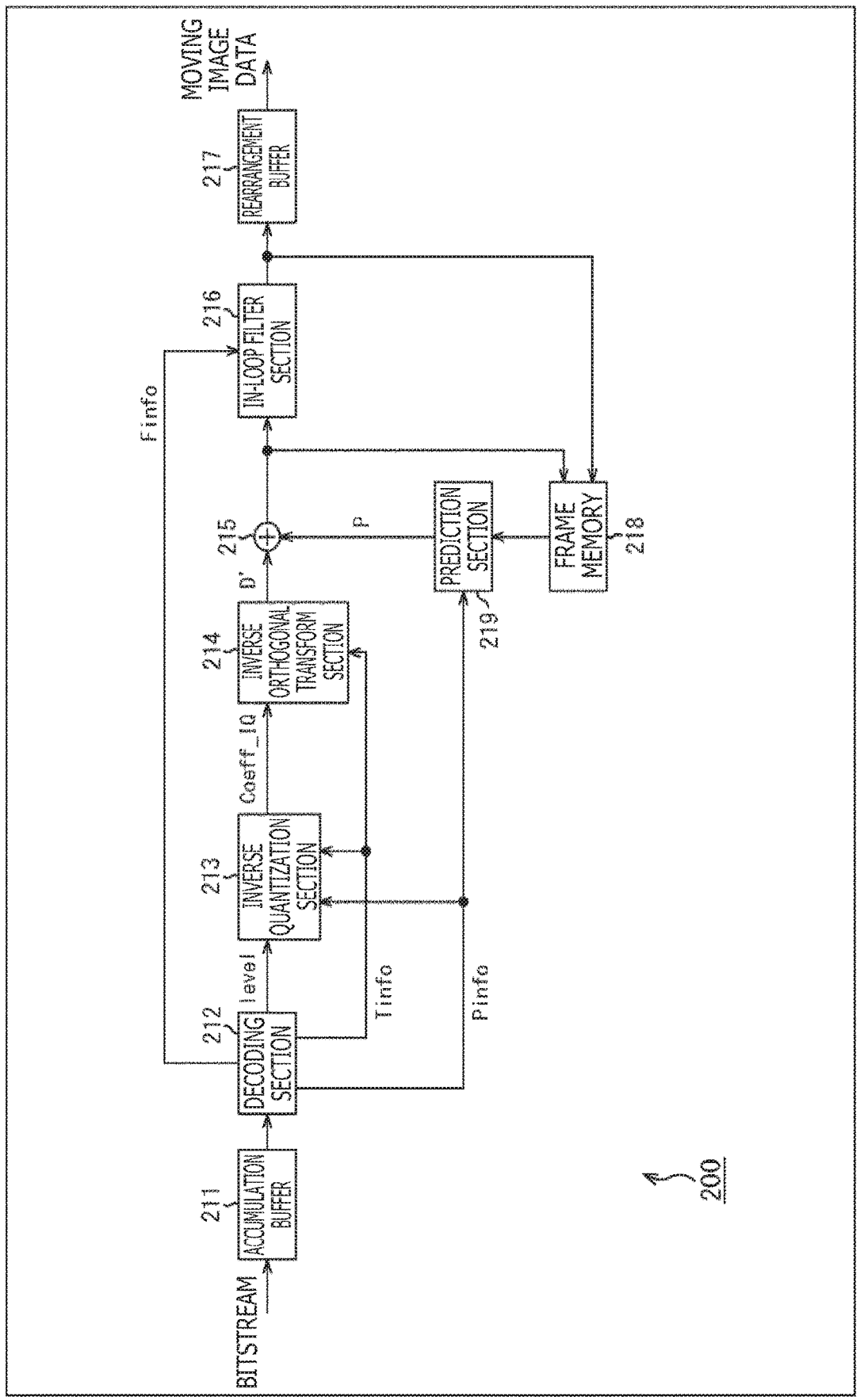
FIG. 31 is a block diagram illustrating a main configuration example of an image decoding apparatus.

FIG. 31 is a block diagram illustrating an example of a configuration of an image decoding apparatus that is a mode of the image processing apparatus according to the present technique. An image decoding apparatus 200 illustrated in FIG. 31 is an apparatus that decodes encoded data in which a predicted residual of an image and a predicted image of the image is encoded as in AVC or HEVC. For example, the image decoding apparatus 200 is provided with the technique described in NPL 1, NPL 3, or NPL 4, and the image decoding apparatus 200 uses a method compliant with a standard described in one of the pieces of the literature, to decode the encoded data in which the image data of moving images is encoded. For example, the image decoding apparatus 200 decodes the encoded data (bitstream) generated by the abovementioned image encoding apparatus 100.

Note that FIG. 31 illustrates main processing sections, flows of data, and the like, and FIG. 31 may not illustrate everything. That is, in the image decoding apparatus 200, there may be processing sections not illustrated as blocks in FIG. 31, and there may be flows of processes or data not indicated by arrows or the like in FIG. 31. This similarly applies to other drawings describing the processing sections and the like in the image decoding apparatus 200.

In FIG. 31, the image decoding apparatus 200 includes an accumulation buffer 211, a decoding section 212, an inverse quantization section 213, an inverse orthogonal transform section 214, a computation section 215, an in-loop filter section 216, a rearrangement buffer 217, a frame memory 218, and a prediction section 219. Note that the prediction section 219 includes an intra prediction section and an inter prediction section that are not illustrated. The image decoding apparatus 200 is an apparatus that decodes the encoded data (bitstream) to generate moving image data.

<Accumulation Buffer>

The accumulation buffer 211 acquires the bitstream input to the image decoding apparatus 200 and holds (stores) the bitstream. The accumulation buffer 211 supplies the accumulated bitstream to the decoding section 212 at a predetermined timing or in a case where, for example, a predetermined condition is met.

<Decoding Section>

The decoding section 212 executes a process regarding decoding of an image. For example, the decoding section 212 receives the bitstream supplied from the accumulation buffer 211. The decoding section 212 applies variable-length decoding to syntax values of syntax elements from the bit string, according to the definition of a syntax table, and derives parameters.

The syntax elements and the parameters derived from the syntax values of the syntax elements include information, such as, for example, header information Hinfo, prediction mode information Pinfo, transform information Tinfo, residual information Rinfo, and filter information Finfo. That is, the decoding section 212 parses (analyzes and acquires) the information from the bitstream. The information will be described below.

<Header Information Hinfo>

The header information Hinfo includes, for example, header information, such as VPS (Video Parameter set)/SPS (Sequence ParameterSet)/PPS (Picture Parameter Set)/SH (slice header). The header information Hinfo includes, for example, information defining an image size (width PicWidth, height PicHeight), bit depth (luma bitDepthY, chroma bitDepthC), chroma array type ChromaArrayType, maximum value MaxCUSize/minimum value MinCUSize of a CU size, maximum depth MaxQTDepth/minimum depth MinQTDepth of a quad-tree partition, maximum depth MaxBTDepth/minimum depth MinBTDepth of binary-tree partition, Maximum value MaxTSSize of a transform skip block (also referred to as a maximum transform skip block size), on/off flag of each encoding tool (also referred to as an enabled flag), and the like.

An example of the on/off flag of the encoding tool included in the header information Hinfo includes the following on/off flag related to the transform and the quantization process. Note that the on/off flag of the encoding tool can also be interpreted as a flag indicating whether or not the encoded data includes the syntax related to the encoding tool. Moreover, in a case where the value of the on/off flag is 1 (true), the encoding tool can be used. In a case where the value of the on/off flag is 0 (false), the encoding tool cannot be used. Note that the interpretation of the flag values may be opposite.

Cross-component prediction enabled flag (ccp_enabled_flag): flag information indicating whether or not cross-component prediction (CCP (Cross-Component Prediction), also referred to as CC prediction) can be used. For example, the cross-component prediction can be used in a case where the flag information is "1" (true), and the cross-component prediction cannot be used in a case where the flag information is "0" (false).

Note that the CCP will also be referred to as cross-component linear prediction (CCLM or CCLMP).

<Prediction Mode Information Pinfo>

The prediction mode information Pinfo includes, for example, information, such as size information PBSize (prediction block size) of processing target PB (prediction block), intra prediction mode information IPinfo, and motion prediction information MVinfo.

The intra prediction mode information IPinfo includes, for example, prev_intra_luma_pred_flag, mpm_idx, and rem_intra_pred_mode in JCTVC-W1005, 7.3.8.5 Coding Section syntax, a luminance intra prediction mode IntraPredModeY derived from the syntax, and the like.

In addition, the intra prediction mode information IPinfo includes, for example, a cross-component prediction flag (ccp_flag (cclmp_flag)), a multi-class linear prediction mode flag (mclm_flag), a chrome sample location type identifier (chroma_sample_loc_type_idx), a chroma MPM identifier (chroma_mpm_idx), a luminance intra prediction mode (IntraPredModeC) derived from the syntax, and the like.

The cross-component prediction flag (ccp_flag (cclmp_flag)) is flag information indicating whether or not to apply cross-component linear prediction. For example, the cross-component prediction is to be applied in a case of ccp_flag==1, and the cross-component prediction is not to be applied in a case of ccp_flag==0.

The multi-class linear prediction mode flag (mclm_flag) is information regarding the mode of linear prediction (linear prediction mode information). More specifically, the multi-class linear prediction mode flag (mclm_flag) is flag information indicating whether or not to set the multi-class linear prediction mode. For example, a 1-class mode (single class mode) (for example, CCLMP) is set in a case of "0," and a 2-class mode (multi-class mode) (for example, MCLMP) is set in a case of "1."

The chroma sample location type identifier (chroma_sample_loc_type_idx) is an identifier for identifying the type of the pixel location of a chroma component (also referred to as a chroma sample location type). For example, in a case where the chroma array type (chromaArrayType)

that is information regarding the color format indicates 420-format, the chroma sample location type identifiers are allocated as in the following Equation (7).
[Math. 5]

$$\begin{aligned}&\text{chroma\_sample\_loc\_type\_idx}==0:\\&\quad\text{Type2chroma\_sample\_loc\_type\_idx}==1:\\&\quad\text{Type3chroma\_sample\_loc\_type\_idx}==2:\\&\quad\text{Type0chroma\_sample\_loc\_type\_idx}==3:\text{Type1}\end{aligned} \quad (7)$$

Note that the chrome sample location type identifier (chroma_sample_loc_type_idx) is transmitted as (or by being stored in) information regarding pixel location of a chroma component (chrome_sample_loc_info( )).

The chroma MPM identifier (chroma_mpm_idx) is an identifier indicating which prediction mode candidate in a chrome intra prediction mode candidate list (intraPredModeCandListC) is to be designated as a chroma intra prediction mode.

The motion prediction information MVinfo includes, for example, information, such as merge_idx, merge_flag, inter_pied_idc, ref_idx_LX, mvp_lx_flag, X={0,1}, and mvd (for example, see JCTVC-W1005, 7.3.8.6 Prediction Unit Syntax).

Obviously, the information to be included in the prediction mode information Pinfo can be selected freely, and information other than the abovementioned information may be included.

<Transform Information Tinfo>

The transform information Tinfo includes, for example, the following information. Obviously, the information to be included in the transform information Tinfo can be selected freely, and information other than the abovementioned information may be included.

Width size TBWSize and height TBHSize of the processing target transform block (or may be logarithms log 2TBWSize and log 2TBHSize of TBWSize and TBHSize having two as a base). Transform skip flag (ts_flag): a flag indicating whether or not to skip the (inverse) primary transform and the (inverse) secondary transform.

Scan identifier (scanIdx)

Quantization parameter (qp)

Quantization matrix (scaling matrix (for example, JCTVC-W1005, 7.3.4 Scaling list data syntax))

<Residual Information Rinfo>

The residual information Rinfo (for example, see 7.3.8.11 Residual Coding syntax of JCTVC-W1005) includes, for example, the following syntax.

cbf (coded_block_flag): a residual data presence/absence flag, last_sig_coeff_x_pos: a last non-zero coefficient X coordinate, last_sig_coeff_y_pos: a last non-zero coefficient Y coordinate, coded_sub_block_flag: a sub-block non-zero coefficient presence/absence flag, sig_coeff_flag: a non-zero coefficient presence/absence flag, gr1_flag: a flag indicating whether the level of non-zero coefficient is greater than one (also referred to as a GR1 flag), gr2_flag: a flag indicating whether the level of non-zero coefficient is greater than two (also referred to as a GR2 flag), sign_flag: a sign indicating positive or negative of a non-zero coefficient (also referred to as a sign code), coeff_abs_level_remaining: a remaining level of a non-zero coefficient (also referred to as a non-zero coefficient remaining level), and the like.

Obviously, the information to be included in the residual information Rinfo can be selected freely, and information other than the abovementioned information may be included.

<Filter Information Finfo>

The filter information Finfo includes, for example, the following control information regarding each filter process.

Control information regarding deblocking filter (DBF), control information regarding sample adaptive offset (SAO), control information regarding adaptive loop filter (ALF), and control information regarding other linear/nonlinear filters.

More specifically, the filter information Finfo includes, for example, a picture to be applied with each filter, information designating a region in the picture, filter On/Off control information of CU unit, filter On/Off control information regarding boundary of slice and tile, and the like. Obviously, the information to be included in the filter information Finfo can be selected freely, and information other than the abovementioned information may be included.

The decoding section 212 will further be described. The decoding section 212 refers to the residual information Rinfo to derive the quantization transform coefficient level "level" of each coefficient location in each transform block. The decoding section 212 supplies the quantization transform coefficient level "level" to the inverse quantization section 213.

In addition, the decoding section 212 supplies the parsed header information Hinfo, prediction mode information Pinfo, quantization transform coefficient level "level," transform information Tinfo, and filter information Finfo to each block. Specifically, the information is supplied as follows.

The header information Hinfo is supplied to the inverse quantization section 213, the inverse orthogonal transform section 214, the prediction section 219, and the in-loop filter section 216. The prediction mode information Pinfo is supplied to the inverse quantization section 213 and the prediction section 219. The transform information Tinfo is supplied to the inverse quantization section 213 and the inverse orthogonal transform section 214. The filter information Finfo is supplied to the in-loop filter section 216.

Obviously, the example described above is just an example, and the example is not limited to this. For example, each encoding parameter may be supplied to any processing section. In addition, other information may be supplied to any processing section.

<Inverse Quantization Section>

The inverse quantization section 213 executes a process regarding inverse quantization. For example, the inverse quantization section 213 receives the transform information Tinfo and the quantization transform coefficient level "level" supplied from the decoding section 212 and performs scaling (inverse quantization) on the value of the quantization transform coefficient level "level," based on the transform information Tinfo, to derive the transform coefficient Coeff_IQ after inverse quantization.

Note that the inverse quantization is performed as an opposite process of the quantization by the quantization section 114. In addition, the inverse quantization is a process similar to the inverse quantization by the inverse quantization section 117. That is, the inverse quantization section 117 executes a process (inverse quantization) similar to the inverse quantization section 213.

The inverse quantization section 213 supplies the derived transform coefficient Coeff_IQ to the inverse orthogonal transform section 214.

<Inverse Orthogonal Transform Section>

The inverse orthogonal transform section 214 executes a process regarding inverse orthogonal transform. For example, the inverse orthogonal transform section 214 receives the transform coefficient Coeff_IQ supplied from the inverse quantization section 213 and the transform information Tinfo supplied from the decoding section 212. The inverse orthogonal transform section 214 applies the inverse orthogonal transform process to the transform coefficient Coeff_IQ, based on the transform information Tinfo, to derive the predicted residual D'.

Note that the inverse orthogonal transform is executed as an opposite process of the orthogonal transform performed by the orthogonal transform section 113. In addition, the inverse orthogonal transform is a process similar to the inverse orthogonal transform performed by the inverse orthogonal transform section 118. That is, the inverse orthogonal transform section 118 executes a process (inverse orthogonal transform) similar to the inverse orthogonal transform section 214.

The inverse orthogonal transform section 214 supplies the derived predicted residual D' to the computation section 215.

<Computation Section>

The computation section 215 executes a process related to addition of information regarding an image. For example, the computation section 215 receives the predicted residual D' supplied from the inverse orthogonal transform section 214 and the predicted image P supplied from the prediction section 219. The computation section 215 adds the predicted residual D' to the predicted image P (prediction signal) corresponding to the predicted residual D' as illustrated is the following Equation (8), to derive the local decoded image Rlocal.

[Math. 6]

$$R_{local} = D' + P \qquad (8)$$

The computation section 215 supplies the derived local decoded image Rlocal to the in-loop filter section 216 and the frame memory 218.

<In-Loop Filter Section>

The in-loop filter section 261 executes a process related to an in-loop filter process. For example, the in-loop filter section 216 receives the local decoded image Rlocal supplied from the computation section 215 and the filter information Finfo supplied from the decoding section 212. Note that the information to be input to the in-loop filter section 216 can be selected freely, and information other than the abovementioned information may be input.

The in-loop filter section 216 appropriately applies a filter process to the local decoded image Rlocal, based on the filter information Finfo.

For example, the in-loop filter section 216 sequentially applies four in-loop filters including a bilateral filter, a deblocking filter (DBF (DeBlocking Filter)), an adaptive offset filter (SAO (Sample Adaptive Offset)), and an adaptive loop filter (ALF (Adaptive Loop Filter)) as described in NPL 1. Note that the filters to be applied and the order of applying the filters are optional and can be selected as appropriate.

The in-loop filter section 216 executes a filter process corresponding to the filter process executed on the encoding side (for example, the in-loop filter section 120 of image encoding apparatus 100). Obviously, the filter process to be executed by the in-loop filter section 216 can be selected freely, and the filter process is not limited to the example. For example, the in-lop filter section 261 may apply a Wiener filter or the like.

The in-loop filter section 216 supplies the filtered local decoded image Rlocal to the rearrangement buffer 217 and the frame memory 218.

<Rearrangement Buffer>

The rearrangement buffer 217 receives the local decoded image Rlocal supplied from the in-loop filter section 216 and holds (stores) the local decoded image Rlocal. The rearrangement buffer 217 uses the local decoded image Rlocal to reconstruct the decoded image R of each picture unit and holds the decoded image R (stores the decoded image R in the buffer). The rearrangement buffer 217 rearranges the obtained decoded images R from the order of decoding to the order of reproduction. The rearrangement buffer 217 outputs the rearranged decoded image R group as moving image data to the outside of the image decoding apparatus 200.

<Frame Memory>

The frame memory 218 executes a process regarding storage of data related to an image. For example, the frame memory 218 receives the local decoded image Rlocal supplied from the computation section 215, to reconstruct the decoded image R of each picture unit. The frame memory 218 stores the decoded image R in the buffer of the frame memory 218.

In addition, the frame memory 218 receives the in-loop-filtered local decoded image Rlocal supplied from the in loop filter section 216, to reconstruct the decoded image R of each picture unit, and stores the decoded image R in the buffer of the frame memory 218. The frame memory 218 appropriately supplies the stored decoded image R (or part of the decoded image R) as a reference image to the prediction section 219.

Note that the frame memory 218 may store the header information Hinfo, the prediction mode information Pinfo, the transform information Tinfo, the filter information Finfo, and the like regarding the generation of the decoded image.

<Prediction Section>

The prediction section 219 executes a process regarding generation of a predicted image. For example, the prediction section 219 receives the prediction mode information Pinfo supplied from the decoding section 212. The prediction section 219 uses a prediction method designated by the prediction mode information Pinfo to make a prediction and derives the predicted image P. In the derivation, the prediction section 219 uses, as a reference image, a pre-filtered or filtered decoded image R (or part of the decoded image R) that is designated by the prediction mode information Pinfo and that is stored in frame memory 218. The prediction section 219 supplies the derived predicted image P to the computation section 215.

In the image decoding apparatus 200 configured in this way, the inverse orthogonal transform section 214 serves as a derivation section and an inverse orthogonal transform section to execute the process according to the present technique. In addition, the decoding section 212 serves as a decoding section to execute the process according to the present technique. Therefore, the image decoding apparatus 200 can suppress the increase in the memory capacity necessary for the inverse orthogonal transform.

<Details of Inverse Orthogonal Transform Section>

Figure 32:
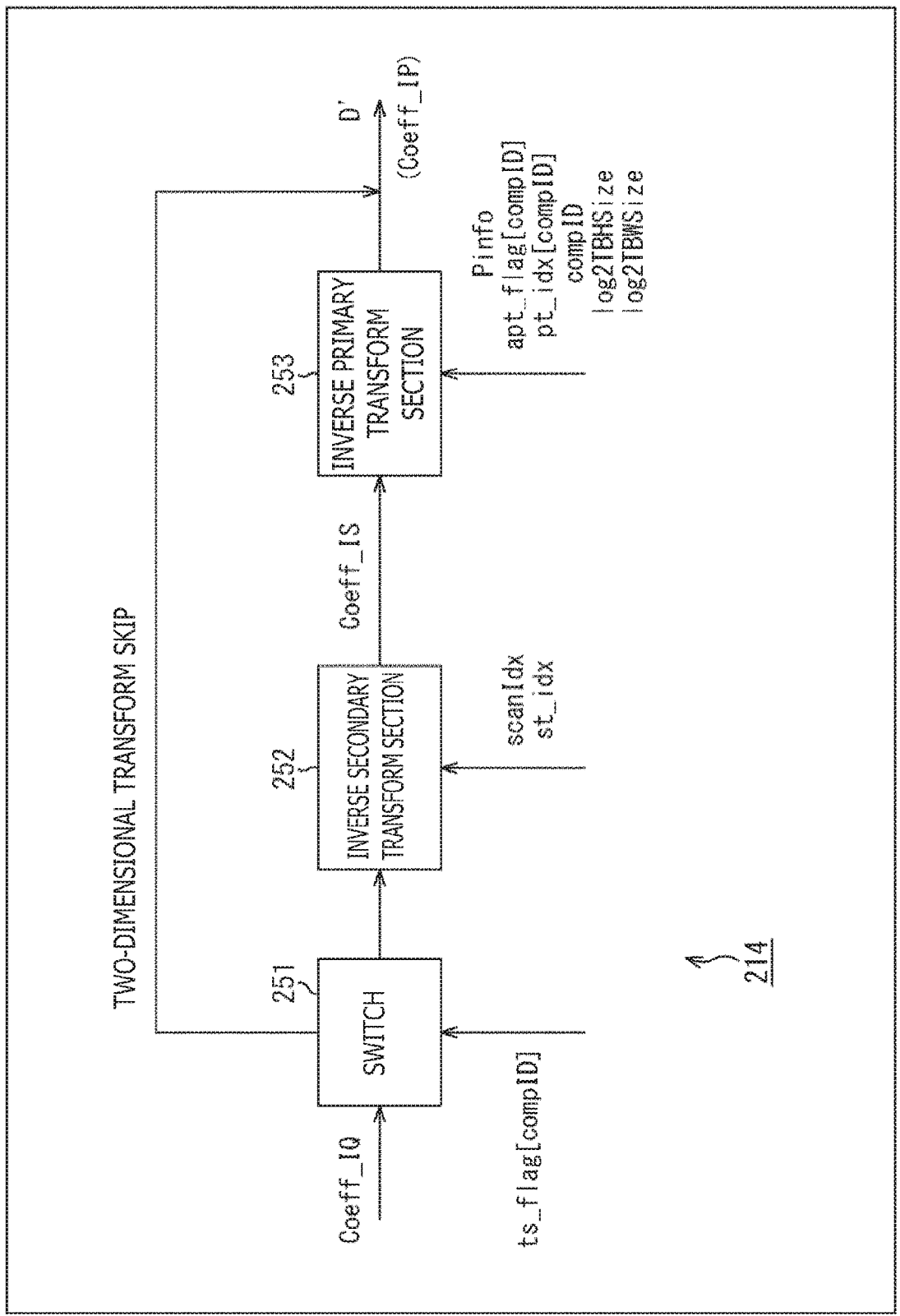
FIG. 32 is a block diagram illustrating a main configuration example of an inverse orthogonal transform section.

FIG. 32 is a block diagram illustrating a main configuration example of the inverse orthogonal transform section 214. As illustrated in FIG. 32, the inverse orthogonal transform section 214 includes a switch 251, an inverse secondary transform section 252, and an inverse primary transform section 253.

The switch 251 receives the transform coefficient Coeff_IQ and the transform skip flag ts_flag[compID]. In a case where the value of the transform skip flag ts_flag[compID] is NO_TS (=0), that is, in a case where the transform skip is not to be applied, the switch 251 supplies the transform coefficient Coeff_IQ to the inverse secondary transform section 252. Further, in a case where the value of the transform skip flag ts_flag[compID] is 2D_TS (=1), that is, in a case where the two-dimensional transform skip is to be applied, the switch 251 skips the inverse secondary transform section 252 and the inverse primary transform section 253. The switch 251 outputs the transform coefficient Coeff_IQ as the predicted residual D' to the outside of the inverse orthogonal transform section 214 (supplies the predicted residual D' to the computation section 215).

The inverse secondary transform section 252 executes a process regarding an inverse secondary transform that is an opposite process of the secondary transform performed on the encoding side (for example, the secondary transform section 153 of the image encoding apparatus 100). For example, the inverse secondary transform section 252 receives the secondary transform identifier st_idx, the scan identifier scanIdx indicating the scan method of the transform coefficient, and the transform coefficient Coeff_IQ supplied from the switch 251.

The inverse secondary transform section 252 applies the inverse secondary transform to the transform coefficient Coeff_IQ, based on the secondary transform identifier st_idx and the scan identifier scanIdx, and derives a transform coefficient Coeff_IS after inverse secondary transform.

More specifically, in a case where the secondary transform identifier st_idx indicates that the inverse secondary transform is to be applied (st_idx>0), the inverse secondary transform section 252 applies, to the transform coefficient Coeff_IQ, a process of inverse secondary transform corresponding to the secondary transform identifier st_idx and derives the transform coefficient Coeff_IS after inverse secondary transform. The inverse secondary transform section 252 supplies the inverse secondary transform coefficient Coeff_IS to the inverse primary transform section 253.

Note that in a case where the secondary transform identifier st_idx indicates that the inverse secondary transform is not to be applied (st_idx==0), the inverse secondary transform section 252 skips the inverse secondary transform and supplies the transform coefficient Coeff_IQ as the transform coefficient Coeff_IS obtained by the inverse secondary transform to the inverse primary transform section 253.

The inverse primary transform section 253 executes a process regarding an inverse primary transform that is an opposite process of the primary transform performed on the encoding side (for example, the primary transform section 152 of the image encoding apparatus 100). For example, the inverse primary transform section 253 receives the component identifier compID, the adaptive primary transform flag apt_flag[compID] of the component identifier compID, the primary transform identifier pt_idx[comp_ID] of the component identifier compID, the prediction mode information PInfo, the size of the transform block (logarithm log 2TBWSize of width and logarithm log 2TBHSize of height), and the transform coefficient Coeff_IS obtained by the inverse secondary transform.

The inverse primary transform section 253 refers to the prediction mode information PInfo, the component identifier compID, the adaptive primary transform flag apt_flag[compID] of the component identifier compID, and the primary transform identifier pt_idx[compID] of the component identifier compID to select the transform type TrTypeH of the inverse primary horizontal transform (and the inverse primary horizontal transform type identifier TrTypeIdxH indicating the transform type) and the transform type TrTypeV of the inverse primary vertical transform (and the inverse primary vertical transform type identifier TrTypeIdxV indicating the transform type) corresponding to the component identifier compID.

In addition, the inverse primary transform section 253 applies, to the transform coefficient Coeff_IS obtained by the inverse secondary, an inverse primary vertical transform defined by the inverse primary vertical transform type identifier TrTypeIdxV (or the inverse primary vertical transform type TrTypeV) and the height log 2TBHSize of the transform block and an inverse primary horizontal transform defined by the inverse primary horizontal transform type identifier TrTypeIdxH (or the inverse primary horizontal transform type TrTypeH) and the width log 2TBWSize of the transform block and derives the transform coefficient Coeff_IP after inverse primary transform. The inverse primary vertical transform is an inverse one-dimensional orthogonal transform in the vertical direction, and the inverse primary horizontal transform is an inverse one-dimensional orthogonal transform in the horizontal direction.

The inverse primary transform section 253 outputs the transform coefficient Coeff_IP obtained by the inverse primary transform as the predicted residual D' to the outside of the inverse orthogonal transform section 214 (supplies the predicted residual D' to the computation section 215).

In the inverse orthogonal transform section 214 configured in this way, the inverse primary transform section 253 serves as a derivation section and an inverse orthogonal transform section to execute the process according to the present technique. That is, the derivation section uses the first transform matrix to derive the second transform matrix. The inverse orthogonal transform section uses the second transform matrix derived by the derivation section, to apply the inverse primary transform to the inverse secondary transform result. Therefore, the increase in the memory capacity necessary for the inverse primary transform can be suppressed.

Note that as described above, the inverse primary transform section 253 performs the inverse primary vertical transform and the inverse primary horizontal transform in the inverse primary transform. That is, the derivation section derives the second transform matrix for inverse one-dimensional orthogonal transform in the vertical direction and the second transform matrix for inverse one-dimensional orthogonal transform in the horizontal direction. In the inverse primary transform, the inverse orthogonal transform section uses the second transform matrix for inverse one-dimensional orthogonal transform in the vertical direction derived by the derivation section, to perform the inverse one-dimensional orthogonal transform in the vertical direction, and further uses the second transform matrix for the inverse one-dimensional orthogonal transform in the horizontal direction derived by the derivation section, to perform the inverse one-dimensional orthogonal transform in the horizontal direction. Therefore, this can suppress the increase in the memory capacity necessary for the primary transform in which the inverse one-dimensional orthogonal transform in the vertical direction and the inverse one-dimensional orthogonal transform in the horizontal direction are performed.

<Flow of Image Decoding Process>

Next, flows of processes executed by the image decoding process 200 will be described. First, an example of a flow of an image decoding process will be described with reference to a flowchart of FIG. 33.

Once the image decoding process is started, the accumulation buffer 211 acquires the encoded data (bitstream) supplied from the outside of the image decoding apparatus 200 and holds (accumulates) the encoded data in step S201.

In step S202, the decoding section 212 decodes the encoded data (bitstream) and obtains the quantization transform coefficient level "level." Further, in the decoding, the decoding section 212 parses (analyzes and acquires) various encoding parameters from the encoded data (bitstream).

In step S203, the inverse quantization section 213 applies, to the quantization transform coefficient level "level" obtained in the process of step S202, inverse quantization that is an opposite process of the quantization performed on the encoding side and obtains the transform coefficient Coeff_IQ.

In step S204, the inverse orthogonal transform section 214 applies, to the transform coefficient Coeff_IQ obtained in the process of step S203, an inverse orthogonal transform process that is an opposite process of the orthogonal transform process performed on the encoding side and obtains the predicted residual D'.

In step S205, the prediction section 219 uses a prediction method designated on the encoding side, to execute the prediction process based on the information parsed in step S202 and generates the predicted image P by, for example, referring to the reference image stored in the frame memory 218.

In step S206, the computation section 215 adds the predicted residual D' obtained in the process of step S204 to the predicted image P obtained in the process of step S205, to derive the local decoded image Rlocal.

In step S207, the in-loop filter section 216 applies the in-loop filter process to the local decoded image Rlocal obtained in the process of step S206.

In step S208, the rearrangement buffer 217 uses the filtered local decoded image Rlocal obtained in the process of step S207, to derive the decoded image R, and rearranges the order of the decoded image R group from the order of decoding to the order of reproduction. The decoded image R group rearranged in the order of reproduction is output as moving images to the outside of the image decoding apparatus 200.

Further, in step S209, the frame memory 218 stores at least one of the local decoded image Rlocal obtained in the process of step S206 or the filtered local decoded image Rlocal obtained in the process of step S207.

Once the process of step S209 is finished, the image decoding process ends.

In the image decoding process flowing in this way, the process according to the present technique is executed in the process of step S204. Therefore, the image decoding process can be executed to suppress the increase in the memory capacity necessary for the inverse orthogonal transform.

<Flow of Process of Inverse Orthogonal Transform>

Figure 33:
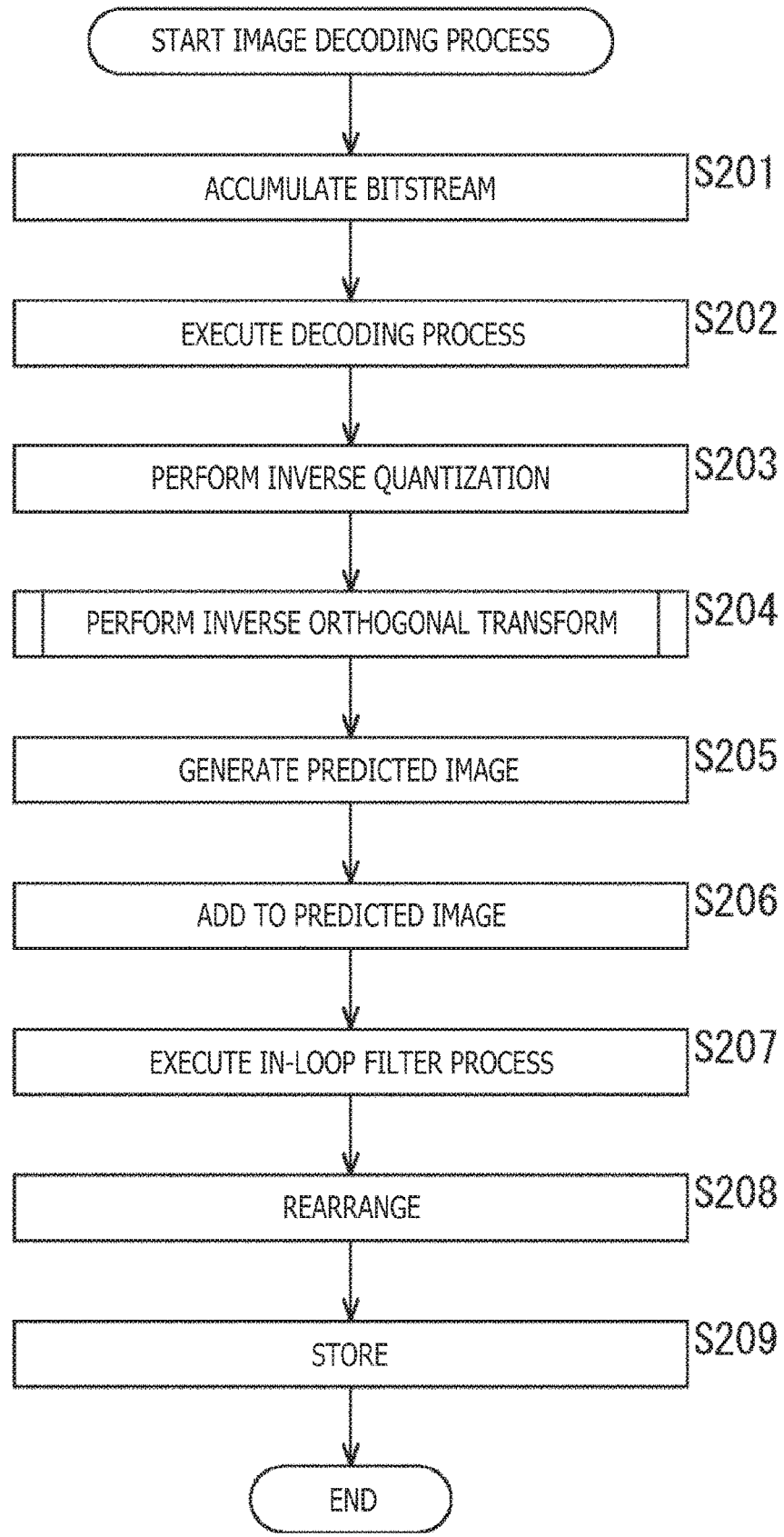
FIG. 33 is a flowchart describing an example of a flow of an image decoding process.

Next, an example of a flow of the inverse orthogonal transform process executed in step S204 of FIG. 33 will be described with reference to a flowchart of FIG. 34. Once the inverse orthogonal transform process is started, the switch 251 determines whether or not the transform skip flag ts_flag is 2D_TS (mode of two-dimensional transform skip) (for example, 1 (true)) or whether or not the transform quantization bypass flag transquant_bypass_flag is 1 (true) in step S231. In a case where the switch 251 determines that the transform skip identifier ts_idx is 2D_TS or the transform quantization bypass flag is 1 (true), the inverse orthogonal transform process ends, and the process returns to FIG. 17. In this case, the inverse orthogonal transform process (inverse primary transform and inverse secondary transform) is skipped, and the transform coefficient Coeff_IQ is set as the predicted residual D'.

Further, in a case where the switch 251 determines that the transform skip identifier ts_idx is not 2D_TS (mode other than two-dimensional transform skip) (for example, 0 (false)) and the transform quantization bypass flag is 0 (false) in step S231, the process proceeds to step S232. In this case, the inverse secondary transform process and the inverse primary transform process are executed.

In step S232, the inverse secondary transform section 252 applies the inverse secondary transform process to the transform coefficient Coeff_IQ, based on the secondary transform identifier st_idx, and derives and outputs the transform coefficient Coeff_IS.

In step S233, the inverse primary transform section 253 applies the inverse primary transform process to the transform coefficient Coeff_IS to derive the transform coefficient Coeff_IP after inverse primary transform (predicted residual D').

Once the process of step S233 is finished, the inverse orthogonal transform process ends.

In the inverse orthogonal transform process as described above, the process according to the present technique is executed in the process of step S233. Therefore, the inverse orthogonal transform process can be executed to suppress the increase in the memory capacity necessary for the inverse primary transform process.

<10. Embodiment in Primary Transform>

<Primary Transform Section>

Figure 35:
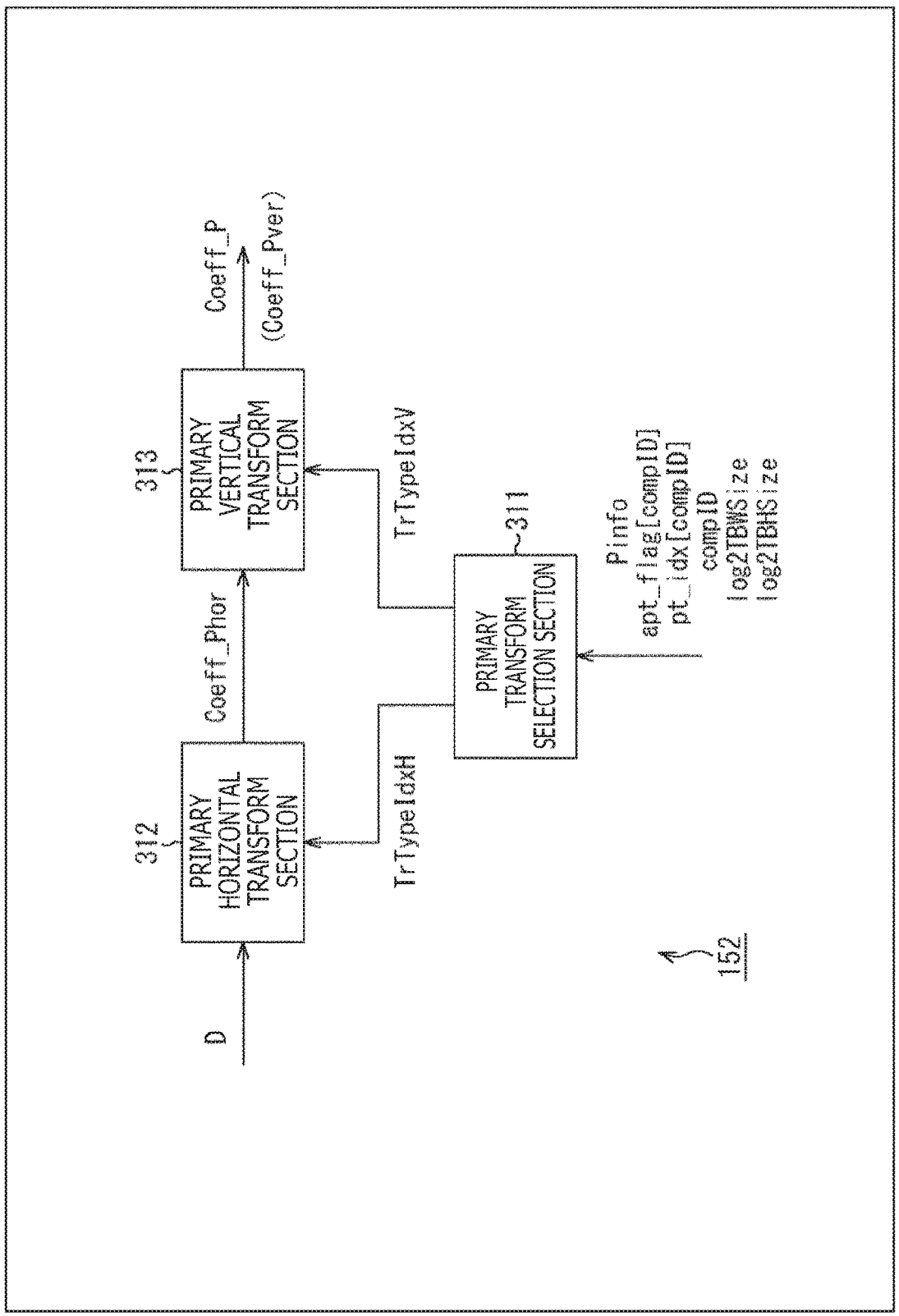
FIG. 35 is a block diagram illustrating a main configuration example of a primary transform section.

Next, a configuration, a process, and the like for the derivation will be described. FIG. 35 is a block diagram illustrating a main configuration example of the primary transform section 152 in this case. As illustrated in FIG. 35, the primary transform section 152 includes a primary transform selection section 311, a primary horizontal transform section 312, and a primary vertical transform section 313.

The primary transform selection section 311 receives the prediction mode information PInfo, the component identifier compID, the adaptive primary transform flag apt_flag[compID], and the primary transform identifier pt_idx[compID]. The primary transform selection section 311 refers to the information to derive the transform type identifier TrTypeIdxH of the primary horizontal transform and the transform type identifier TrTypeIdxV of the primary vertical transform. The primary transform selection section 311 supplies the derived transform type identifier TrTypeIdxH of the primary horizontal transform to the primary horizontal transform section 312. In addition, the primary transform selection section 311 supplies the derived transform type identifier TrTypeIdxV of the primary vertical transform to the primary vertical transform section 313.

The primary horizontal transform section 312 receives the predicted residual D, the transform type identifier TrTypeIdxH of the primary horizontal transform, and information regarding the size of the transform block (not illustrated). The information regarding the size of the transform block may be a natural number N indicating the dimension (the number of coefficients) in the horizontal direction or the vertical direction of the transform block or may be log 2TBWSize (logarithm of width) indicating the width of the transform block (N=1<<log 2TBWSize). The primary horizontal transform section 312 applies a primary horizontal transform Phor defined by the transform type identifier TrTypeIdxH and the size of the transform block to the predicted residual D and derives a transform coefficient Coeff_Phor after primary horizontal transform. The primary horizontal transform section 312 supplies the transform coefficient Coeff_Phor obtained by the primary horizontal transform to the primary vertical transform section 313.

The primary vertical transform section 313 receives the transform coefficient Coeff_Phor obtained by the primary horizontal transform, the transform type identifier TrTypeIdxV of the primary vertical transform, and information regarding the size of the transform block (not illustrated). The information regarding the size of the transform block may be a natural number N indicating the dimension (the number of coefficients) in the horizontal direction or the vertical direction of the transform block or may be log 2TBHSize (logarithm of height) indicating the height of the transform block (N=1<<log 2TBHSize). The primary vertical transform section 313 applies a primary vertical transform Pver defined by the transform type identifier TrTypeIdxV and the size of the transform block to the transform coefficient Coeff_Phor obtained by the primary horizontal transform and derives a transform coefficient Coeff_Pver after primary vertical transform. The primary vertical transform section 313 outputs the transform coefficient Coeff_Pver obtained by the primary vertical transform as the transform coefficient Coeff_P obtained by the primary transform to the outside of the primary transform section 152 (supplies the transform coefficient Coeff_P obtained by the primary transform to the secondary transform section 153).

In the primary transform section 152 configured in this way, each of the primary horizontal transform section 312 and the primary vertical transform section 313 serves as a derivation section and an orthogonal transform section to execute the process according to the present technique.

That is, the primary horizontal transform section 312 serves as a derivation section to derive a second transform matrix for one-dimensional orthogonal transform in the horizontal direction. Moreover, the primary horizontal transform section 312 serves as an orthogonal transform section and uses the second transform matrix for one-dimensional orthogonal transform in the horizontal direction derived by the derivation section, to perform the one-dimensional orthogonal transform in the horizontal direction. Therefore, the primary horizontal transform section 312 can suppress the increase in the memory capacity necessary for the one-dimensional orthogonal transform in the horizontal direction.

In addition, the primary vertical transform section 313 serves as a derivation section to derive a second transform matrix for one-dimensional orthogonal transform in the vertical direction. Moreover, the primary vertical transform section 313 serves as an orthogonal transform section and uses the second transform matrix for one-dimensional orthogonal transform in the vertical direction derived by the derivation section, to perform the one-dimensional orthogonal transform in the vertical direction. Therefore, the primary vertical transform section 313 can suppress the increase in the memory capacity necessary for the one-dimensional orthogonal transform in the vertical direction.

<Primary Horizontal Transform Section>

Figure 36:
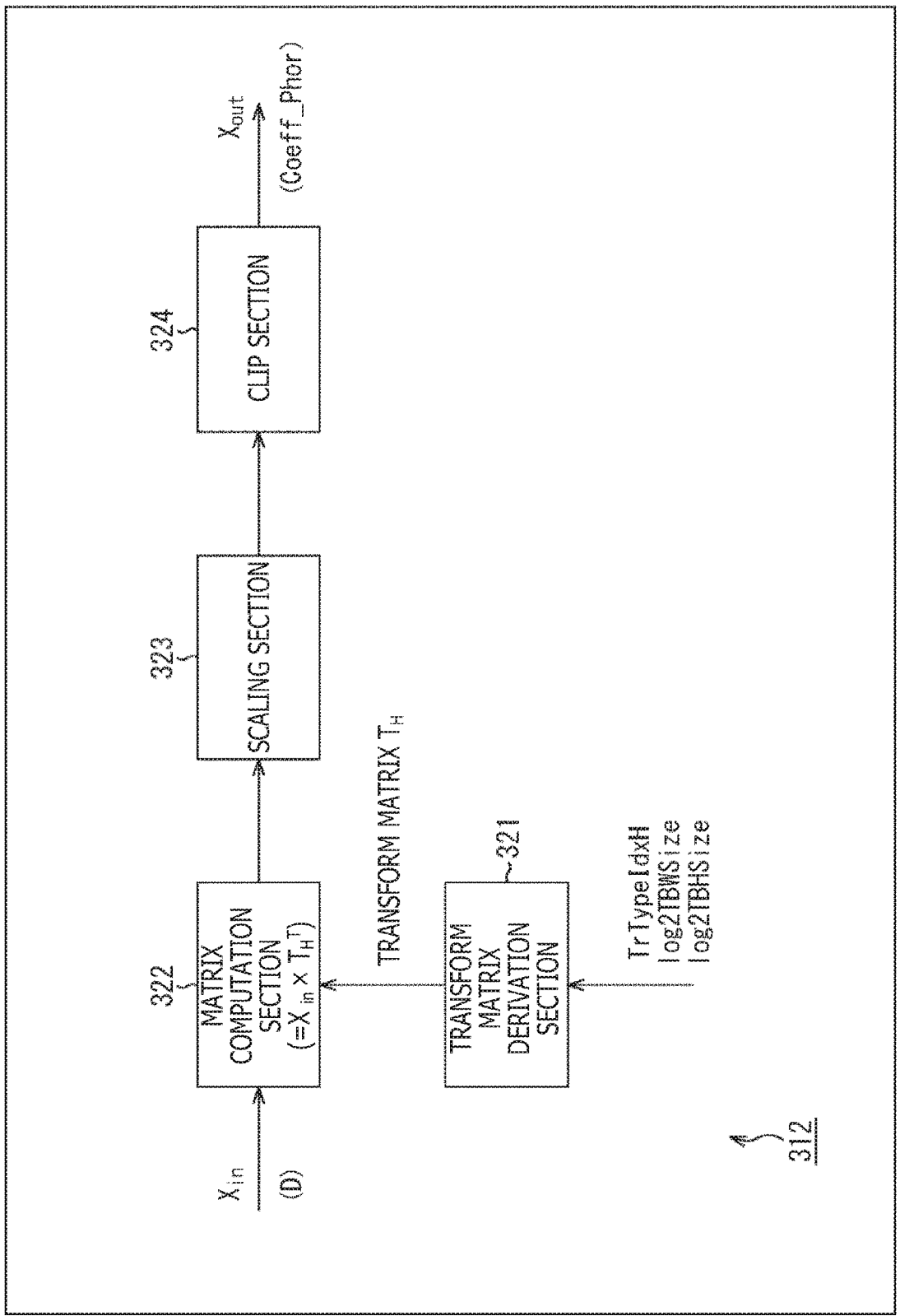
FIG. 36 is a block diagram illustrating a main configuration example of a primary horizontal transform section.

FIG. 36 is a block diagram illustrating a main configuration example of the primary horizontal transform section 312 in FIG. 35. As illustrated in FIG. 36, the primary horizontal transform section 312 includes a transform matrix derivation section 321, a matrix computation section 322, a scaling section 323, and a clip section 324.

The transform matrix derivation section 321 receives the transform type identifier TrTypeIdxH of the primary horizontal transform and the information regarding the size of the transform block to derive a transform matrix TH for primary horizontal transform in the same size as the transform block (transform matrix TH for one-dimensional orthogonal transform in the horizontal direction) corresponding to the transform type identifier TrTypeIdxH of the primary horizontal transform. The transform matrix derivation section 321 supplies the transform matrix TH to the matrix computation section 322.

The matrix computation section 322 uses the transform matrix TH supplied from the transform matrix derivation section 321, to apply the one-dimensional orthogonal transform in the horizontal direction to input data Xin (that is, transform block of predicted residual D), and obtains intermediate data Y1. The computation can be expressed by an equation of matrix as in the following Equation (9).

[Math. 7]

$$Y1 = X_{in} \times T_H^T \qquad (9)$$

The matrix computation section 322 supplies the intermediate data Y1 to the scaling section 323.

The scaling section 323 scales a coefficient Y1[$i,j$] of each row i, column j component of the intermediate data Y1 at a predetermined amount of shift SH to obtain intermediate data Y2. The scaling can be expressed as in the following Equation (10). Hereinafter, a row i, column j component ((i,j) component) of a two-dimensional matrix (two-dimensional array) will be represented as X[i,j].

[Math. 8]

$$Y2[i,j] = Y1[i,j] >> S_H \qquad (10)$$

The scaling section 323 supplies the intermediate data Y2 to the clip section 324.

The clip section 324 clips the value of a coefficient Y2[$i,j$] of each row i, column j component of the intermediate data Y2 to derive output data Xout (that is, transform coefficient Coeff_Phor obtained by the primary horizontal transform). The process can be expressed as in the following Equation (11).

[Math. 9]

$$X_{out}[i,j] = \text{Clip3}(\text{minCoefVal}, \text{maxCoefVal}, Y2[i,j]) \qquad (11)$$

The clip section 324 outputs the output data Xout (transform coefficient Coeff_Phor obtained by the primary horizontal transform) to the outside of the primary horizontal transform section 312 (supplies the output data Xout to the primary vertical transform section 313).

In the primary horizontal transform section 312 configured in this way, the transform matrix derivation section 321 serves as a derivation section to execute the process according to the present technique. In addition, the matrix computation section 322 serves as an orthogonal transform section to execute the process according to the present technique. Therefore, the primary horizontal transform section 312 can suppress the increase in the memory capacity necessary for the one-dimensional orthogonal transform in the horizontal direction.

Note that the transform matrix derivation section 321 in FIG. 36 corresponds to the transform matrix derivation section 001 in FIG. 22.

<Primary Vertical Transform Section>

Figure 37:
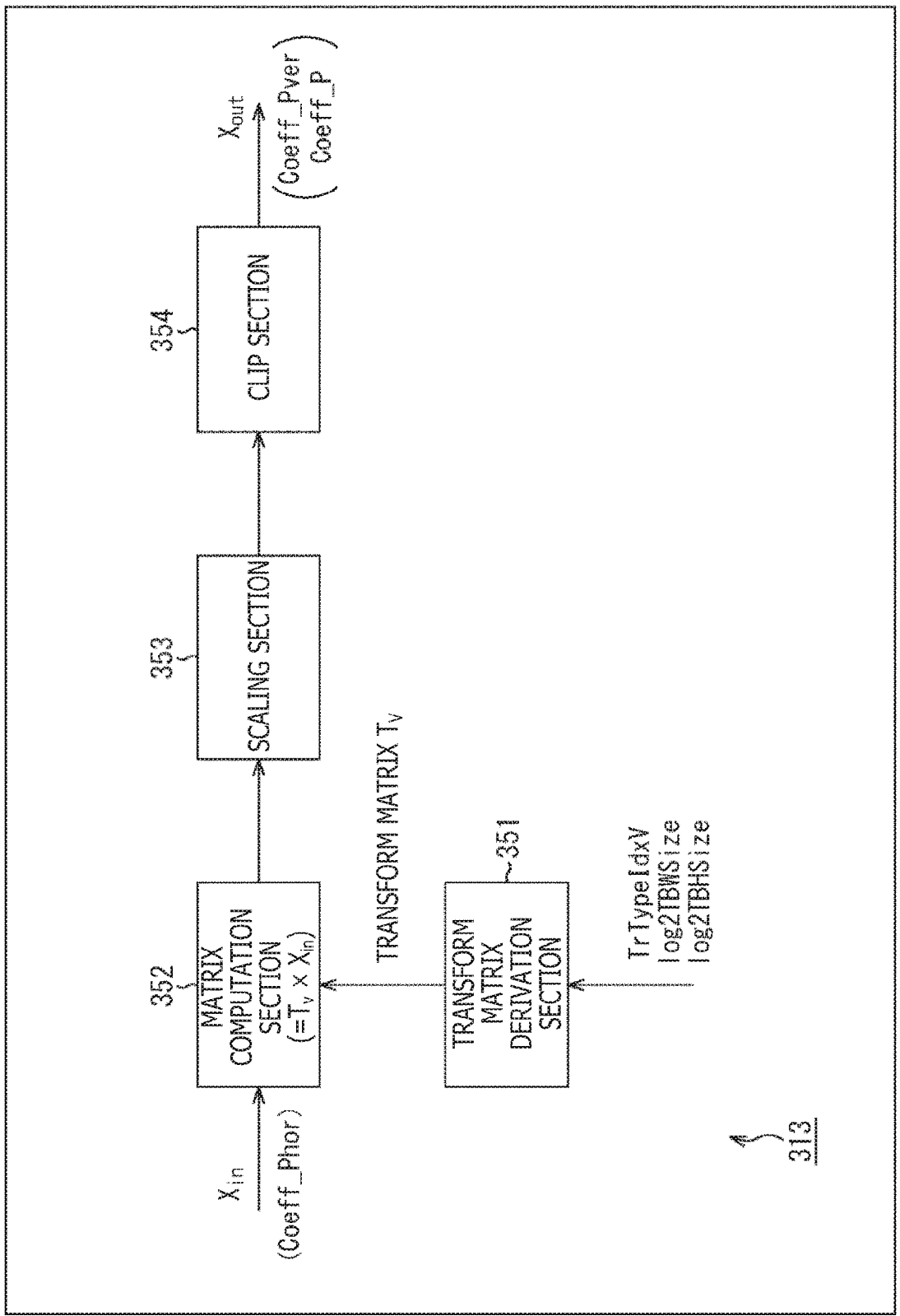
FIG. 37 is a block diagram illustrating a main configuration example of a primary vertical transform section.

FIG. 37 is a block diagram illustrating a main configuration example of the primary vertical transform section 313 in FIG. 35. As illustrated in FIG. 37, the primary vertical transform section 313 includes a transform matrix derivation section 351, a matrix computation section 352, a scaling section 353, and a clip section 354.

The transform matrix derivation section 351 receives the transform type identifier TrTypeIdxV of the primary vertical transform and the information regarding the size of the transform block to derive a transform matrix TV for primary vertical transform in the same size as the transform block (transform matrix TV for one-dimensional orthogonal transform in the vertical direction) and corresponding to the transform type identifier TrTypeIdxV of the primary vertical transform. The transform matrix derivation section 351 supplies the transform matrix TV to the matrix computation section 352.

The matrix computation section 352 uses the transform matrix TV supplied from the transform matrix derivation section 351, to apply the one-dimensional orthogonal transform in the vertical direction to input data Xin (that is, transform block of transform coefficient Coeff_Phor obtained by the primary horizontal transform), and obtains intermediate data Y1. The computation can be expressed by an equation of matrix as in the following Equation (12).
[Math. 10]

$$Y1 = T_v \times Z_{in} \qquad (12)$$

The matrix computation section 352 supplies the intermediate data Y1 to the scaling section 353.

The scaling section 353 scales a coefficient Y1[$i,j$] of each row i, column j component of the intermediate data Y1 at a predetermined amount of shift SV to obtain intermediate data Y2. The scaling can be expressed as in the following Equation (13).
[Math. 11]

$$Y2[i,j] = Y1[i,j] >> S_v \qquad (13)$$

The scaling section 353 supplies the intermediate data Y2 to the clip section 354.

The clip section 354 clips the value of a coefficient Y2[$i,j$] of each row i, column j component of the intermediate data Y2 to derive output data Xout (that is, transform coefficient Coeff_Pver obtained by the primary vertical transform). The process can be expressed as in the following Equation (14).
[Math. 12]

$$X_{out}[i,j] = \text{Clip3}(\text{minCoefVal}, \text{maxCoefVal}, Y2[i,j]) \qquad (14)$$

The clip section 324 outputs the output data Xout (transform coefficient Coeff_Pver obtained by the primary vertical transform), as the transform coefficient Coeff_P obtained by primary transform, to the outside of the primary vertical transform section 313 (supplies the output data Xout to the secondary transform section 153).

In the primary vertical transform section 313 configured in this way, the transform matrix derivation section 351 serves as a derivation section to execute the process according to the present technique. In addition, the matrix computation section 352 serves as an orthogonal transform section to execute the process according to the present technique. Therefore, the primary vertical transform section 313 can suppress the increase in the memory capacity necessary for the one-dimensional orthogonal transform in the vertical direction.

Note that the transform matrix derivation section 351 in FIG. 37 corresponds to the transform matrix derivation section 001 in FIG. 22.

<Flow of Primary Transform Process>

Figure 38:
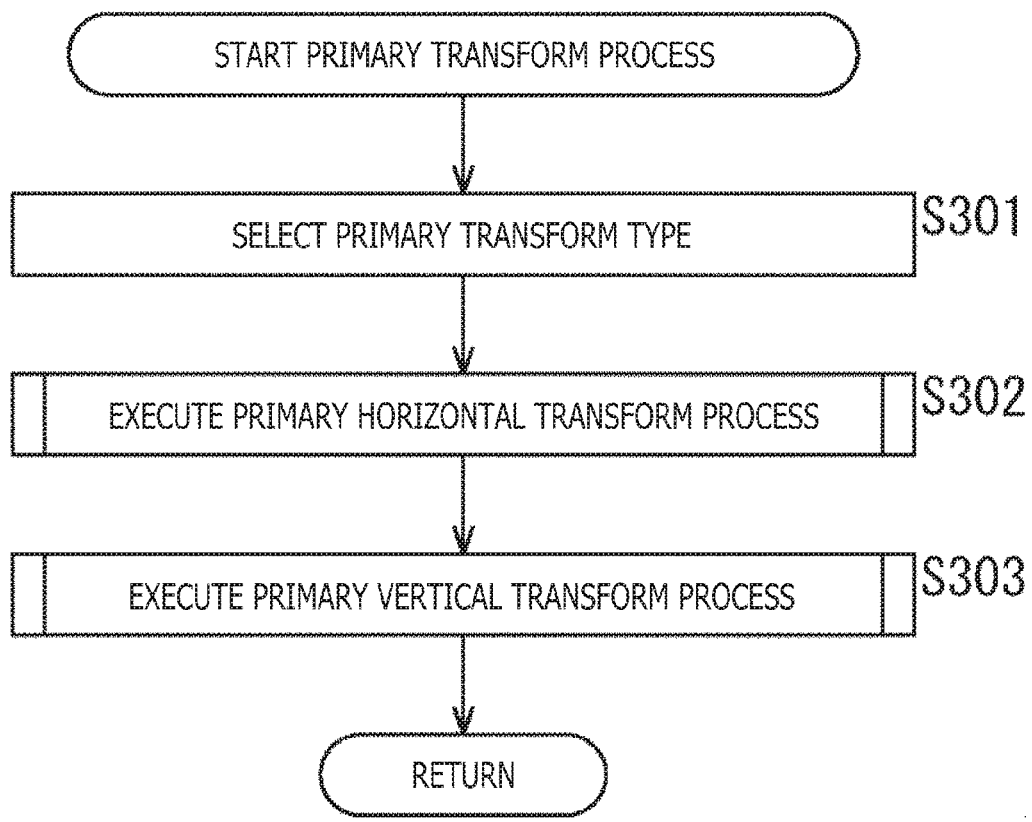
FIG. 38 is a flowchart describing an example of a flow of a primary transform process.

Next, an example and the like of a flow of a process executed based on the abovementioned configuration will be described. An example of a flow of the primary transform process executed in step S132 of FIG. 30 in this case will be described with reference to a flowchart of FIG. 38.

Once the primary transform process is started, the primary transform selection section 311 of the primary transform section 152 (FIG. 35) selects the transform type identifier TrTypeIdxH of the primary horizontal transform (and the transform type TrTypeH designated by the identifier) and the transform type identifier TrTypeIdxV of the primary vertical transform (and the transform type TrTypeV designated by the identifier) as described above in step S301.

In step S302, the primary horizontal transform section 312 applies, to the predicted residual D, the primary horizontal transform process corresponding to the transform type identifier TrTypeIdxH of the primary horizontal transform obtained in step S301 and derives the transform coefficient Coeff_Phor after primary horizontal transform.

In step S303, the primary vertical transform section 313 applies, to the primary horizontal transform result (transform coefficient Coeff_Phor obtained by the primary horizontal transform), the primary vertical transform process corresponding to the transform type identifier TrTypeIdxV of the primary vertical transform obtained in step S301 and derives the transform coefficient Coeff_Pver after primary vertical transform (transform coefficient Coeff_P obtained by the primary transform).

Once the process of step S303 is finished, the primary transform process ends, and the process returns to FIG. 30.

In the primary transform process as described above, the process according to the present technique is executed in the process of step S302 or step S303. Therefore, the primary transform process can be executed to suppress the increase is the memory capacity necessary for the primary horizontal transform process or the primary vertical transform process.

<11. Embodiment in Inverse Primary Transform>
<Inverse Primary Transform Section>

Figure 39:
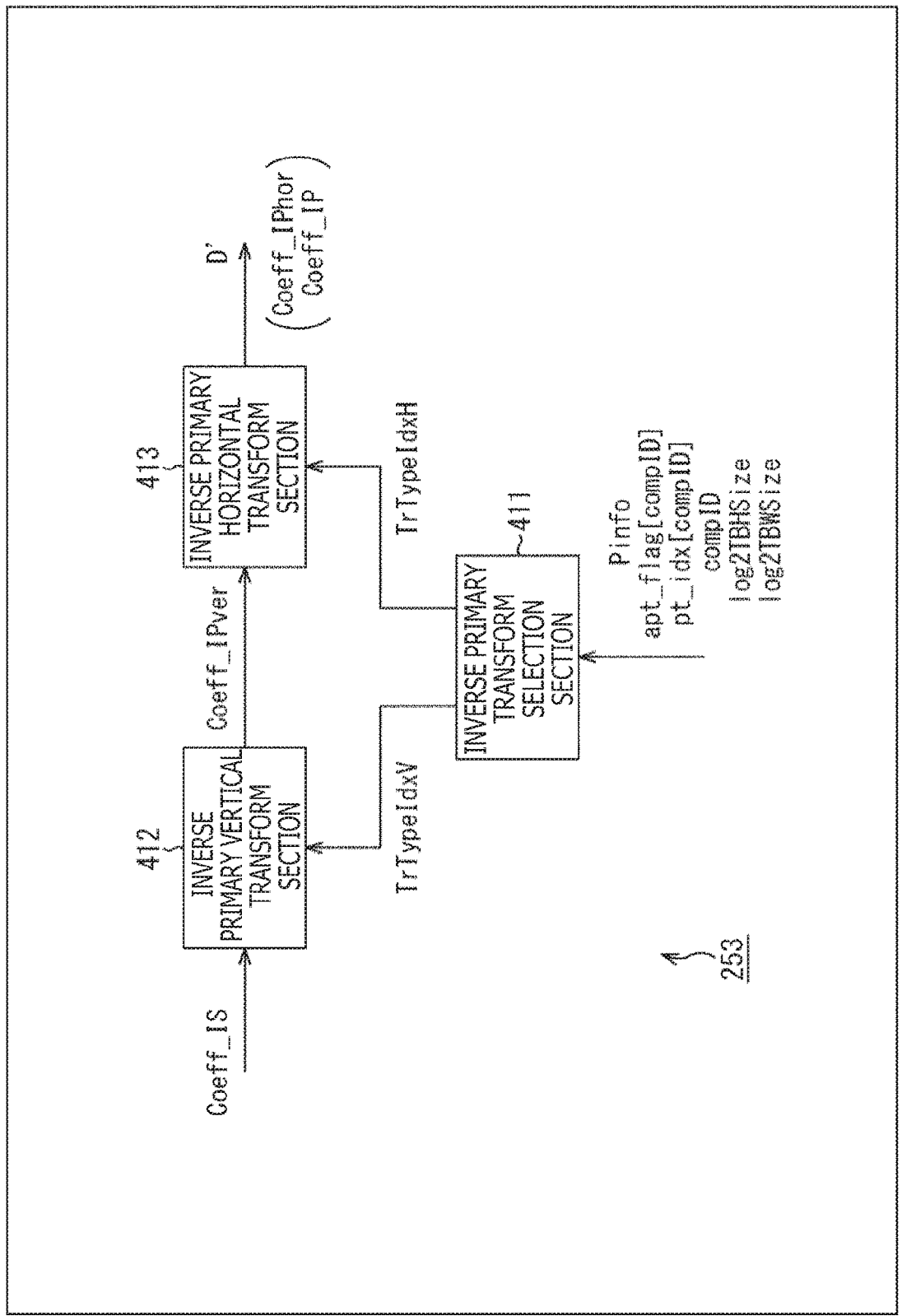
FIG. 39 is a block diagram illustrating a main configuration example of an inverse primary transform section.

Next, a configuration of the image decoding apparatus 200 in the case of the present embodiment will be described. FIG. 39 is a block diagram illustrating a main configuration example of the inverse primary transform section 253 (FIG. 32) in this case. As illustrated in FIG. 39, the inverse primary transform section 253 includes an inverse primary transform selection section 411, an inverse primary vertical transform section 412, and an inverse primary horizontal transform section 413.

The inverse primary transform selection section 411 receives the prediction mode information. PInfo, the component identifier compID, the adaptive primary transform flag apt_flag[compID], and the primary transform identifier pt_idx[compID]. The inverse primary transform selection section 411 refers to the information to derive the transform type identifier TrTypeIdxV of the inverse primary vertical transform and the transform type identifier TrTypeIdxH of the inverse primary vertical transform. The inverse primary transform selection section 411 supplies the derived transform type identifier TrTypeIdxV of the inverse primary vertical transform to the inverse primary vertical transform section 412. In addition, the inverse primary transform selection section 411 supplies the derived transform type identifier TrTypeIdxH of the inverse primary horizontal transform to the inverse primary horizontal transform section 413.

The inverse primary vertical transform section 412 receives the transform coefficient Coeff_IS obtained by the inverse second transform, the transform type identifier TrTypeIdxV of the inverse primary vertical transform, and information regarding the size of the transform block. The information regarding the size of the transform block may be a natural number N indicating the dimension (the number of coefficients) in the horizontal direction or the vertical direction of the transform block or may be log 2TBHSize (logarithm of height) indicating the height of the transform block (N=1<<log 2TBHSize). The inverse primary vertical transform section 412 applies an inverse primary vertical transform IPver defined by the transform type identifier TrTypeIdxV and the size of the transform block to the transform coefficient Coeff_IS obtained by the inverse secondary transform and derives a transform coefficient Coeff_IPver after inverse primary vertical transform. The inverse primary vertical transform section 412 supplies the transform coefficient Coeff_IPver obtained by the inverse primary vertical transform to the inverse primary horizontal transform section 413.

The inverse primary horizontal transform section 413 receives the transform coefficient Coeff_IPver obtained by the inverse primary vertical transform, the transform type identifier TrTypeIdxH of inverse primary horizontal transform, and information regarding the size of the transform block. The information regarding the size of the transform block may be a natural number N indicating the dimension (the number of coefficients) in the horizontal direction or the vertical direction of the transform block or may be log 2TBWSize (logarithm of width) indicating the width of the transform block (N=1<<log 2TBWSize). The inverse primary horizontal transform section 413 applies an inverse primary horizontal transform IPhor defined by the transform type identifier TrTypeIdxH and the size of the transform block to the transform coefficient Coeff_IPver obtained by the inverse primary vertical transform supplied from the inverse primary vertical transform section 412 and derives a transform coefficient Coeff_IPhor after inverse primary horizontal transform (that is, transform coefficient Coeff_IP obtained by inverse primary transform). The inverse primary horizontal transform section 413 outputs the transform coefficient Coeff_IPhor obtained by the inverse primary horizontal transform, as the predicted residual D', to the outside of the inverse primary transform section 253 (supplies the predicted residual D' to the computation section 215).

In the inverse primary transform section 253 configured in this way, each of the inverse primary vertical transform section 412 and the inverse primary horizontal transform section 413 serves as a derivation section and an orthogonal transform section to execute the process according to the present technique.

That is, the inverse primary vertical transform section 412 serves as a derivation section to derive a second transform matrix for inverse one-dimensional orthogonal transform in the vertical direction. Further, the inverse primary vertical transform section 412 serves as an inverse orthogonal transform section and uses the second transform matrix for inverse one-dimensional orthogonal transform in the vertical direction derived by the derivation section to perform the inverse one-dimensional orthogonal transform in the vertical direction. Therefore, the inverse primary vertical transform section 412 can suppress the increase in the memory capacity necessary for the inverse one-dimensional orthogonal transform in the vertical direction.

In addition, the inverse primary horizontal transform section 413 serves as a derivation section to derive a second transform matrix for inverse one-dimensional orthogonal transform in the horizontal direction. Further, the inverse primary horizontal transform section 413 serves as an orthogonal transform section and uses the second transform matrix for inverse one-dimensional orthogonal transform in the horizontal direction derived by the derivation section, to perform the inverse one-dimensional orthogonal transform in the horizontal direction. Therefore, the inverse primary horizontal transform section 413 can suppress the increase is the memory capacity necessary for the inverse one-dimensional orthogonal transform in the horizontal direction.

<Inverse Primary Vertical Transform Section>

Figure 40:
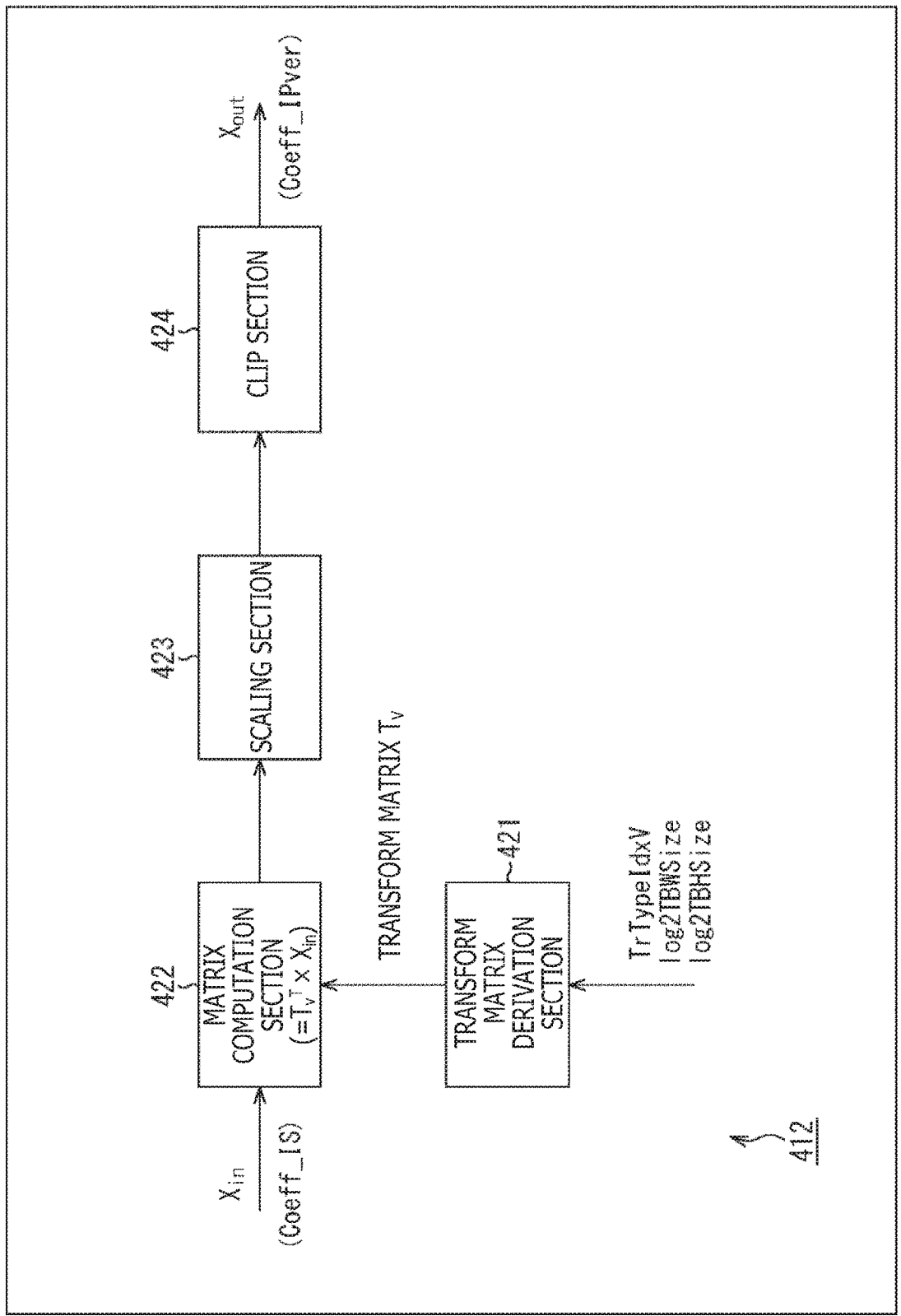
FIG. 40 is a block diagram illustrating a main configuration example of an inverse primary vertical transform section.

FIG. 40 is a block diagram illustrating a main configuration example of the inverse primary vertical transform section 412 in FIG. 39. As illustrated in FIG. 40, the inverse primary vertical transform section 412 includes a transform matrix derivation section 421, a matrix computation section 422, a scaling section 423, and a clip section 424.

The transform matrix derivation section 421 receives the transform type identifier TrTypeIdxV of the inverse primary vertical transform and the information regarding the size of the transform block to derive a transform matrix TV for inverse primary vertical transform in the same size as the transform block (transform matrix TV for inverse one-dimensional orthogonal transform in the vertical direction) and corresponding to the transform type identifier TrTypeIdxV of the inverse primary vertical transform. The transform matrix derivation section 421 supplies the transform matrix TV to the matrix computation section 422.

The matrix computation section 422 uses the transform matrix TV supplied from the transform matrix derivation section 421, to apply the inverse one-dimensional orthogonal transform in the vertical direction to input data Xin (that is, transform block of transform coefficient Coeff_IS obtained by the inverse secondary transform), and obtains intermediate data Y1. The computation can be expressed by an equation of matrix as in the following Equation (30).

[Math. 13]

$$Y1 = T_v^T \times X_{in} \quad (30)$$

The matrix computation section 422 supplies the intermediate data Y1 to the scaling section 423.

The scaling section 423 scales a coefficient Y1[i,j] of each row i, column j component of the intermediate data Y1 at a predetermined amount of shift SIV to obtain intermediate data Y2. The scaling can be expressed as in the following Equation (31).

[Math. 14]

$$Y2[i,j] = Y1[i,j] >> S_{IV} \quad (31)$$

The scaling section 423 supplies the intermediate data Y2 to the clip section 424.

The clip section 424 clips the value of a coefficient Y2[i,j] of each row i, column j component of the intermediate data Y2 to derive output data Xout (that is, transform coefficient Coeff_IPver obtained by the inverse primary vertical transform). The process can be expressed as in Equation (11) above.

The clip section 424 outputs the output data Xout (transform coefficient Coeff_IPver obtained by the inverse primary vertical transform) to the outside of the inverse primary vertical transform section 412 (supplies the output data Xout to the inverse primary horizontal transform section 413).

In the inverse primary vertical transform section 412 configured in this way, the transform matrix derivation section 421 serves as a derivation section to execute the process according to the present technique. In addition, the matrix computation section 422 serves as an orthogonal transform section to execute the process according to the present technique. Therefore, the inverse primary vertical transform section 412 can suppress the increase in the memory capacity necessary for the inverse one-dimensional orthogonal transform in the vertical direction.

Note that the transform matrix derivation section 421 in FIG. 40 corresponds to the transform matrix derivation section 001 in FIG. 22.

<Inverse Primary Horizontal Transform Section>

Figure 41:
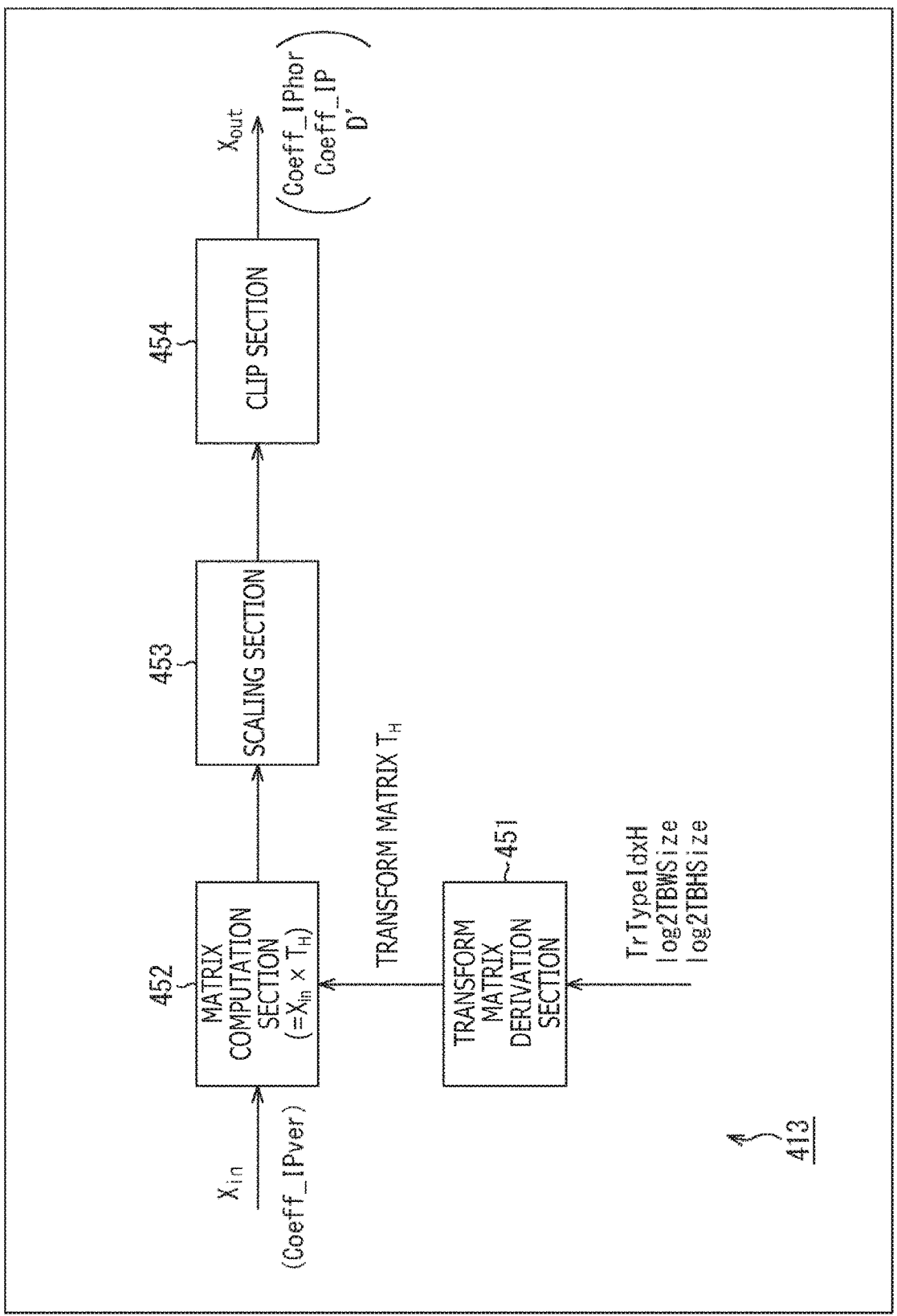
FIG. 41 is a block diagram illustrating a main configuration example of an inverse primary horizontal transform section.

FIG. 41 is a block diagram illustrating a main configuration example of the inverse primary horizontal transform section 413 in FIG. 39. As illustrated in FIG. 41, the inverse primary horizontal transform section 413 includes a transform matrix derivation section 451, a matrix computation section 452, a scaling section 453, and a clip section 454.

The transform matrix derivation section 451 receives the transform type identifier TrTypeIdxH of the inverse primary horizontal transform and the information regarding the size of the transform block to derive a transform matrix TH for inverse primary horizontal transform in the same size as the transform block (transform matrix TH for inverse one-dimensional orthogonal transform in the horizontal direction) and corresponding to the transform type identifier TrTypeIdxH of the inverse primary horizontal transform. The transform matrix derivation section 451 supplies the transform matrix TH to the matrix computation section 452.

The matrix computation section 452 uses the transform matrix TH supplied from the transform matrix derivation section 451, to apply the inverse one-dimensional orthogonal transform in the horizontal direction to input data Xin (that is, transform block of transform coefficient Coeff_IPver obtained by the inverse primary vertical transform), and obtains intermediate data Y1. The computation can be expressed by an equation of matrix as in the following Equation (32).

[Math. 15]

$$Y1 = X_{in} \times T_H \quad (32)$$

The matrix computation section 452 supplies the intermediate data Y1 to the scaling section 453.

The scaling section 453 scales a coefficient Y1[$i,j$] of each row i, column j component of the intermediate data Y1 at a predetermined amount of shift SIH to obtain intermediate data Y2. The scaling can be expressed as in the following Equation (33).

[Math. 16]

$$Y2[i,j] = Y1[i,j] >> S_{IH} \quad (33)$$

The scaling section 453 supplies the intermediate data Y2 to the clip section 454.

The clip section 454 clips the value of a coefficient Y2[$i,j$] of each row i, column j component of the intermediate data Y2 to derive output data Xout (that is, transform coefficient Coeff_IPhor after inverse primary horizontal transform). The process can be expressed as in Equation (11) above.

The clip section 454 outputs the output data Xout (transform coefficient Coeff_IPhor obtained by the inverse primary horizontal transform (transform coefficient Coeff_IP obtained by the inverse primary transform)) as the predicted residual D' to the outside of the inverse primary horizontal transform section 413 (supplies the predicted residual D' to the computation section 215).

In the inverse primary horizontal transform section 413 configured in this way, the transform matrix derivation section 451 serves as a derivation section to execute the process according to the present technique. In addition, the matrix computation section 452 serves as an inverse orthogonal transform section to execute the process according to the present technique. Therefore, the inverse primary horizontal transform section 413 can suppress the increase in the memory capacity necessary for the inverse one-dimensional orthogonal transform in the horizontal direction.

Note that the transform matrix derivation section 451 in FIG. 41 corresponds to the transform matrix derivation section 001 in FIG. 22.

<Flow of Inverse Primary Transform Process>

Figure 42:
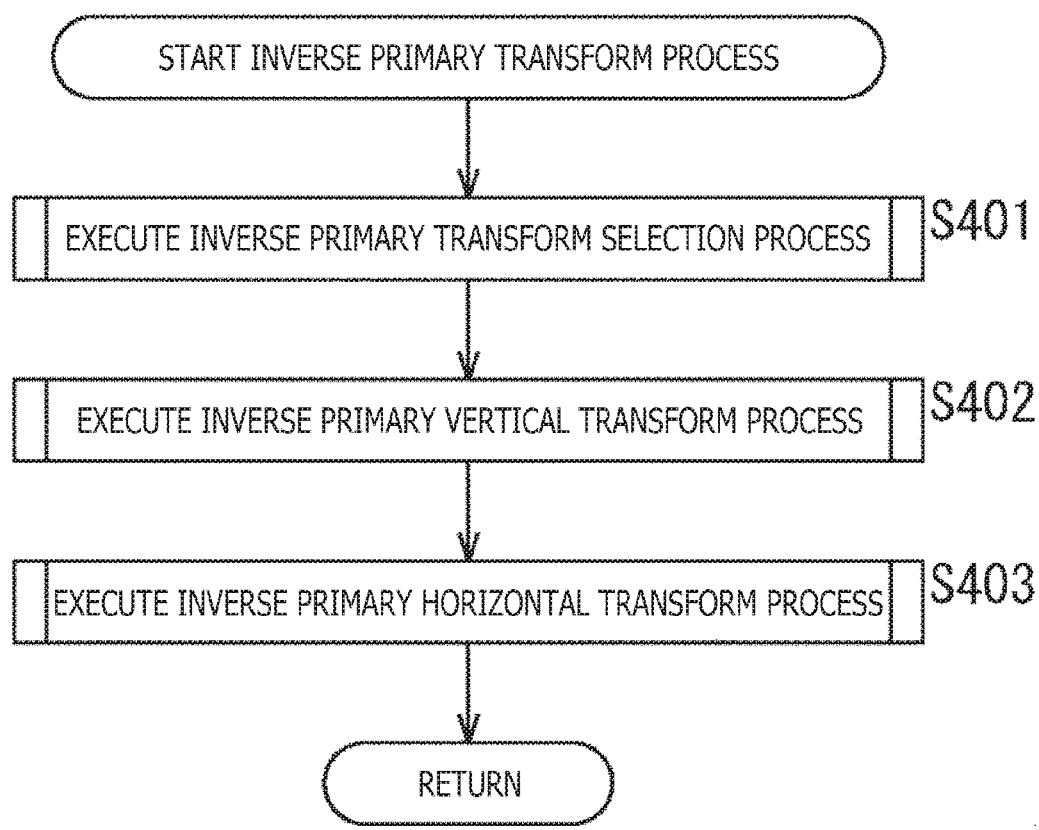
FIG. 42 is a flowchart describing an example of a flow of an inverse primary transform process.

Next, as example and the like of a flow of the process executed based on the configuration of the image decoding apparatus 200 will be described. An example of a flow of the inverse primary transform process executed in step S233 of FIG. 34 in this case will be described with reference to a flowchart of FIG. 42.

Once the inverse primary transform process is started, the inverse primary transform selection section 411 of the inverse primary transform section 253 (FIG. 39) executes an inverse primary transform selection process in step S401 and selects the transform type identifier TrTypeIdxV (or the transform type TrTypeV) of the inverse primary vertical transform and the transform type identifier TrTypeIdxH (or the transform type TrTypeH) of the inverse primary horizontal transform.

In step S402, the inverse primary vertical transform section 412 applies, to the transform coefficient Coeff_IS obtained by the inverse secondary transform, an inverse primary vertical transform process corresponding to the transform type identifier TrTypeIdxV of the inverse primary vertical transform obtained in step S401 and derives the transform coefficient Coeff_IPver after inverse primary vertical transform.

In step S403, the inverse primary horizontal transform section 413 applies, to the transform coefficient Coeff_IPver obtained by the inverse primary vertical transform, an inverse primary horizontal transform process corresponding to the transform type identifier TrTypeIdxH of the inverse primary horizontal transform obtained in step S401 and derives the transform coefficient. Coeff_IPhor after inverse primary horizontal transform (that is, coefficient Coeff_IP after inverse primary transform (predicted residual D')).

Figure 34:
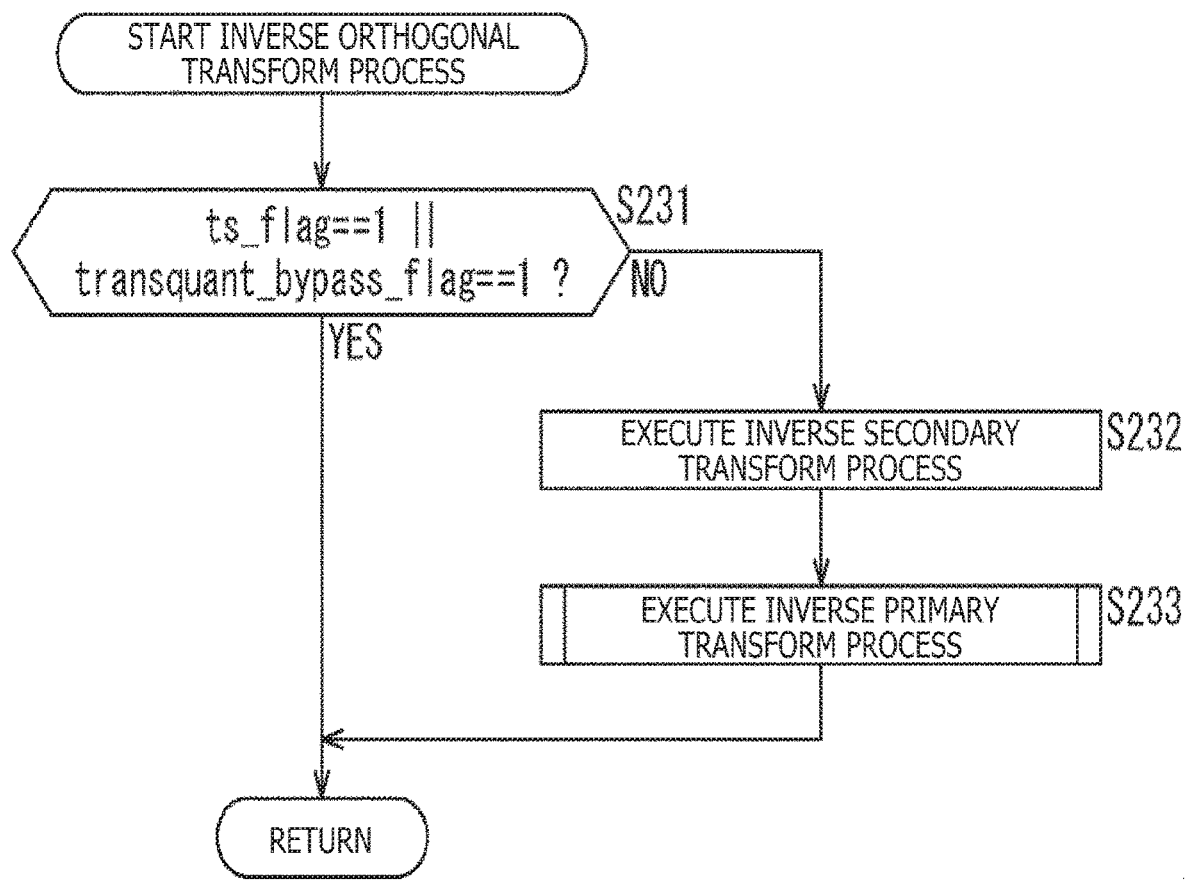
FIG. 34 is a flowchart describing an example of a flow of an inverse orthogonal transform process.

Once the process of step S403 is finished, the inverse primary transform process ends, and the process returns to FIG. 34.

In the inverse primary transform process as described above, the process according to the present technique is executed in the process of step S402 and step S403. Therefore, the inverse primary transform process can be executed to suppress the increase in the memory capacity necessary for the inverse primary vertical transform process and the inverse primary horizontal transform process.

<12. Derivation of Transform Matrix>
<Another Example of Transform Matrix Derivation>

While the example of deriving the transform matrix in the 1/2 scale of the prepared transform matrix has been described above, the size of the transform matrix to be derived is not limited to the example as long as the size is smaller than the prepared transform matrix.

For example, it is assumed that the maximum size (for example, 64) of the transform block is maxTbS, the maximum size (for example, 32) of the transform block in which the AMT can be applied is maxTbAMT, and a size nTbS of the one-dimensional transform. (also referred to as a 1D transform) is nTbS<=maxTbAMT<maxTbS. The similarity (axisymmetric, transposed, or opposite signs) of a submatrix of a (maxTbS)×(maxTbS) transform matrix and an (nTbS)× (nTbS) transform matrix designated by the transform type trType may be used to derive the (nTbS)×(nTbS) transform matrix from the (maxTbS)×(maxTbS) transform matrix.

That is, the (maxTbS)×(maxTbS) transform matrix may be sampled based on predetermined sampling parameters to derive the submatrix, and an operation, such as flip and sign inversion, may appropriately be applied to the submatrix to thereby derive the (nTbS)×(nTbS) transform matrix of the transform type trType.

In this way, the (maxTbS)×(maxTbS) transform matrix and the (nTbS)×(nTbS) transform matrix of the transform type trType can be shared. Therefore, the increase in the LUT size of the transform matrix can be suppressed (LUT size can be reduced). In addition, the matrix computation of the (maxTbS)×(maxTbS) transform matrix and the matrix computation of the (nTbS)×(nTbS) transform matrix of the transform type trType can be shared. That is, the same computation circuit can be used to perform the matrix computation using the transform matrices. Therefore, the increase in the circuit scale can be suppressed (circuit scale can be reduced).

<Sampling Parameters>

Here, the sampling parameters will be described. The sampling parameters may be any parameters. For example, the sampling parameters may include a sampling interval stepsize indicating a row interval in sampling, a row offset offsetCol indicating an offset (row location) of sampling, and a column offset offsetRow indicating an offset (column location) of sampling. That is, the sampling interval stepsize is a parameter indicating the number of rows after which a sample is taken each time. In addition, the row offset offsetCol is a parameter indicating the location of the first row (row number) in which the sampling is started. In addition, the column offset offsetRow is a parameter indicating the position of the first column (column number) in which the sampling is started. Note that in the present specification, the row number and the column number of the transform matrix are started from "0" (that is, row 0, column 0). The derivation method of the parameters depends on the transform type of the transform matrix to be derived.

<Derivation Example of Each Transform Type>

Figure 43:
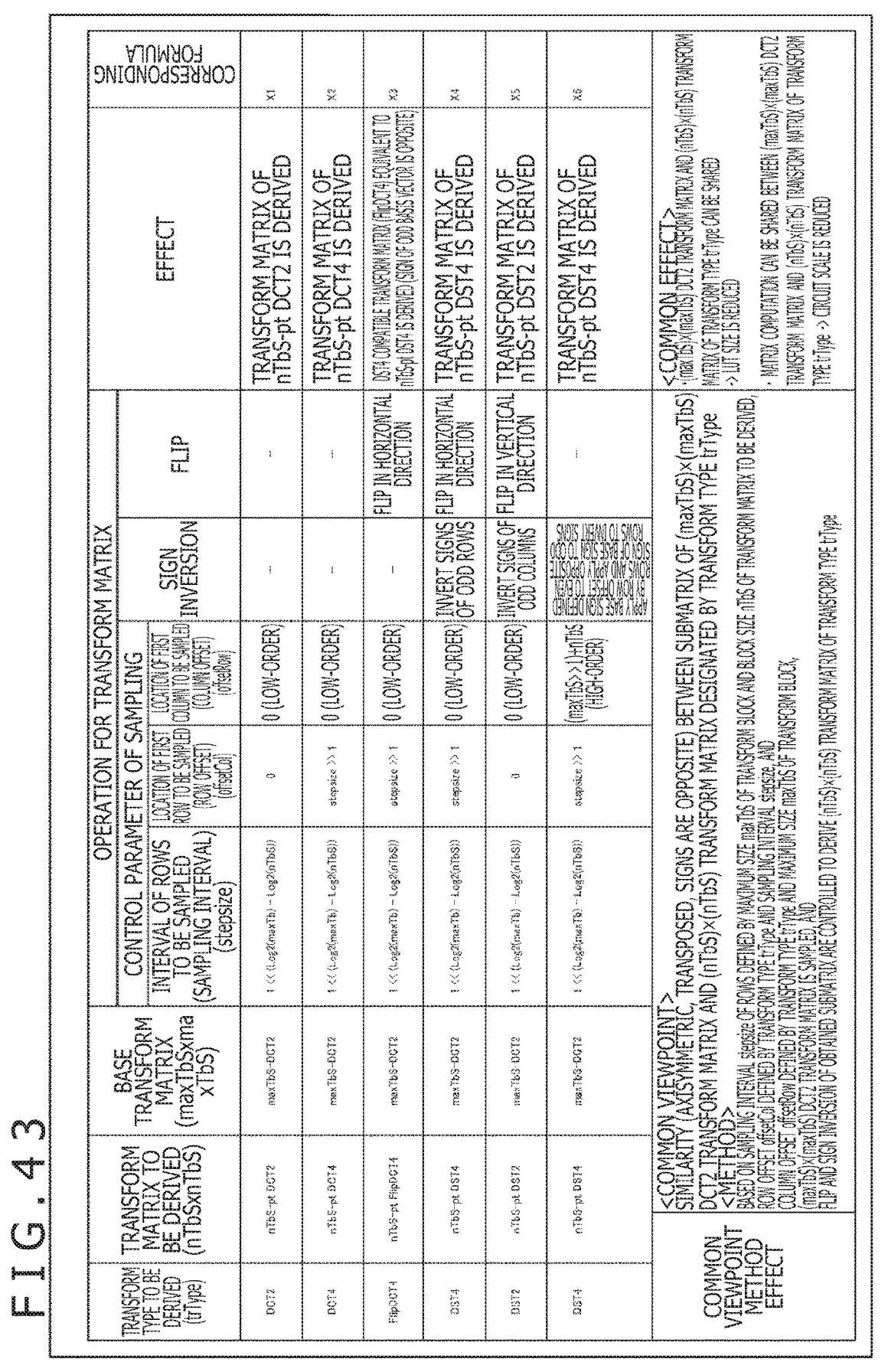

FIG. 43 illustrates an example of deriving the transform matrix of each transform type. In the table illustrated in FIG. 43, the operations and the sampling parameters (control parameters of sampling) in deriving the transform matrix are illustrated in each row for each transform type of the transform matrix to be derived.

For example, a row in which the transform type (trType) to be derived is DCT2 will be described. In this case, the transform matrix to be derived is a transform matrix nTbS-pt DCT2 of transform type DCT2 and size nTbS×nTbS. In addition, the base transform matrix is a transform matrix maxTbS-pt DCT2 of transform type DCT2 and size maxTbS×maxTbS. For the sampling parameters, the sampling interval stepsize is "1<<(Log 2(maxTbS)−Log 2(nTbS))," the row offset offsetCol is "0," and the column offset offsetRow is "0 (low-order)." For the operations, only the sampling is performed, and the sign inversion operation and the flip operation are skipped. In this way, the transform matrix nTbS-pt DCT2 can be derived from the base transform matrix maxTbS-pt DCT2.

Next, a row in which the transform type (trType) to be derived is DCT4 will be described. In this case, the transform matrix to be derived is a transform matrix nTbS-pt DCT4 of transform type DCT4 and size nTbS×nTbS. In addition, the base transform matrix is a transform matrix maxTbS-pt DCT2 of transform type DCT2 and size maxTbS×maxTbS. For the sampling parameters, the sampling interval stepsize is "1<<(Log 2(maxTbS)−Log 2(nTbS))," the row offset offsetCol is "stepsize>>1 (that is, 1/2 of stepsize)," and the column offset offsetRow "0 (low-order)." For the operations, only the sampling is performed, and the sign inversion operation and the flip operation are skipped. In this way, the transform matrix nTbS-pt DCT4 can be derived from the base transform matrix maxTbS-pt DCT2.

Next, a row in which the transform type (trType) to be derived is FlipDCT4 will be described. In this case, the transform matrix to be derived is a transform matrix nTbS-pt FlipDCT4 of transform type FlipDCT4 and size nTbS×nTbS. In addition, the base transform matrix is a transform matrix maxTbS-pt DCT2 of transform type DCT2 and size maxTbS×maxTbS, For the sampling parameters, the sampling interval stepsize is "1<<(Log 2(maxTbS)−Log 2(nTbS))," the row offset offsetCol is "stepsize>>1 (that is, 1/2 of stepsize)," and the column offset offsetRow is "0 (low-order)." For the operations, the flip operation in the horizontal direction (flip operation of each row) is performed after the sampling, and the sign inversion operation is skipped. In this way, a DST4 compatible transform matrix nTbS-pt DCT4 equivalent to the transform matrix nTbS-pt DST4 (however, the signs of the ODD basis vectors are opposite) can be derived from the base transform matrix maxTbS-pt DCT2.

Next, a row (fourth row from the top excluding the row of item names) in which the transform type (trType) to be derived is DST4 will be described. In this case, the transform matrix to be derived is a transform matrix nTbS-pt DST4 of transform type DST4 and size nTbS×nTbS. In addition, the base transform matrix is a transform matrix maxTbS-pt DCT2 of transform type DCT2 and size maxTbS×maxTbS. For the sampling parameters, the sampling interval stepsize is "1<<(Log 2(maxTbS)−Log 2(nTbS))," the row offset offsetCol is "stepsize>>1 (that is, 1/2 of stepsize)," and the column offset offsetRow is "0 (low-order)." For the operations, the flip operation in the horizontal direction (flip operation of each row) and the sign inversion operation of the odd rows are performed after the sampling. In this way, the transform matrix nTbS-pt DST4 can be derived from the base transform matrix maxTbS-pt DCT2.

Next, a row in which the transform type (trType) to be derived is DST2 will be described. In this case, the transform matrix to be derived is a transform matrix nTbS-pt DST2 of transform type DST2 and size nTbS×nTbS. In addition, the base transform matrix is a transform matrix maxTbS-pt DCT2 of transform type DCT2 and size maxTbS×maxTbS. For the sampling parameters, the sampling interval stepsize is "1<<(Log 2(maxTbS)−Log 2(nTbS))," the row offset offsetCol is "0," and the column offset offsetRow is "0 (low-order)." For the operations, the flip operation in the vertical direction (flip operation of each column) and the sign inversion operation of the odd columns are performed after the sampling. In this way, the transform matrix nTbS-pt DST2 can be derived from the base transform matrix maxTbS-pt DCT2.

Next, a row (sixth row from the top excluding the row of item names) in which the transform type (trType) to be derived is DST4 will be described. In this case, the transform matrix to be derived is a transform matrix nTbS-pt DST4 of transform type DST4 and size nTbS×nTbS. In addition, the base transform matrix is a transform matrix maxTbS-pt DCT2 of transform type DCT2 and size maxTbS×maxTbS. For the sampling parameters, the sampling interval stepsize is "1<<(Log 2(maxTbS)−Log 2(nTbS))," the row offset offsetCol is "stepsize>>1 (that is, 1/2 of stepsize)," and the column offset offsetRow is "(maxTbS>>1)+nTbS (high-order)." For the operations, a sign inversion operation of applying a base sign basesign defined by the row offset to the even rows and applying an opposite sign −basesign of the base sign to the odd rows is performed after the sampling. In this way, the transform matrix nTbS-pt DST4 can be derived from the base transform matrix maxTbS-pt DCT2.

<Transform Matrix Derivation Apparatus>

Figure 44:
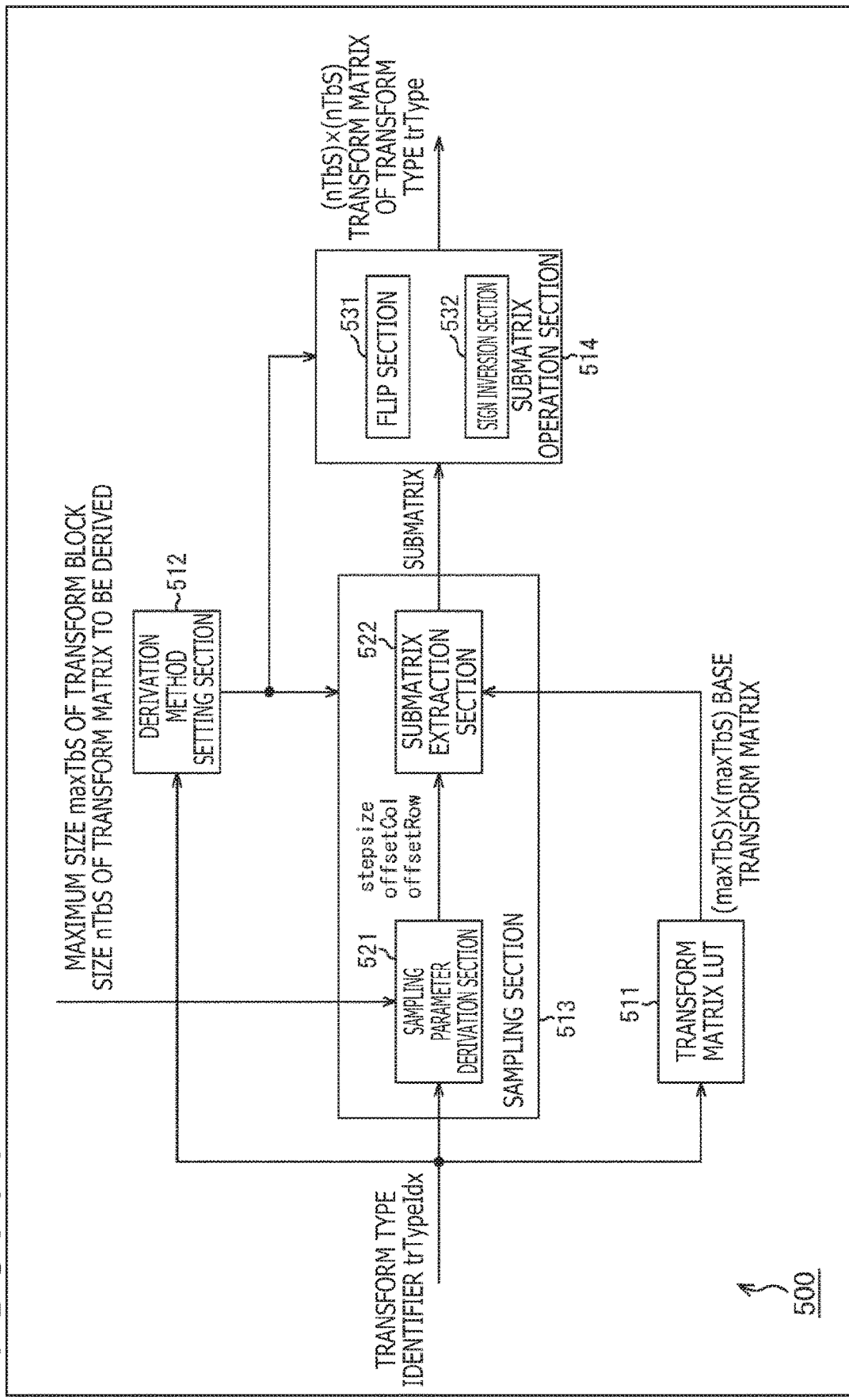
FIG. 44 is a diagram illustrating an example of a derivation method of transform matrices corresponding to transform type identifiers.

Next, a configuration for deriving the transform matrix as described above will be described. FIG. 44 is a block diagram illustrating an example of a main configuration of a transform matrix derivation apparatus as a mode of an image processing apparatus according to the present technique. A transform matrix derivation apparatus 500 illustrated in FIG. 44 is an apparatus that derives a transform matrix.

Note that FIG. 44 illustrates main processing sections, flows of data, and the like, and FIG. 44 may not illustrate everything. That is, in the transform matrix derivation apparatus 500, there may be processing sections not illustrated as blocks in FIG. 44, and there may be flows of processes or data not indicated by arrows or the like in FIG. 44.

As illustrated in FIG. 44, the transform matrix derivation apparatus 500 includes a transform matrix LUT 511, a derivation method setting section 512, a sampling section 513, and a submatrix operation section 514.

<Transform Matrix LUT>

The transform matrix LUT 511 includes any storage medium and stores an LUT of transform matrices to be used as base transform matrices. The transform matrix LUT 511 supplies, to the sampling section 513 (submatrix extraction section 522 of the sampling section 513), the base transform matrix C corresponding to the transform type identifier trTypeIdx designated from the outside. For example, the transform matrix LUT 511 supplies the transform matrix maxTbS-pt DCT2 of transform type DCT2 and size maxTbS×maxTbS as the base transform matrix C to the sampling section 513.

<Derivation Method Setting Section>

The derivation method setting section 512 includes, for example, a CPU (Central Processing Section), a ROM (Read Only Memory), a RAM (Random Access Memory), and the like and executes a process regarding settings of the derivation method of the transform matrix. For example, the derivation method setting section 512 selects the derivation method corresponding to the transform type identifier trTypeIdx designated from the outside and supplies the information indicating the derivation method to the sampling section 513 and the submatrix operation section 514.

<Sampling Section>

The sampling section 513 includes, for example, a CPU, a ROM, a RAM, and the like and executes a process regarding sampling of the transform matrix. For example, the sampling section 513 derives, as a submatrix, a matrix obtained by sampling matrix elements of the base transform matrix C that is a first transform matrix, based on predetermined sampling parameters. For example, the sampling section 513 uses the maximum size maxTbS of the transform block designated from the outside and the size nTbS of the transform matrix to be derived, according to the derivation method set by the derivation method setting section 512, to set the sampling parameters and uses the sampling parameters to sample the matrix elements of the base transform matrix C (for example, transform matrix maxTbS-pt DCT2) supplied from the transform matrix LUT 511, to generate the submatrix. The sampling section 513 supplies the generated submatrix to the submatrix operation section 514.

As illustrated in FIG. 44, the sampling section 513 includes a sampling parameter derivation section 521 and the submatrix extraction section 522.

<Sampling Parameter Derivation Section>

The sampling parameter derivation section 521 executes a process regarding derivation of sampling parameters. For example, the sampling parameter derivation section 521 derives (sets) the sampling parameters corresponding to the transform type identifier trTypeIdx designated from the outside, the maximum size maxTbS of the transform block designated from the outside, and the size nTbS of the transform matrix to be derived, according to the derivation method set by the derivation method setting section 512. For example, the sampling parameter derivation section 521 derives (sets) sampling parameters, such as the sampling interval stepsize, the row offset offsetCol and the column offset offsetRow. The sampling parameter derivation section 521 supplies the derived sampling parameters to the submatrix extraction section 522.

<Submatrix Extraction Section>

The submatrix extraction section 522 executes a process regarding extraction (sampling) of a submatrix. For example, the submatrix extraction section 522 uses the sampling parameters derived by the sampling parameter derivation section 521, to sample the matrix elements of the base transform matrix C (for example, transform matrix maxTbS-pt DCT2) supplied from the transform matrix LUT 511, to generate a submatrix, according to the derivation method set by the derivation method setting section 512. The submatrix extraction section 522 supplies the extracted submatrix to the submatrix operation section 514.

<Submatrix Operation Section>

The submatrix operation section 514 includes, for example, a CPU, a ROM, a RAM, and the like and executes a process regarding operation for the matrix elements of the submatrix supplied from the sampling section 513. For example, the submatrix operation section 514 applies a certain operation to the matrix elements of the submatrix supplied from the sampling section 513, to derive (generate) a desirable transform matrix, that is, a transform matrix of transform type trType and size (nTbS)×(nTbS), according to the derivation method set by the derivation method setting section 512. For example, the CPU in the submatrix operation section 514 can execute the process to realize a functional block that applies a certain operation to the matrix elements of the t operation submatrix supplied from the sampling section 513, according to the derivation method set by the derivation method setting section 512. For example, the submatrix operation section 514 can realize functional blocks, such as a flip section 531 that realizes a function of flip operation and a sign inversion section 532 that realizes sign inversion operation. That is, the submatrix operation section 514 uses the functional blocks to appropriately apply the flip operation, the sign inversion operation, and the like to the matrix elements of the submatrix supplied from the sampling section 513, to derive (generate) a desirable transform matrix. The submatrix operation section 514 outputs the derived transform matrix to the outside.

<Flip Section>

The flip section 531 applies a flog operation to the submatrix supplied from the sampling section 513. For example, the flip section 531 applies a flip operation in the horizontal direction to the matrix elements of the submatrix (flip operation of matrix elements in each row) or a flip operation in the vertical direction (flip operation of matrix elements in each column), according to the derivation method set by the derivation method setting section 512.

<Sign Inversion Section>

The sign inversion section 532 applies a sign inversion operation to the submatrix supplied from the sampling section 513. For example, the sign inversion section 532 inverts the signs (plus and minus) of the matrix elements of even or odd rows or columns in the matrix elements of the submatrix, according to the derivation method set by the derivation method setting section 512.

The transform matrix derivation apparatus 500 configured in this way can easily derive, from the base transform matrix of a desirable size, the transform matrix of a desirable transform type in a size smaller than the base transform matrix. Therefore, the increase in the LUT size of the transform matrix can be suppressed (LUT size can be reduced). In addition, the matrix computation of the (maxTbS)×(maxTbS) transform matrix and the matrix computation of (nTbS)×(nTbS) transform matrix of transform type trType can be shared. Therefore, the same computation circuit can be used to perform the matrix computation using the transform matrices, and the increase in the circuit scale can be suppressed (circuit scale can be reduced).

<Setting Example of Derivation Method>

Next, the setting of the derivation method by the derivation method setting section 512 will be described. As described above, the derivation method setting section 512 sets the derivation method corresponding to the transform type identifier trTypeIdx supplied from the outside. For example, in a case where the transform types that can be derived by the transform matrix derivation apparatus 500 are DCT2, DCT4, DST4, and DST2, the derivation method setting section 512 may select the derivation method as in a correspondence table illustrated in A of FIG. 45.

In this case, assuming that the transform type identifier trTypeIdx is, for example, "0," a transform matrix transMatrix$_{maxTbS, DCT2}$ (transform matrix maxTbS-pt DCT2) of transform type DCT2 and size maxTbS×maxTbS is selected as the base transform matrix C; a transform matrix transMatrix$_{nTbS, DCT2}$ (transform matrix nTbS-pt DCT2) of transform type DCT2 and size nTbS×nTbS is selected as the derivation transform matrix T that is the transform matrix to be derived; and Equation (X1) is selected as the derivation method. That is, the derivation method described with reference to the row in which the transform type (trType) of the derivation target in the table of FIG. 43 is DCT2 is selected. Note that Equation (X1) will be described later.

In addition, assuming that the transform type identifier trTypeIdx is, for example, "1," a transform matrix transMatrix$_{maxTbS, DCT2}$ (transform matrix maxTbS-pt DCT2) of transform type DCT2 and size maxTbS×maxTbS is selected as the base transform matrix C; a transform matrix transMatrix$_{nTbS, DCT4}$ (transform matrix nTbS-pt DCT4) of transform type DCT4 and size nTbS×nTbS is selected as the derivation transform matrix T; and Equation (X2) is selected as the derivation method. That is, the derivation method described with reference to the row in which the transform type (trType) of the derivation target in the table of FIG. 43 is DCT4 is selected. Note that Equation (X2) will be described later.

In addition, assuming that the transform type identifier trTypeIdx is, for example, "2," a transform matrix transMatrix$_{maxTbS, DCT2}$ (transform matrix maxTbS-pt DCT2) of transform type DCT2 and size maxTbS×maxTbS is selected as the base transform matrix C; a transform matrix transMatrix$_{nTbS, DST4}$ (transform matrix nTbS-pt DST4) of transform type DST4 and size nTbS×nTbS is selected as the derivation transform matrix T; and Equation (X4) or Equation (X6) is selected as the derivation method. That is, the derivation method described with reference to the row in which the transform type (trType) of the derivation target in the table of FIG. 43 is DST4 is selected. Note that Equation (X4) and Equation (X6) will be described later.

In addition, assuming that the transform type identifier trTypeIdx is, for example, "3," a transform matrix transMatrix$_{maxTbS, DCT2}$ (transform matrix maxTbS-pt DCT2) of transform type DCT2 and size maxTbS×maxTbS is selected as the base transform matrix C; a transform matrix transMatrix$_{nTbS, DST2}$ (transform matrix nTbS-pt DST2) of transform type DST2 and size nTbS×nTbS is selected as the derivation transform matrix T; and Equation (X5) is selected as the derivation method. That is, the derivation method described with reference to the row in which the transform type (trType) of the derivation target in the table of FIG. 43 is DST2 is selected. Note that Equation (X5) will be described later.

Further, in a case where, for example, the transform matrix derivation apparatus 500 can derive FlipDCT4 instead of DST4, the derivation method setting section 512 may select the derivation method as in a correspondence table illustrated in B of FIG. 45.

In this case, assuming that the transform type identifier trTypeIdx is, for example, "2," a transform matrix transMatrix$_{maxTbS, DCT2}$ (transform matrix maxTbS-pt DCT2) of transform type DCT2 and size maxTbS×maxTbS is selected as the base transform matrix C; a transform matrix transMatrix$_{nTbS, FlipDCT4}$ (transform matrix nTbS-pt FlipDCT4) of transform type FlipDCT4 and size nTbS×nTbS is selected as the derivation transform matrix T; and Equation (X3) is selected as the derivation method. That is, the derivation method described with reference to the row in which the transform type (trType) of the derivation target in the table of FIG. 43 is FlipDCT4 is selected. Note that Equation (X3) will be described later.

The derivation method of the transform matrix is selected in this way, and the transform matrix derivation apparatus 500 can set the derivation method corresponding to the transform type identifier trTypeIdx supplied from the outside. As a result, the transform matrix derivation apparatus 500 can easily derive, from the base transform matrix in a desirable size, the transform matrix of a desirable transform type in a size smaller than the base transform matrix therefore, increase in the LUT size of the transform matrix can be suppressed (LUT size can be reduced). In addition, the matrix computation of the (maxTbS)×(maxTbS) transform matrix and the matrix computation of (nTbS)×(nTbS) transform matrix of transform type trType can be shared. Therefore, the same computation circuit can be used to perform the matrix computation using the transform matrices, and increase in the circuit scale can be suppressed (circuit scale can be reduced).

<Flow of Transform Matrix Derivation Process>

Next, as example of a flow of the transform matrix derivation process executed by the transform matrix derivation apparatus 500 will be described with reference to a flowchart of FIG. 46.

Once the transform matrix derivation process is started, the submatrix extraction section 522 of the transform matrix derivation apparatus 500 reads out, from the transform matrix LUT 511, the base transform matrix C (that is, transform matrix maxTbS-pt DCT2) corresponding to the transform type identifier trTypeIdx supplied from the outside, in step S501.

In step S502, the derivation method setting section 512 sets the transform matrix derivation method, based on the transform type identifier trTypeIdx supplied from the outside, as described with reference to the table of FIG. 45.

In step S503, the sampling section 513 and the submatrix operation section 514 execute the submatrix derivation process and uses the derivation method set in step S502 to derive the derivation transform matrix T from the base transform matrix C.

Once the process of step S503 is finished, the transform matrix derivation process ends.

<Flow of Submatrix Derivation Process>

Next, an example of a flow of the submatrix derivation process executed in step S503 of FIG. 46 will be described with reference to a flowchart of FIG. 47.

Once the submatrix derivation process is started, the sampling section 513 determines whether or not to perform sampling in step S521. In a case where the sampling section 513 determines to perform sampling according to the derivation method set in step S502 (FIG. 46), the process proceeds to step S522.

In step S522, the sampling parameter derivation section 521 derives the sampling parameters corresponding to the transform type identifier trTypeIdx and the block size (maximum size maxTbs of transform block and size nTbS of transform matrix to be derived), according to the derivation method set in step S502 (FIG. 46). For example, the sampling parameter derivation section 521 derives the sampling interval stepsize, the row offset offsetCol, and the column offset offsetRow.

In step S523, the submatrix extraction section 522 uses the sampling parameters derived in step S522, to extract the submatrix from the base transform matrix C read out in step S501 (FIG. 46).

Once the process, of step S523 is finished, the process proceeds to step S524. Further, in a case where the sampling section 513 determines not to perform sampling in step S521, the process proceeds to step S524.

In step S524, the submatrix operation section 514 determines whether or not to operate the submatrix extracted in step S523. In a case where the submatrix operation section 514 determines to operate the submatrix according to the derivation method set in step S502 (FIG. 46), the process proceeds to step S525.

In step S525, the submatrix operation section 514 executes the submatrix operation process and operates the submatrix extracted in step S523, according to the derivation method set in step S502 (FIG. 46). Once the submatrix operation process is finished, the submatrix derivation process ends, and the process returns to FIG. 46.

Furthermore, in a case where the submatrix operation section 514 determines in step S524 not to operate the submatrix extracted in step S523, the submatrix derivation process ends, and the process returns to FIG. 46.

<Flow of Submatrix Operation Process>

Next, an example of a flow of the submatrix operation process executed in step S525 of FIG. 47 will be described with reference to a flowchart of FIG. 48.

Once the submatrix operation process is started, the submatrix operation section 514 determines whether or not to perform flipping in step S541. In a case where the submatrix operation section 514 determines to perform flipping according to the derivation method set in step S502 (FIG. 46), the process proceeds to step S542.

In step S542, the flip section 531 flips the matrix elements of the submatrix sampled in step S523 (FIG. 47), according to the derivation method set in step S502 (FIG. 46).

Once the process of step S542 is finished, the process proceeds to step S543. Further, in a case where the submatrix operation section 514 determines in step S541 not to perform flipping according to the derivation method set in step S502 (FIG. 46), the process proceeds to step S543.

In step S543, the submatrix operation section 514 determines whether or not to perform sign inversion. In a case where the submatrix operation section 514 determines to perform sign inversion according to the derivation method set in step S502 (FIG. 46), the process proceeds to step S544.

In step S544, the sign inversion section 532 applies the sign inversion to the matrix elements of the submatrix sampled in step S523 (FIG. 47), according to the derivation method set in step S502 (FIG. 46). The submatrix may or may not be subjected to the flip operation in step S542.

Figure 47:
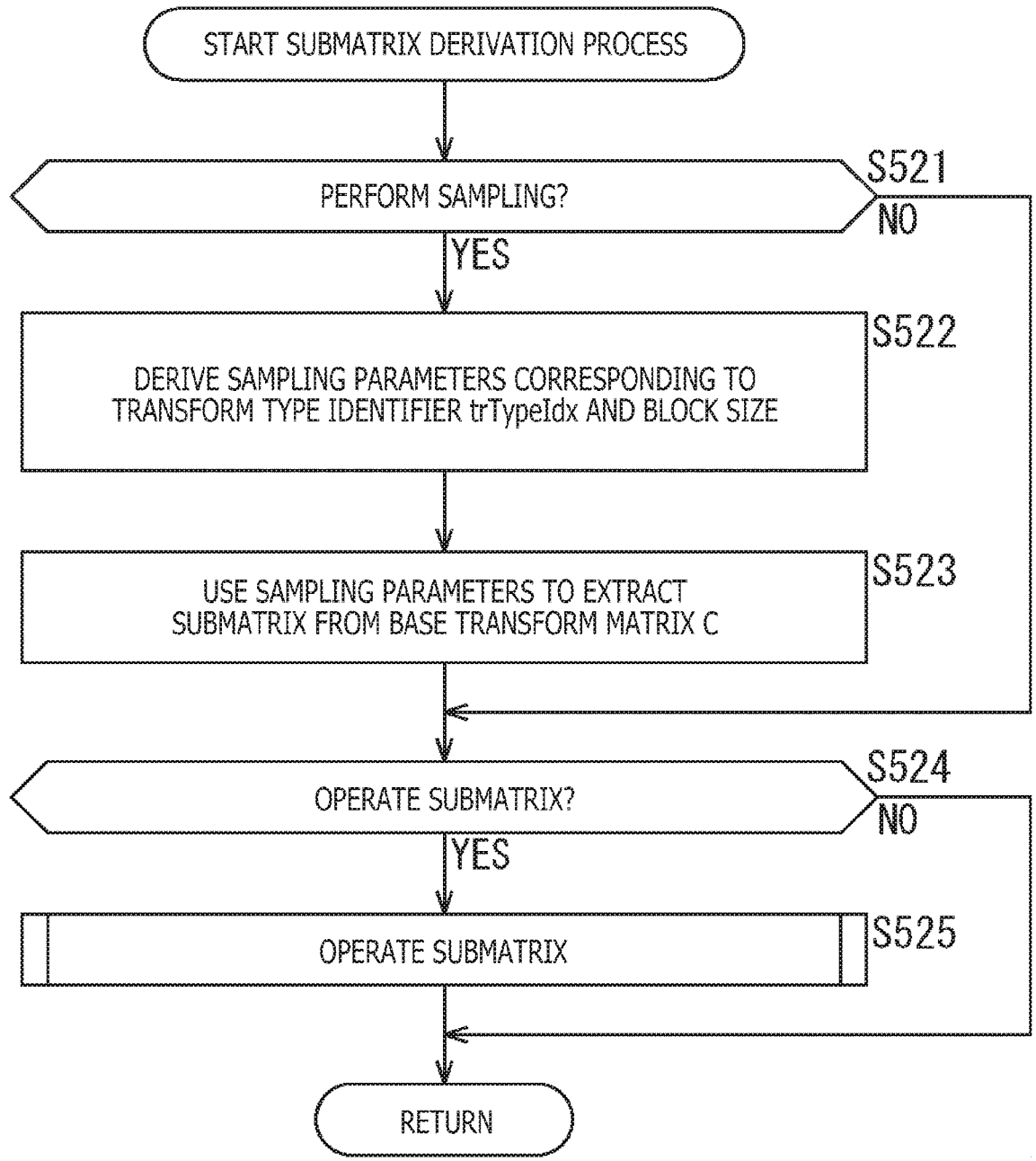
FIG. 47 is a flowchart describing an example of a flow of a submatrix derivation process.
Figure 48:
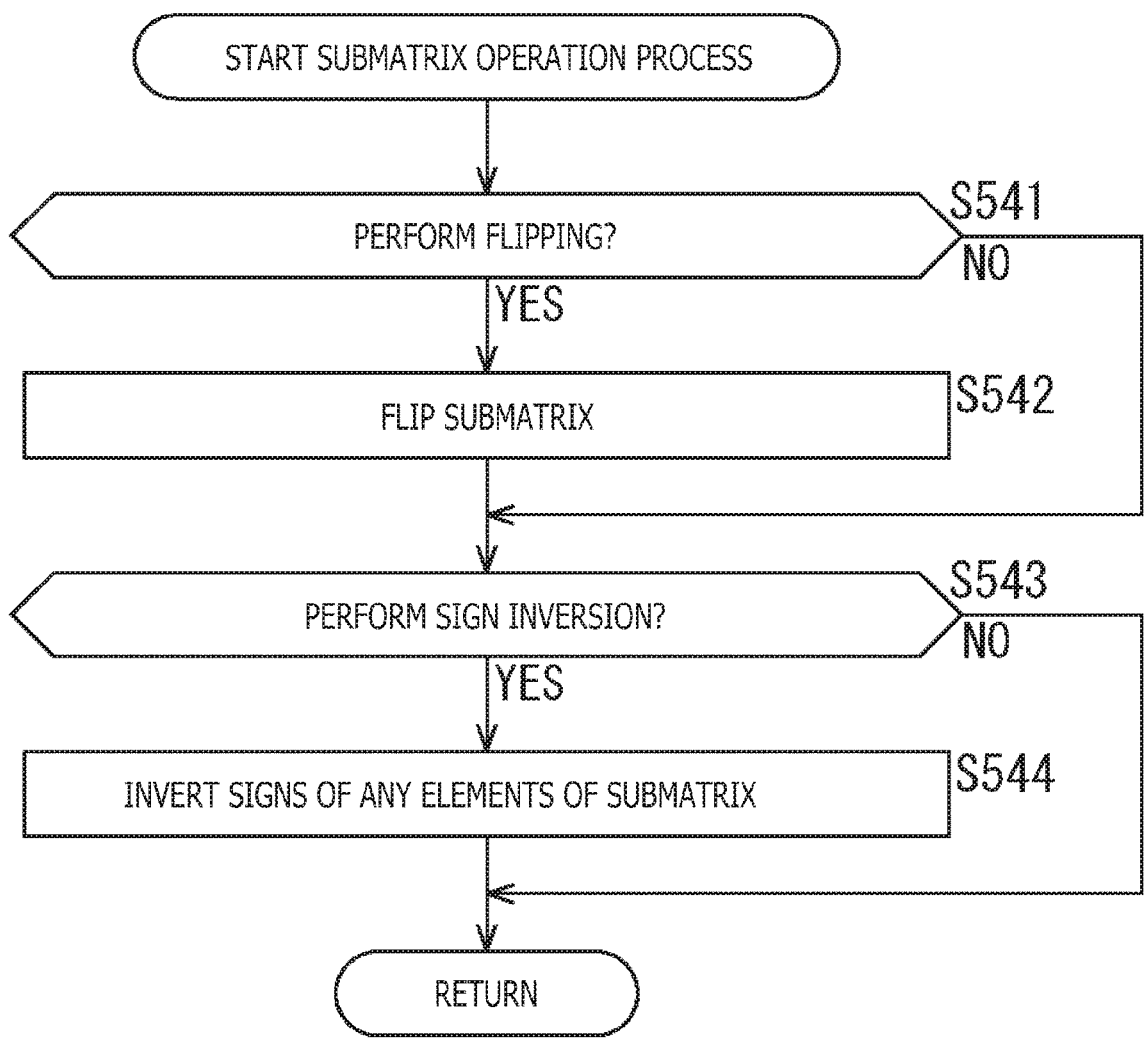
FIG. 48 is a flowchart describing an example of a flow of a submatrix operation process.

Once the process of step S544 is finished, the process returns to FIG. 47. Further, in a case where the submatrix operation section 514 determines in step S543 not to perform the sign inversion according to the derivation method set in step S502 (FIG. 46), the process returns to FIG. 47.

The processes can be executed in this way to set the derivation method corresponding to the transform type identifier trTypeIdx, and the transform matrix of the desirable transform type is the size smaller than the base transform matrix in the desirable size can easily be derived from the base transform matrix. Therefore, the increase in the LUT size of the transform matrix can be suppressed (LUT size can be reduced). In addition, the matrix computation of the (maxTbS)×(maxTbS) transform matrix and the matrix computation of (nTbS)×(nTbS) transform matrix of transform type trType can be shared. Therefore, the same computation circuit can be used to perform the matrix computation using the transform matrices, and the increase in the circuit scale can be suppressed (circuit scale can be reduced).

<Details of Each Derivation Method>

<Case of Transform Type DCT2>

Next, the derivation method of the transform matrix of each transform type will be described in more detail. First, the derivation method of the transform matrix in which the transform type trType is DCT2 will be described. As illustrated in A of FIG. 49, the transform type of the base transform matrix C is DCT2, and the size is 16×16.

For example, in the case of deriving the derivation transform matrix T of transform type DCT2 and size 8×8 from the base transform matrix C in A of FIG. 49, the transform matrix derivation apparatus 500 samples the matrix elements of the gray part of the base transform matrix C illustrated in A of FIG. 49, to derive the derivation transform matrix T. In this case, the sign inversion operation and the flip operation are skipped. That is, the derivation transform matrix T as illustrated in B of FIG. 49 is obtained.

Further, in the case of, for example, deriving the derivation transform matrix T of transform type DCT2 and size 4×4 from the base transform matrix C in A of FIG. 49, the transform matrix derivation apparatus 500 samples the matrix elements surrounded by thick lines in the base transform matrix C illustrated in A of FIG. 49, to derive the derivation transform matrix T. In this case as well, the sign inversion operation and the flip operation are skipped. That is, the derivation transform matrix T as illustrated in C of FIG. 49 is obtained.

In this way, in the case of the derivation method of the transform matrix of DCT2, the sampling interval stepsize is two rows in the case of 8×8 (one row in every two rows is sampled) and is four rows in the case of 4×4 (one row in every four rows is sampled). That is, the sampling interval stepsize is a value exponentiated by the difference between the logarithm base 2 of the maximum size maxTbS of the transform block and the logarithm base 2 of the size nTbS of the transform matrix to be derived. Note that the row offset offsetCol and the column offset offsetRow are "0" in either case. Furthermore, the transform matrix derivation apparatus 500 uses the sampling parameters to perform sampling (without performing the sign inversion operation and the flip operation) to derive the derivation transform matrix T in which the transform type trType is DCT2.

That is, the transform matrix derivation apparatus 500 executes the transform process as expressed in Equation (X1) in D of FIG. 49, to derive the derivation transform matrix T in which the transform type trType is DCT2. Equation (X1) is also illustrated below.

$$transMatrix_{DCT2,nTbS}[j][i] = \qquad (X1)$$
$$transMatrix_{DCT2,maxTbS}[j*stepsize + offsetCol][i + offsetRow] =$$
$$transMatrix_{DCT2,maxTbS}[j*stepsize][i]$$

where $$stepsize = 1 \ll (\log2(maxTbS) - \log2(nTbS))$$
$$offsetCol = 0$$
$$offsetRow = 0$$

That is, the element of row j, column i of the (nTbS)×(nTbS) DCT2 transform matrix is the element of row (j*stepsize), column i of the (maxTbS)×(maxTbS) DCT2 transform matrix. In other words, the submatrix obtained by sampling the (maxTbS)×(maxTbS) DCT2 transform matrix with sampling interval stepsize=(1<<(log 2(maxTbS)−log 2(nTbS)), row offset offsetCol=0, and column offset offsetRow=0 is the (nTbS)×(nTbS) DCT2 transform matrix.

In this way, the transform matrix derivation apparatus 500 can derive the transform matrix nTbS-pt DCT2 from the base transform matrix maxTbS-pt DCT2.

<Case of Transform Type DCT4>

Next, the derivation method of the transform matrix in which the transform type trType is DCT4 will be described. As illustrated in A of FIG. 50, the transform type of the base transform matrix C is DCT2, and the size is 16×16.

For example, in the case of deriving the derivation transform matrix T of transform type DCT4 and size 8×8 from the base transform matrix C in A of FIG. 50, the transform matrix derivation apparatus 500 samples the matrix elements of the gray part of the base transform matrix C illustrated in A of FIG. 50, to derive the derivation transform matrix T. In this case, the sign inversion operation and the flip operation are skipped. That is, the derivation transform matrix T as illustrated in B of FIG. 50 is obtained.

Further, in the case of, for example, deriving the derivation transform matrix T of transform type DCT4 and size 4×4 from the base transform matrix C in A of FIG. 50, the transform matrix derivation apparatus 500 samples the matrix elements surrounded by thick lines in the base transform matrix C illustrated in A of FIG. 50, to derive the derivation transform matrix T. In this case as well, the sign inversion operation and the flip operation are skipped. That is, the derivation transform matrix T as illustrated in C of FIG. 50 is obtained.

In this way, also in the case of the derivation method of the transform matrix of DCT4, the sampling interval stepsize is two rows in the case of 8×8 (one row in every two rows is sampled) and is four rows in the case of 4×4 (one row in every four rows is sampled). That is, the sampling interval stepsize is a value exponentiated by the difference between the logarithm base 2 of the maximum size maxTbS of the transform block and the logarithm base 2 of the size nTbS of the transform matrix to be derived. In addition, the row offset offsetCol is "1" (that is, one row) in the case of 8×8 and is "2" (that is, two rows) in the case of 4×4. That is, in the vertical direction in FIG. 50, the sampling is started from the second row (row with row number "1") in the case of 8×8, and the sampling is started from the third row (row with row number "2") in the case of 4×4. That is, the row offset offsetCol is half the sampling interval stepsize. Note that the column offset offsetRow is "0" in either case. Further, the transform matrix derivation apparatus 500 uses the sampling parameters to perform sampling (without performing the sign inversion operation and the flip operation) to derive the derivation transform matrix T in which the transform type trType is DCT4.

That is, the transform matrix derivation apparatus 500 executes the transform process as expressed in Equation (X2) in D of FIG. 50, to derive the derivation transform matrix T in which the transform type trType is DCT4. Equation (X2) is also illustrated below.

$$transMatrix_{DCT4,nTbS}[j][i] = \qquad (X2)$$
$$transMatrix_{DCT2,maxTbS}[j*stepsize + offsetCol][i + offsetRow] =$$
$$transMatrix_{DCT2,maxTbS}[j*stepsize + offsetCol][i]$$

where $$stepsize = 1 \ll (\log2(maxTbS) - \log2(nTbS))$$
$$offsetCol = stepsize \gg 1$$
$$offsetRow = 0$$

That is, the element of row j, column i of the (nTbS)×(nTbS) DCT4 transform matrix is the element of row (j*stepsize+offsetCol), column i of the (maxTbS)×(maxTbS) DCT2 transform matrix. In other words, the submatrix obtained by sampling the (maxTbS)×(maxTbS) DCT2 transform matrix with sampling interval stepsize=(1<<(log 2(maxTbS)−log 2(nTbS)), row offset offsetCol=(stepsize>>1), and column offset offsetRow=0 is the (nTbS)×(nTbS) DCT4 transform matrix.

In this way, the transform matrix derivation apparatus 500 can derive the transform matrix nTbS-pt DCT4 from the base transform matrix maxTbS-pt DCT2.

<Case of Transform Type FlipDCT4>

Next, the derivation method of the transform matrix in which the transform type trType is FlipDCT4 will be described. As illustrated in A of FIG. 51, the transform type of the base transform matrix C is DCT2, and the size is 16×16.

For example, in the case of deriving the derivation transform matrix T of transform type FlipDCT4 and size 8×8 from the base transform matrix C in A of FIG. 51, the transform matrix derivation apparatus 500 samples the matrix elements of the gray part of the base transform matrix. C illustrated in A of FIG. 51 and performs the flip operation in the horizontal direction to derive the derivation transform matrix T. In this case, the sign inversion operation is skipped. That is, the derivation transform matrix T as illustrated in B of FIG. 51 is obtained.

Further, is the case of, for example, deriving the derivation transform matrix T of transform type FlipDCT4 and size 4×4 from the base transform matrix C in A of FIG. 51, the transform matrix derivation apparatus 500 samples the matrix elements surrounded by thick lines in the base transform matrix C illustrated in A of FIG. 51 and performs the flip operation in the horizontal direction to derive the derivation transform matrix T. In this case as well, the sign inversion operation is skipped. That is, the derivation transform matrix T as illustrated in C of FIG. 51 is obtained.

In this way, in the case of the derivation method of the transform matrix of FlipDCT4 as well, the sampling interval stepsize is two rows in the case of 8×8 (one row in every two rows is sampled) and is four rows in the case of 4×4 (one row in every four rows is sampled). That is, the sampling interval stepsize is a value exponentiated by the difference between the logarithm base 2 of the maximum size maxTbS of the transform block and the logarithm base 2 of the size nTbS of the transform matrix to be derived. In addition, the row offset offsetCol is "1" (that is, one row) in the case of 8×8 and is "2" (that is, two rows) in the case of 4×4. That is, the row offset offsetCol is half the sampling interval stepsize. Note that the column offset offsetRow is "0" in either case. Further, the transform matrix derivation apparatus 500 uses the sampling parameters to perform sampling and performs flipping in the horizontal direction. (performs the flip operation of each row) (without performing the sign inversion operation) to derive the derivation transform matrix T in which the transform type trType is FlipDCT4.

That is, the transform matrix derivation apparatus 500 executes the transform process as expressed in Equation (X3) in D of FIG. 51 to derive the derivation transform matrix T in which the transform type trType is FlipDCT4. Equation (X3) is also illustrated below.

$$transMatrix_{FlipDCT4,nTbS}[j][i] = \qquad (X3)$$
$$transMatrix_{DCT2,maxTbS}[j*stepsize + offsetCol]$$
$$[(nTbS - 1 - i) + offsetRow] =$$
$$transMatrix_{DCT2,maxTbS}[j*stepsize + offsetCol][nTbS - 1 - i]$$

where $stepsize = 1 \ll (\log2(\text{max}TbS) - \log2(nTbS))$ $offsetCol = stepsize \gg 1$ $offsetRow = 0$ That is, the element of row j, column i of the (nTbS)×(nTbS) FlipDCT4 transform matrix is the element of row (j*stepsize+offsetCol), column (nTbS−1−i) of the (maxTbS)×(maxTbS) DCT2 transform matrix. In other words, when the submatrix obtained by sampling the (maxTbS)×(maxTbS) DCT2 transform matrix with sampling interval stepsize=(1<<(log 2(maxTbS)−log 2(nTbS))), row offset offsetCol=(stepsize>>1), and column offset offsetRow=0 is flipped in the horizontal direction, the (nTbS)×(nTbS) FlipDCT4 transform matrix is obtained.

In this way, the transform matrix derivation apparatus 500 can derive the transform matrix nTbS-pt FlipDCT4 from the base transform matrix maxTbS-pt DCT2.

<Case of Transform Type DST4 (Low-Order)>

Next, the derivation method of the transform matrix in which the transform type trType is DST4 (low-order) will be described. As illustrated in A of FIG. 52, the transform type of the base transform matrix C is DCT2, and the size is 16×16.

For example, in the case of deriving the derivation transform matrix T of transform type DST4 and size 8×8 from the base transform matrix C in A of FIG. 52, the transform matrix derivation apparatus 500 samples the matrix elements of the gray part of the base transform matrix C illustrated in A of FIG. 52, performs the flip operation in the horizontal direction, and performs the sign inversion operation of the odd rows, to derive the derivation transform matrix T. That is, the derivation transform matrix T as illustrated in B of FIG. 52 is obtained.

Further, in the case of, for example, deriving the derivation transform matrix T of transform type DST4 and size 4×4 from the base transform matrix C in A of FIG. 52, the transform matrix derivation apparatus 500 samples the matrix elements surrounded by thick lines in the base transform matrix C illustrated in A of FIG. 52, performs the flip operation in the horizontal direction, and performs the sign inversion operation of the odd rows to derive the derivation transform matrix T. That is, the derivation transform matrix T as illustrated in C of FIG. 52 is obtained.

In this way, also in the case of the derivation method of the transform matrix of DST4, the sampling interval stepsize is two rows in the case of 8×8 (one row in every two rows is sampled) and is four rows in the case of 4×4 (one row in every four rows is sampled). That is, the sampling interval stepsize is a value exponentiated by the difference between the logarithm base 2 of the maximum size maxTbS of the transform block and the logarithm base 2 of the size nTbS of the transform matrix to be derived. In addition, the row offset offsetCol is "1" (that is, one row) in the case of 8×8 and is "2" (that is, two rows) in the case of 4×4. That is, the row offset offsetCol is half the sampling interval stepsize. Note that the column offset offsetRow is "0" in either case. Further, the transform matrix derivation apparatus 500 uses the sampling parameters to perform sampling, performs the flip operation in the horizontal direction (performs the flip operation of each row), and performs the sign inversion operation of the odd rows to derive the derivation transform matrix T in which the transform type trType is DST4.

That is, the transform matrix derivation apparatus 500 executes the transform process as expressed in Equation (X4) in D of FIG. 52, to derive the derivation transform matrix T in which the transform type trType is DST4. Equation (X4) is also illustrated below.

$$transMatrix_{DST4,nTbS}[j][i] = \qquad (X4)$$
$$\text{sign} * transMatrix_{DCT2,maxTbS}[j*stepsize + offsetCol]$$
$$[(nTbS - 1 - i) + offsetRow] = \text{sign} * transMatrix_{DCT2,maxTbS}$$
$$[j*stepsize + offsetCol][nTbS - 1 - i]$$

where $stepsize = 1 \ll (\log2(\text{max}TbS) - \log2(nTbS))$ $offsetCol = stepsize \gg 1$ $offsetRow = 0$ $\text{sign} = (j \% 2 == 0)?1: -1$ That is, the element of row j, column i of the (nTbS)×(nTbS) DST4 transform matrix is obtained by multiplying the element of row (j*stepsize+offsetCol), column (nTbs−1−i) of the (maxTbS)×(maxTbS) DCT2 transform matrix by the sign "sign." In other words, when the submatrix obtained by sampling the (maxTbS)×(maxTbS) DCT2 transform matrix with sampling interval stepsize=(1<<(log 2(maxTbS)−log 2(nTbS))), row offset offsetCol=(stepsize>>1), and column offset offsetRow=0 is flipped in the horizontal direction and the signs of the odd rows are inverted, the (nTbS)×(nTbS) DST2 transform matrix is obtained. Note that the sign "sign" is set to "1" in the case where the row j of the (nTbS)×(nTbS) DST4 transform matrix is an even row, and the sign "sign" is set to "−1" in the case where the row j is an odd row.

In this way, the transform matrix derivation apparatus 500 can derive the transform matrix nTbS-pt DST4 from the base transform matrix maxTbS-pt DCT2.

<Case of Transform Type DST2>

Next, the derivation method of the transform matrix in which the transform type trType is DST2 will be described. As illustrated in A of FIG. 53, the transform type of the base transform matrix C is DCT2, and the size is 16×16.

For example, in the case of deriving the derivation transform matrix T of transform type DST2 and size 8×8 from the base transform matrix C in A of FIG. 53, the transform matrix derivation apparatus 500 samples the matrix elements of the gray part of the base transform matrix C illustrated in A of FIG. 53, performs the flip operation in the vertical direction, and performs the sign inversion operation of the odd columns, to derive the derivation transform matrix T. That is, the derivation transform matrix T as illustrated in B of FIG. 53 is obtained.

Furthermore, in the case of, for example, deriving the derivation transform matrix T of transform type DST2 and size 4×4 from the base transform matrix C in A of FIG. 53, the transform matrix derivation apparatus 500 samples the matrix elements surrounded by thick lines in the base transform matrix C illustrated in A of FIG. 53, performs the flap operation in the vertical direction, and performs the sign inversion operation of the odd columns, to derive the derivation transform matrix T. That is, the derivation transform matrix T as illustrated in C of FIG. 53 is obtained.

In this way, also in the case of the derivation method of the transform matrix of DST2, the sampling interval stepsize is two rows in the case of 8×8 (one row in every two rows is sampled) and is four rows in the case of 4×4 (one row in every four rows is sampled). That is, the sampling interval stepsize is a value exponentiated by the difference between the logarithm base 2 of the maximum size maxTbS of the transform block and the logarithm base 2 of the size nTbS of the transform matrix to be derived. Note that the row offset offsetCol and the column offset offsetRow are "0" in either case. Further, the transform matrix derivation apparatus 500 uses the sampling parameters to perform sampling, performs the flip operation in the vertical direction (performs the flip operation of each column), and performs the sign inversion operation of the odd columns, to derive the derivation transform matrix T in which the transform type trType is DST2.

That is, the transform matrix derivation apparatus 500 executes the transform process as expressed in Equation (X5) in D of FIG. 53, to derive the derivation transform matrix T in which the transform type trType is DST2. Equation (X5) is also illustrated below.

$$transMatrix_{DST2,nTbS}[j][i] = \qquad (X5)$$
$$sign * transMatrix_{DCT2,maxTbS}[(nTbS) - 1 - j] * stepsize +$$
$$offsetCol][i + offsetRow] =$$

-continued
$$sign * transMatrix_{DCT2,maxTbS}[(nTbS) - 1 - j) * stepsize][i]$$

where $$stepsize = 1 \ll (\log2(maxTbS) - \log2(nTbS))$$
$$offsetCol = 0$$
$$offsetRow = 0$$
$$sign = (i \ \%2 == 0)?1: -1$$

That is, the element of row j, column i of the (nTbS)×(nTbS) DST2 transform matrix is obtained by multiplying the element of row ((nTbS−1−k)*stepsize), column i of the (maxTbS)×(maxTbS) DCT2 transform matrix by the sign "sign." In other words, when the signs of the odd elements of each row are inverted in the submatrix obtained by sampling the (maxTbS)×(maxTbS) DCT2 transform matrix with sampling interval stepsize=(1<<(log 2(maxTbS)−log 2(nTbS))), row offset offsetCol=0, and column offset offsetRow=0, the (nTbS)×(nTbS) DST2 transform matrix is obtained. Note that the sign "sign" is set to "1" in the case where the column i of the (nTbS)×(nTbS) DST2 transform matrix is an even column, and the sign "sign" is set to "−1" in the case where the column i is an odd column.

In this way, the transform matrix derivation apparatus 500 can derive the transform matrix nTbS-pt DST2 from the base transform matrix maxTbS-pt DCT2.

<Case of Transform Type DST4 (High-Order)>

Next, another derivation method of the transform matrix in which the transform type trType is DST4 (high-order) will be described. As illustrated in A of FIG. 54, the transform type of the base transform matrix C is DCT2, and the size is 16×16.

Figure 54:
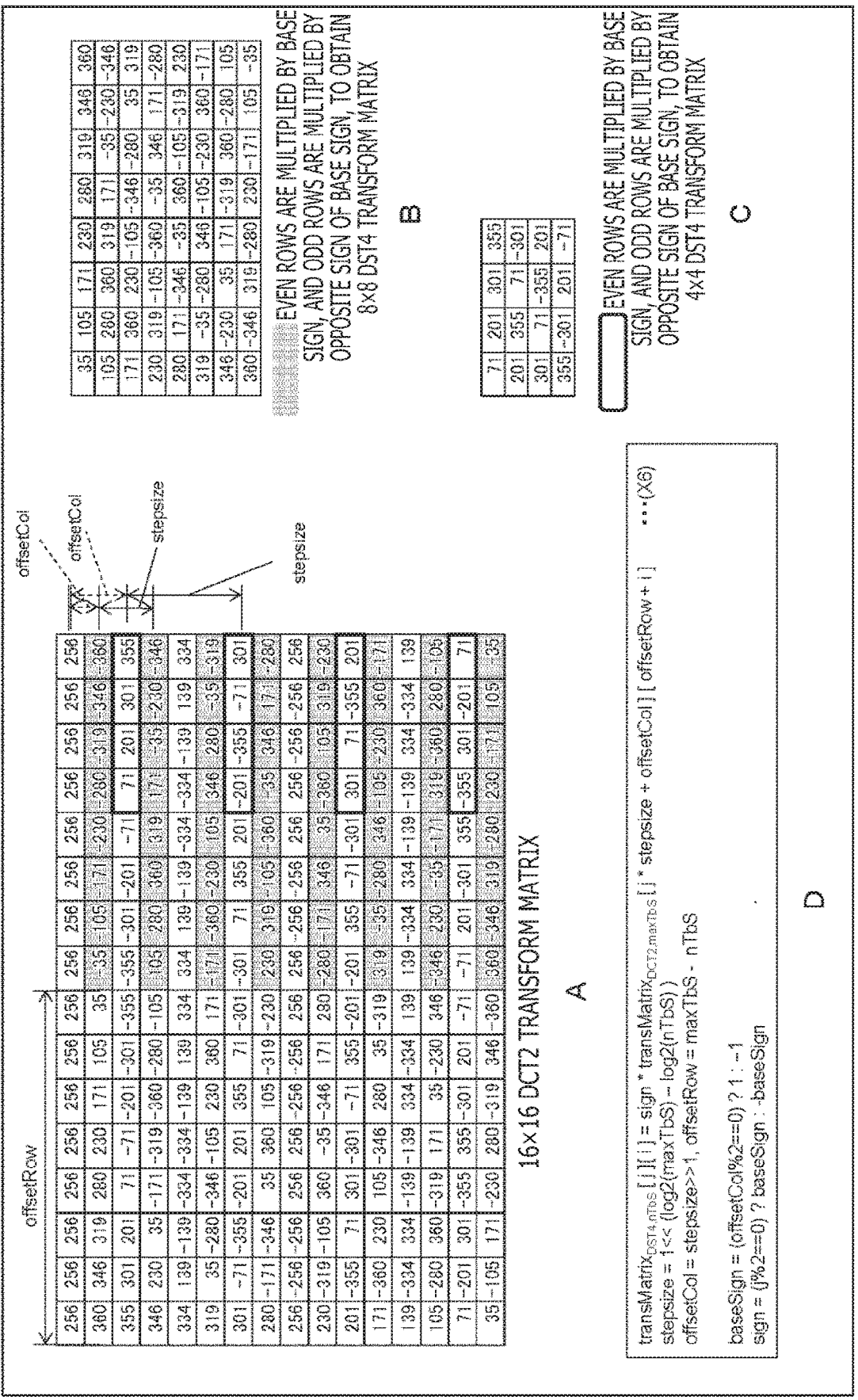
FIG. 54 is a diagram describing another example of the situation of the transform matrix derivation in the case where the transform type is DST4.

For example, in the case of deriving the derivation transform matrix T of transform type DST4 and size 8×8 from the base transform matrix C in A of FIG. 54, the transform matrix derivation apparatus 500 samples the matrix elements of the gray part of the base transform matrix C illustrated in A of FIG. 54 and performs the sign inversion operation by multiplying the even rows by the base sign baseSign defined based on the row offset offsetCol and multiplying the odd rows by the opposite sign −baseSign of the base sign, to derive the derivation transform matrix T. That is, the derivation transform matrix as illustrated in B of FIG. 54 is obtained.

Further, in the case of, for example, deriving the derivation transform matrix T of transform type DST4 and size 4×4 from the base transform matrix C in A of FIG. 54, the transform matrix derivation apparatus 500 samples the matrix elements surrounded by thick lines in the base transform matrix C illustrated in A of FIG. 54 and performs the sign inversion operation by multiplying the even rows by the base sign baseSign defined based on the row offset offsetCol and multiplying the odd rows by the opposite sign −baseSign of the base sign, to derive the derivation transform matrix T. That is, the derivation transform matrix as illustrated in C of FIG. 54 is obtained.

In this way, also in the case of the derivation method of the transform matrix of DST4, the sampling interval stepsize is two rows in the case of 8×8 (one row in every two rows is sampled) and is four rows in the case of 4×4 (one row in every four rows is sampled). That is, the sampling interval stepsize is a value exponentiated by the difference between the logarithm base 2 of the maximum size maxTbS of the transform block and the logarithm base 2 of the size nTbS of the transform matrix to be derived. In addition, the row offset offsetCol is "1" (that is, one row) in the case of 8×8 and is "2" (that is, two rows) in the case of 4×4. That is, the row offset offsetCol is half the sampling interval stepsize. In addition, the column offset offsetRow is "8" (that is eight columns) in the case of 8×8 and is "12" (that is, twelve columns) in the case of 4×4. That is, in the horizontal direction of FIG. 54, the sampling is started from the ninth column (column with column number "8") in the case of 8×8, and the sampling is started from the 13th column (column with column number "12") in the case of 4×4. That is, the column offset offsetRow is a value obtained by subtracting the size nTbS of the transform matrix to be derived from the maximum size maxTbS of the transform block. Further, the transform matrix derivation apparatus 500 uses the sampling parameters to perform sampling and performs the sign inversion operation by multiplying the even rows by the base sign baseSign defined based on the row offset offsetCol and multiplying the odd rows by the opposite sign −baseSign of the base sign, to derive the derivation transform matrix T in which the transform type trType is DST4.

That is, the transform matrix derivation apparatus 500 executes the transform process as expressed in Equation (X6) in D of FIG. 54 to derive the derivation transform matrix T in which the transform type trType is DST4. Equation (X6) is also illustrated below.

$$\text{transMatrix}_{DST4,nTbS}[j][i] = \text{sign}*\text{transMatrix}_{DCT2,maxTbS}[j*\text{stepsize}+\text{offsetCol}][\text{offsetRow}+i] \quad (X6)$$

where
stepsize=1<<(log 2(maxTbS)−log 2(nTbS))
offsetCol=stepsize>>1
offsetRow=maxTbS−nTbS
baseSign=(offsetCol % 2==0)?1:−1
sign=(j % 2==0)? baseSign:−baseSign That is, the element of row j, column i of the (nTbS)−(nTbS) DST4 transform matrix is obtained by multiplying the element of row (j*stepsized+offset), column ((maxTbS/2)+i) of the (maxTbS)×(maxTbS) DCT2 transform matrix by the sign "sign." in other words, in the submatrix obtained by sampling the (maxTbS)×(maxTbS) DCT2 transform matrix with sampling interval stepsize=(1<<(log 2(maxTbS)? log 2(nTbS))), row offset offsetCol=(stepsize>>1), and column offset offsetRow=(maxTbS−nTbS), the sign inversion operation is performed by multiplying the even rows by the base sign baseSign defined by the row offset and multiplying the odd rows by the opposite sign −baseSign of the base sign, to obtain the (nTbS)×(nTbS) DST4 transform matrix. Note that the base sign baseSign is set to "1" in the case where the row offset offsetCol is even, and the base sign baseSign is set to "−1" in the case where the row offset offsetCol is odd. In addition, the value of the base sign baseSign is set for the sign "sign" in the case where the row j of the (nTbS)×(nTbS) DST4 transform matrix is an even row, and a value of the opposite sign −baseSign of the base sign is set for the sign "sign" in the case where the row j is an odd row.

In this way, the transform matrix derivation apparatus 500 can derive the transform matrix nTbS-pt DST4 from the base transform matrix maxTbS-pt DCT2.

<Application Example of Present Technique>

The present technique described above can be applied to any apparatus, device, system, and the like. For example, the abovementioned present technique (derivation of transform matrix involving sampling based on sampling parameters) can be applied to an image encoding apparatus that encodes image data.

<Application to Image Encoding Apparatus>

For example, the present technique can be applied to the image encoding apparatus 100 illustrated in FIG. 27. For example, the present technique can be applied to the transform matrix derivation section 321 (FIG. 36) of the primary horizontal transform section 312. In such case, the transform matrix derivation section 321 can have a configuration similar to the transform matrix derivation apparatus 500 (FIG. 44) and execute a similar process (for example, the transform matrix derivation process of FIG. 46).

In such case, the transform matrix derivation section 321 derives the transform matrix. $T_H$ as described above based on the transform type identifier (trTypeIdxH) and the block size (maximum size maxTbS of a transform block and size nTbS (log 2TBWSize and log 2TBHSize) of the transform matrix to be derived) set by the control section 101. That is, similar to the case of the transform matrix derivation apparatus 500, the transform matrix derivation section 321 sets the sampling parameters based on the transform type identifier and the block size and uses the sampling parameters to perform the sampling and derive the submatrix. Further, the transform matrix derivation section 321 appropriately applies the flip operation, the sign inversion operation, and the like to the submatrix, according to the transform type identifier, and derives the desirable transform matrix $T_H$. The matrix computation section 322 uses the transform matrix $T_H$ derived in this way, to apply the one-dimensional orthogonal transform in the horizontal direction to the input data Xin (that is, transform block of predicted residual D) and obtain the intermediate data Y1.

In this way, the transform matrix derivation section 321 can set the derivation method corresponding to the transform type identifier trTypeIdxH supplied from the control section 101. As a result, the transform matrix derivation section 321 can easily derive, from the base transform matrix in the desirable size, the transform matrix of the desirable transform type used for the primary horizontal transform, in which the size of the transform matrix is smaller than the size of the base transform matrix.

Therefore, if the transform matrix of a predetermined transform type (for example, DCT2) in the maximum size maxTbS of the transform block is stored as the base transform matrix, the transform matrix derivation section 321 can derive the transform matrix of any transform type and size used in the primary horizontal transform. That is, the transform matrix derivation section 321 does not have to store transform matrices of a plurality of transform types and a plurality of sizes used in the primary horizontal transform. In other words, the transform matrix derivation section 321 can suppress the increase in the LUT size of the transform matrix (reduce the LUT size).

Further, in this case, the matrix computation of the (maxTbS)×(maxTbS) transform matrix and the matrix computation of the (nTbS)×(nTbS) transform matrix of the transform type trType can be shared in the matrix computation section 322. That is, the matrix computation section 322 can use the same computation circuit to perform the matrix computation regarding the primary horizontal transform regardless of the transform type and the size of the transform matrix. In other words, the matrix computation section 322 can suppress the increase in the circuit scale (reduce the circuit scale).

In addition, the present technique can be applied to, for example, the transform matrix derivation section 351 (FIG.

37) of the primary vertical transform section 313. In this case, the transform matrix derivation section 351 is only required to have a configuration similar to the transform matrix derivation apparatus 500 (FIG. 44) and execute a similar process (for example, the transform matrix derivation process of FIG. 46).

In such case, the transform matrix derivation section 351 derives the transform matrix $T_V$ as described above based on the transform type identifier (trTypeIdxV) and the block size (maximum size maxTbS of the transform block and size nTbS (log 2TBWSize and log 2TBHSize) of the transform matrix to be derived) set by the control section 101. That is as in the case of the transform matrix derivation apparatus 500, the transform matrix derivation section 351 sets the sampling parameters based on the transform type identifier and the block size and uses the sampling parameters to perform sampling and derive the submatrix. Further, the transform matrix derivation section 351 appropriately applies the flip operation, the sign inversion operation, and the like to the submatrix, according to the transform type identifier, and derives the desirable transform matrix $T_V$. The matrix computation section 352 uses the transform matrix $T_V$ derived in this way to apply the one-dimensional orthogonal transform in the vertical direction to the input data Xin (that is, transform block of the transform coefficient Coeff_Phor obtained by the primary horizontal transform) and obtain the intermediate data Y1.

In this way, the transform matrix derivation section 351 can set the derivation method corresponding to the transform type identifier trTypeIdxV supplied from the control section 101. As a result, the transform matrix derivation section 351 can easily derive, from the base transform matrix in the desirable size, the transform matrix of the desirable transform type used for the primary vertical transform, in which the size of the transform matrix is smaller than the size of the base transform matrix.

Therefore, if the transform matrix of a predetermined transform type (for example, DCT2) in the maximum size maxTbS of the transform block is stored as the base transform matrix, the transform matrix derivation apparatus 351 can derive the transform matrix of any transform type and size used in the primary vertical transform. That is, the transform matrix derivation section 351 does not have to store transform matrices of a plurality of transform types and a plurality of sizes used in the primary vertical transform. In other words, the transform matrix derivation section 351 can suppress the increase in the LUT size of the transform matrix (reduce the LUT size).

Further, in this case, the matrix computation of the (maxTbS)×(maxTbS) transform matrix and the matrix computation of the (nTbS)×(nTbS) transform matrix of the transform type trType can be shared in the matrix computation section 352. That is, the matrix computation section 352 can use the same computation circuit to perform the matrix computation regarding the primary vertical transform regardless of the transform type and the size of the transform matrix. That is, the matrix computation section 352 can suppress the increase in the circuit scale (reduce the circuit scale).

<Application to Image Decoding Apparatus>

For example, the present technique can be applied to the image decoding apparatus 200 illustrated in FIG. 31. For example, the present technique can be applied to the transform matrix derivation section 421 (FIG. 40) of the inverse primary vertical transform section 412. In such case, the transform matrix derivation section 421 is only required to have a configuration similar to the transform matrix derivation apparatus 500 (FIG. 44) and execute a similar process (for example, the transform matrix derivation process of FIG. 46).

In such case, the transform matrix derivation section 421 derives the transform matrix $T_V$ as described above based on the transform type identifier (trTypeIdxV) and the block size (maximum size maxTbS of a transform block and size nTbS (log 2TBWSize and log 2TBHSize) of the transform matrix to be derived) acquired by the decoding section 212 from the bitstream. That is, similarly to the case of the transform matrix derivation apparatus 500, the transform matrix derivation section 421 sets the sampling parameters based on the transform type identifier and the block size and uses the sampling parameters to perform the sampling and derive the submatrix. Further, the transform matrix derivation section 421 appropriately apples the flip operation, the sign inversion operation, and the like to the submatrix, according to the transform type identifier, and derives the desirable transform matrix $T_V$. The matrix computation section 422 uses the transform matrix $T_V$ derived in this way, to apply the inverse one-dimensional orthogonal transform in the vertical direction to the input data Xin (that is, the transform block of transform coefficient Coeff_IS obtained by the inverse secondary transform) and obtain the intermediate data Y1.

In this way, the transform matrix derivation section 421 can set the derivation method corresponding to the transform type identifier trTypeIdxV supplied from the decoding section 212. As a result, the transform matrix derivation section 421 can easily derive, from the base transform matrix in the desirable size, the transform matrix of the desirable transform type used for the inverse primary vertical transform, in which the size of the transform matrix is smaller than the size of the base transform matrix.

Accordingly, if the transform matrix of a predetermined transform type (for example, DCT2) in the maximum size maxTbS of the transform block is stored as the base transform matrix, the transform matrix derivation apparatus 421 can derive the transform matrix of any transform type and size used in the inverse primary vertical transform. That is, the transform matrix derivation section 421 does not have to store transform matrices of a plurality of transform types and a plurality of sizes used in the inverse primary vertical transform. In other words, the transform matrix derivation section 421 can suppress the increase in the LUT size of the transform matrix (reduce the LUT size).

Further, in this case, the matrix computation of the (maxTbS)×(maxTbS) transform matrix and the matrix computation of the (nTbS)×(nTbS) transform matrix of the transform type trType can be shared in the matrix computation section 422. That is, the matrix computation section 422 can use the same computation circuit to perform the matrix computation regarding the inverse primary vertical transform regardless of the transform type and the size of the transform matrix. In other words, the matrix computation section 422 can suppress the increase in the circuit scale (reduce the circuit scale).

In addition, the present technique can be applied to, for example, the transform matrix derivation section 451 (FIG. 41) of the inverse primary horizontal transform section 413. In this case, the transform matrix derivation section 451 is only required to have a configuration similar to the transform matrix derivation apparatus 500 (FIG. 44) and execute a similar process (for example, the transform matrix derivation process of FIG. 46).

In this case, the transform matrix derivation section 451 derives the transform matrix $T_H$ as described above based on the transform type identifier (trTypeIdxH) and the block size (maximum size maxTbS of a transform block and size nTbS (log 2TBWSize and log 2TBHSize) of the transform matrix to be derived) acquired by the decoding section 212 from the bitstream. That is, as in the case of the transform matrix derivation apparatus 500, the transform matrix derivation section 451 sets the sampling parameters based on the transform type identifier and the block size and uses the sampling parameters to perform sampling and derive the submatrix. Further, the transform matrix derivation section 451 appropriately applies the flip operation, the sign inversion operation, and the like to the submatrix, according to the transform type identifier, and derives the desirable transform matrix $T_H$. The matrix computation section 452 uses the transform matrix $T_H$ derived in this way to apply the inverse one-dimensional orthogonal transform in the horizontal direction to the input data Xin (that is, the transform block of the transform coefficient Coeff_IPver obtained by the inverse primary vertical transform) and obtain the intermediate data Y1.

In this way, the transform matrix derivation section 451 can set the derivation method corresponding to the transform type identifier trTypeIdxH supplied from the decoding section 212. As a result, the transform matrix derivation section 451 can easily derive, from the base transform matrix in the desirable size, the transform matrix of the desirable transform type used for the inverse primary horizontal transform, in which the size of the transform matrix is smaller than the size of the base transform matrix.

Accordingly, if the transform matrix of a predetermined transform type (for example, DCT2) in the maximum size maxTbS of the transform block is stored as the base transform matrix, the transform matrix derivation apparatus 451 can derive the transform matrix of any transform type and size used in the inverse primary horizontal transform. That is, the transform matrix derivation section 451 does not have to store transform matrices of a plurality of transform types and a plurality of sizes used in the inverse primary horizontal transform. In other words, the transform matrix derivation section 451 can suppress the increase in the LUT size of the transform matrix (reduce the LUT size).

Further, in this case, the matrix computation of the (maxTbS)×(maxTbS) transform matrix and the matrix computation of the (nTbS)×(nTbS) transform matrix of the transform type trType can be shared in the matrix computation section 452. That is, the matrix computation section 452 can use the same computation circuit to perform the matrix computation regarding the inverse primary horizontal transform regardless of the transform type and the size of the transform matrix. In other words, the matrix computation section 452 can suppress the increase in the circuit scale (reduce the circuit scale).

<13. Note>
<Computer>

The series of processes described above can be executed by hardware or can be executed by software. In the case where the series of processes is executed by software, a program included in the software is installed on a computer. Here, examples of the computer include a computer incorporated into dedicated hardware and a general-purpose personal computer that can execute various functions by installing various programs.

FIG. 55 is a block diagram illustrating a configuration example of the hardware of the computer that uses a program to execute the abovementioned series of processes.

In a computer 800 illustrated in FIG. 55, a CPU (Central Processing Unit) 801, a ROM (Read Only Memory) 802, and a RAM (Random Access Memory) 803 are connected to each other through a bus 804.

An input-output interface 810 is also connected to the bus 804. An input section 811, an output section 812, a storage section 813, a communication section 814, and a drive 815 are connected to the input-output interface 810.

The input section 811 includes, for example, a keyboard, a mouse, a microphone, a touch panel, an input terminal, and the like. The output section 812 includes, for example, a display, a speaker, an output terminal, and the like. The storage section 813 includes, for example, a hard disk, a RAM disk, a non-volatile memory, and the like. The communication section 814 includes, for example, a network interface. The drive 815 drives a removable medium 821, such as a magnetic disk, an optical disk, a magneto-optical disk, and a semiconductor memory.

In the computer configured in this way, the CPU 801 loads, for example, a program stored in the storage section 813 to the RAM 803 through the input-output interface 810 and the bus 804 to execute the program and thereby execute the series of processes. Data and the like necessary for the CPU 801 to execute various processes are also appropriately stored in the RAM 803.

The program executed by the computer (CPU 801) can be applied by, for example, recording the program in the removable medium 821 as a package medium or the like. In this case, the removable medium 821 can be mounted on the drive 815 to install the program on the storage section 813 through the input-output interface 810.

Further, the program can also be provided through a wired or wireless transmission medium, such as a local area network, the Internet, and digital satellite broadcasting. In this case, the program can be received by the communication section 814 and installed on the storage section 813.

In addition, the program can also be installed in advance on the ROM 802 or the storage section 813.

<Units of Information and Processes>

The data units in setting various types of information and the data units in various processes described above can freely be selected, and the data units are not limited to the examples. For example, the information and the processes may be set for each TU (Transform Unit), TB (Transform Block), PU (Prediction Unit), PB (Prediction Block), CU (Coding unit), LCU (Largest Coding Unit), sub-block, block, tile, slice, picture, sequence, or component, or the data in the data units may be the target. Obviously, the data unit can be set for each piece of information or process, and not all of the data units of the information and the processes have to be uniform. Note that the storage location of the information can be selected freely, and the information may be stored in the header, the parameter set, or the like of the data unit. In addition, the information may be stored in a plurality of places.

<Control Information>

The control information regarding the present technique described in each embodiment may be transmitted from the encoding side to the decoding side. For example, control information (for example, enabled_flag) for controlling whether or not to permit (or prohibit) the application of the abovementioned present technique may be transmitted. In addition, for example, control information indicating the target to which the present technique is to be applied (or the target to which the present technique is not to be applied) may be transmitted. For example, control information for designating the block size (one or both of an upper limit and a lower limit), the frame, the component, the layer, or the like in which the present technique is applied (or in which the application of the present technique is permitted or prohibited) may be transmitted.

<Target of Present Technique>

The present technique can be applied to any image encoding and decoding systems. That is, the specifications of various processes regarding image encoding and decoding, such as the transform (inverse transform), the quantization (inverse quantization), the encoding (decoding), and the prediction, can freely be selected as long as the specifications do not contradict the present technique, and the specifications are not limited to the examples. In addition, part of the processes may be shipped unless any contradiction arises with respect to the present technique.

In addition, the present technique can be applied to a multi-view image encoding/decoding system that performs encoding and decoding of multi-view images including images from a plurality of viewpoints (views). In that case, the present technique can be applied to the encoding and decoding from each viewpoint (view).

Further, the present technique can be applied to a tiered image encoding (scalable encoding) and decoding system that encodes and decodes tiered images divided into plural layers (tiers) to provide a scalability function for a predetermined parameter. In that case, the present technique can be applied to the encoding and decoding of each tier (layer).

The image encoding apparatus 100 and the image decoding apparatus 200 according to the embodiments can be applied to various electronic devices including, for example, a transmitter and a receiver (for example, television receiver and portable phone) in the distribution through satellite broadcasting, cable broadcasting such as cable TV, or the Internet or in the distribution to a terminal through cellular communication, an apparatus (for example, hard disk recorder and camera) that records images in a medium, such as an optical disk, a magnetic disk, and a flash memory, and that reproduces images from these storage media, and the like.

In addition, the present technique can also be carried out in any configuration mounted on any apparatus or an apparatus included in a system, such as, a processor (for example, video processor) as system LSI (Large Scale Integration) or the like, a module (for example, video module) using a plurality of processors or the like, a unit (for example, video unit) using a plurality of modules or the like, and a set (for example, video set) provided with other functions in addition to the unit (that is, configuration of part of an apparatus), for example.

Further, the present technique can also be applied to a network system including a plurality of apparatuses. For example, the present technique can be applied to a cloud service for providing a service regarding images (moving images) to any terminal, such as a computer, an AV (audio Visual) device, a portable information processing terminal, and an IoT (Internet of Things) device.

Note that the systems, the apparatuses, the processing sections, and the like according to the present technique can be used in any field, such as, for example, transportation, medical care, crime prevention, agriculture, livestock industry, mining industry, beauty care, factories, home appliances, weather observation, and natural surveillance. In addition, the usage can also be selected freely.

For example, the present technique can be applied to a system or a device used for providing content to be viewed or the like. In addition, the present technique can be applied to, for example, a system or a device used for transportation, such as for monitoring the traffic condition and for controlling the automatic driving. Further, the present technique can also be applied to, for example, a system or a deice used for security. In addition, the present technique can be applied to, for example, a system or a device used for automatic control of a machine or the like. Further, the present technique can also be applied to, for example, a system or a device used for agriculture or livestock industry. In addition, the present technique can also be applied to, for example, a system or a device that monitors the state of the nature, such as volcanos, forests, and oceans, wild life, and the like. Furthermore, the present technique can also be applied to, for example, a system or a device used for sports.

<Others>

Note that the "flag" in the present specification is information for identifying a plurality of states, and the "flag" includes not only information used for identifying two states of true (1) and false (0) but also information that can identify three or more states. Therefore, the number of possible values of the "flag" may be two, such as 1/0, or may be three or more. That is, the number of bits of the "flag" can be selected freely, and the "flag" may include 1 bit or a plurality of bits. In addition, as for the identification information. (including flag), there can be not only a form of including the identification information in the bitstream, but also a form of including difference information of the identification information with respect to reference information in the bitstream. Therefore, the "flag" and the "identification information" in the present specification include not only the information of the "flag" and the "identification information" but also the difference information with respect to the reference information.

In addition, various types of information (metadata and the like) regarding encoded data (bitstream) may be transmitted or recorded in any form as long as the information is associated with the encoded data. Here, the term "associated" denotes, for example, that one piece of data can be used (can be linked) in processing another piece of data. That is, the pieces of data associated with each other may be integrated as one piece of data or may be provided as separate pieces of data. For example, the information associated with the encoded data (image) may be transmitted on a transmission path different from that for the encoded data (image). In addition, for example, the information associated with the encoded data (image) may be recorded in a recording medium separate from that for the encoded data (image) (or in a separate recording area of the same recording medium). Note that part of the data may be "associated," instead of the entire data. For example, the image and the information corresponding to the image may be associated with each other in any unit, such as a plurality of frames, one frame, and part of the frame.

Note that the terms, such as "combine," "multiplex," "add," "integrate," "include," "store," "put in," "place into," and "insert," in the present specification denote grouping of a plurality of things into one thing, such as grouping of encoded data and metadata into one piece of data, and each term denotes one method of "associating" described above.

In addition, the embodiments of the present technique are not limited to the embodiments described above, and various changes can be made without departing from the scope of the present technique.

In addition, for example, the present technique can also be carried out in any configuration included in an apparatus or a system, such as a processor as system LSI (Large Scale Integration) or the like, a module using a plurality of processors or the like, a unit using a plurality of modules or the like, and a set provided with other functions in addition to the unit (that is, configuration of part of an apparatus), for example.

Note that in the present specification, the system denotes a set of a plurality of constituent elements (apparatuses, modules (components), and the like), and whether or not all of the constituent elements are in the same housing does not matter. Therefore, plural apparatuses stored in separate housings and connected through a network and one apparatus storing plural modules in one housing are both systems.

In addition, for example, the configuration of one apparatus (or processing section) described above may be divided to provide a plurality of apparatuses (or processing sections). Conversely, the configurations of a plurality of apparatuses (or processing sections) described above may be integrated to provide one apparatus (or processing section). In addition, configurations other than the abovementioned configurations described above may of course be added to the configuration of each apparatus (or each processing section). Further, part of the configuration of an apparatus (or processing section) may be included in the configuration of another apparatus (or another processing section) as long as the configuration and the operation of the entire system are substantially the same.

In addition, the present technique can be provided as, for example, cloud computing in which plural apparatuses share one function and cooperate to execute a process through a network.

In addition, the program described above can be executed by, for example, any apparatus. In that case, the apparatus is only required to have necessary functions (such as functional blocks) and obtain necessary information.

In addition, for example, one apparatus can execute each step described in the flowcharts, or plural apparatuses can take charge and execute each step. Moreover, in the case where one step includes plural processes, one apparatus can execute the plural processes included in one step, or plural apparatuses can take charge and execute the processes. In other words, plural processes included in one step can also be executed as a process of plural steps. Conversely, processes described as plural steps can also be integrated into one step and executed.

Note that in the program executed by the computer, the processes of the steps describing the program may be executed in chronological order described in the present specification or may be executed in parallel or executed separately at necessary timing such as when the program is invoked. That is, the processes of the steps may be executed in a different order from the order described above as long as there is no contradiction. Further, the processes of the steps describing the program may be executed in parallel with processes of other programs or may be executed in combination with processes of other programs.

Note that the plural present techniques described in the present specification can be independently and separately carried out as long as there is no contradiction. Obviously, plural, freely-selected present techniques can be combined and carried out. For example, a whole or part of the present technique described in one of the embodiments can also be carried out in combination with a whole or part of the present technique described in another embodiment. In addition, a whole or part of any present technique described above can also be carried out in combination with another technique not described above.

REFERENCE SIGNS LIST

001 Transform matrix derivation section, 002 Transform matrix LUT, 003 Sampling section, 004 Flip section, 005 Transposition section, 006 Sign inversion section, 100 Image encoding apparatus, 101 Control section, 113 Orthogonal transform section, 115 Encoding section, 118 Inverse orthogonal transform section, 152 Primary transform section, 200 Image decoding apparatus, 212 Decoding section, 214 Inverse orthogonal transform section, 253 Inverse primary transform section, 311 Primary transform selection section, 312 Primary horizontal transform section, 313 Primary vertical transform section, 321 Transform matrix derivation section, 351 Transform matrix derivation section, 411 Inverse primary transform selection section, 412 Inverse primary vertical transform section, 413 Inverse primary horizontal transform section, 421 Transform matrix derivation section, 451 Transform matrix derivation section, 500 Transform matrix derivation apparatus, 511 Transform matrix LUT, 512 Derivation method setting section, 513 Sampling section, 514 Submatrix operation section, 521 Sampling parameter derivation section, 522 Submatrix extraction section, 531 Flip section, 532 Sign inversion section

The invention claimed is:

1. An image processing apparatus comprising:
a decoding section configured to decode a bitstream to generate coefficient data in which a predicted residual of an image is orthogonally transformed;
a derivation section configured to derive, from a submatrix as part of a first transform matrix in a first size, a second transform matrix in a second size that is a size smaller than the first size; and
an inverse orthogonal transform section configured to use the second transform matrix derived by the derivation section, to apply an inverse orthogonal transform to the coefficient data generated by the decoding section,
wherein the derivation section is further configured to use the first transform matrix stored in a lookup table, to derive the second transform matrix, and
wherein the decoding section, the derivation section, and the inverse orthogonal transform section are each implemented via at least one processor.

2. The image processing apparatus according to claim 1, wherein
the derivation section is further configured to derive, as the submatrix, a matrix obtained by sampling matrix elements of the first transform matrix.

3. The image processing apparatus according to claim 2, wherein
the derivation section is further configured to derive, as the submatrix, an even low-order matrix including matrix elements in a left half of matrix elements of an even matrix including matrix elements of even rows of the first transform matrix.

4. The image processing apparatus according to claim 2, wherein
the derivation section is further configured to derive, as the submatrix, an even high-order matrix including matrix elements in a right half of matrix elements of an even matrix including matrix elements of even rows of the first transform matrix.

5. The image processing apparatus according to claim 2, wherein
the derivation section is further configured to derive, as the submatrix, an odd low-order matrix including matrix elements in a left half of matrix elements of an odd matrix including matrix elements of odd rows of the first transform matrix.

6. The image processing apparatus according to claim 2, wherein
the derivation section is further configured to derive, as the submatrix, an odd high-order matrix including matrix elements in a right half of matrix elements of an odd matrix including matrix elements of odd rows of the first transform matrix.

7. The image processing apparatus according to claim 2, wherein
the derivation section is further configured to apply an operation to matrix elements of the submatrix to derive the second transform matrix.

8. The image processing apparatus according to claim 7, wherein
the derivation section is further configured to apply the operation for a plurality of times to derive the second transform matrix.

9. The image processing apparatus according to claim 7, wherein
the derivation section is further configured to apply a replacement operation to the matrix elements of the submatrix to derive the second transform matrix.

10. The image processing apparatus according to claim 7, wherein
the derivation section is further configured to apply a flip operation to the matrix elements of the submatrix to derive the second transform matrix.

11. The image processing apparatus according to claim 7, wherein
the derivation section is further configured to apply a transposition operation to the matrix elements of the submatrix to derive the second transform matrix.

12. The image processing apparatus according to claim 7, wherein
the derivation section is further configured to apply a sign inversion operation to the matrix elements of the submatrix to derive the second transform matrix.

13. The image processing apparatus according to claim 7, wherein
the first size includes $2^{\wedge}(N)_x 2^{\wedge}(N)$, and
the second size includes $2^{\wedge}(N-1)_x 2^{\wedge}(N-1)$, where
N is an integer equal to or greater than 3, and ^ is exponentiation.

14. The image processing apparatus according to claim 2, wherein
the inverse orthogonal transform section is further configured
to apply an inverse secondary transform to the coefficient data and use the second transform matrix derived by the derivation section, to apply an inverse primary transform to a result of the inverse secondary transform.

15. The image processing apparatus according to claim 2, wherein
the decoding section is further configured to use a Coding Unit (CU) of a Quad-Tree Block Structure or a Quad Tree Plus Binary Tree (QTBT) Block Structure as a unit of processing to decode the bitstream.

16. The image processing apparatus according to claim 2, wherein
the inverse orthogonal transform section is further configured to use a Transform Unit (TU) of a Quad-Tree Block Structure or a Quad Tree Plus Binary Tree (QTBT) Block Structure as a unit of processing to apply the inverse orthogonal transform to the coefficient data.

17. The image processing apparatus according to claim 2, wherein
the derivation section is further configured to derive, as the submatrix, the matrix obtained by sampling the matrix elements of the first transform matrix based on predetermined sampling parameters.

18. The image processing apparatus according to claim 17, wherein
the first transform matrix includes a transform matrix in which a transform type trType includes DCT2, the first size includes a maximum size maxTbS of a transform block, and the second size includes a size nTbS of a one-dimensional transform.

19. The image processing apparatus according to claim 18, wherein
the sampling parameters include
a sampling interval stepsize indicating a row interval in sampling,
a row offset offsetCol indicating an offset (row location) of sampling, and
a column offset offsetRow indicating an offset (column location) of sampling.

20. The image processing apparatus according to claim 19, wherein
the derivation section is further configured to sample the first transform matrix, based on the sampling interval stepsize, the row offset offsetCol, and the column offset offsetRow derived as follows, to derive the second transform matrix in which the transform type trType includes DCT2:
stepsize=1<<(Log 2(maxTbS)−Log 2(nTbS)),
offsetCol=0, and
offsetRow=0.

21. The image processing apparatus according to claim 20, wherein
the derivation section is further configured to apply a flip operation of each column to the matrix elements of the submatrix obtained by sampling the first transform matrix and perform a sign inversion operation of odd columns, to derive the second transform matrix in which the transform type trType includes DST2.

22. The image processing apparatus according to claim 19, wherein
the derivation section is further configured to sample the first transform matrix, based on the sampling interval stepsize, the row offset offsetCol, and the column offset offsetRow derived as follows, to derive the second transform matrix in which the transform type trType includes DCT4:
stepsize=1<<(Log 2(maxTbS)−Log 2(nTbS)),
offsetCol=stepsize<<1, and
offsetRow=0.

23. The image processing apparatus according to claim 22, wherein
the derivation section is further configured to apply a flip operation of each row to the matrix elements of the submatrix obtained by sampling the first transform matrix, to derive the second transform matrix in which the transform type trType includes FlipDCT4.

24. The image processing apparatus according to claim 23, wherein
the derivation section is further configured to apply a sign inversion operation of odd rows to the matrix elements of the submatrix subjected to the flip operation, to derive the second transform matrix in which the transform type trType includes DST4.

25. The image processing apparatus according to claim 19, wherein
the derivation section is further configured to sample the first transform matrix, based on the sampling interval stepsize, the row offset offsetCol, and the column offset offsetRow derived as follows, multiples matrix elements of even rows of an obtained submatrix by a base sign baseSign derived based on the row offset offsetCol as follows, and multiplies matrix elements of odd rows of the submatrix by an opposite sign −baseSign of the base sign, to derive the second transform matrix in which the transform type trType includes DST4:
stepsize=1<<(Log 2−(maxTbS)−Log 2(nTbS)),
offsetCol=stepsize>>1,
offsetRow=maxTbS−nTbS, and
baseSign=(offsetCol %2==0)? 1:−1.

26. The image processing apparatus according to claim 1, wherein
the decoding section includes
an arithmetic decoding section configured to arithmetically decode the bitstream to generate quantization data, and
an inverse quantization section configured to apply inverse quantization to the quantization data generated by the arithmetic decoding section, to generate the coefficient data,
the inverse orthogonal transform section is further configured to apply an inverse orthogonal transform to the coefficient data generated by the inverse quantization section, and
the arithmetic decoding section and the inverse quantization section are each implemented via at least one processor.

27. The image processing apparatus according to claim 1, wherein
each element of the first transform matrix is scaled and approximated to an integer.

28. An image processing method comprising:
decoding a bitstream to generate coefficient data in which a predicted residual of an image is orthogonally transformed;
deriving, from a submatrix as part of a first transform matrix in a first size, a second transform matrix in a second size that is a size smaller than the first size;
using the derived second transform matrix to apply an inverse orthogonal transform to the generated coefficient data; and
using the first transform matrix stored in a lookup table, to derive the second transform matrix.

29. An image processing apparatus comprising:
a derivation section configured to derive, from a submatrix as part of a first transform matrix in a first size, a second transform matrix in a second size that is a size smaller than the first size;
an orthogonal transform section configured to use the second transform matrix derived by the derivation section, to orthogonally transform a predicted residual of an image and generate coefficient data; and
an encoding section configured to encode the coefficient data generated by the orthogonal transform section, to generate a bitstream,
wherein the derivation section is further configured to use the first transform matrix stored in a lookup table, to derive the second transform matrix, and
wherein the derivation section, the orthogonal transform section, and the encoding section are each implemented via at least one processor.

30. An image processing method comprising:
deriving, from a submatrix as part of a first transform matrix in a first size, a second transform matrix in a second size that is a size smaller than the first size;
using the derived second transform matrix to orthogonally transform a predicted residual of an image and generate coefficient data;
encoding the generated coefficient data to generate a bitstream; and
using the first transform matrix stored in a lookup table, to derive the second transform matrix.

31. A non-transitory computer-readable medium having embodied thereon a program, which when executed by a computer causes the computer to execute an image processing method, the method comprising:
decoding a bitstream to generate coefficient data in which a predicted residual of an image is orthogonally transformed;
deriving, from a submatrix as part of a first transform matrix in a first size, a second transform matrix in a second size that is a size smaller than the first size;
using the derived second transform matrix to apply an inverse orthogonal transform to the generated coefficient data; and
using the first transform matrix stored in a lookup table, to derive the second transform matrix.

32. A non-transitory computer-readable medium having embodied thereon a program, which when executed by a computer causes the computer to execute an image processing method, the method comprising:
deriving, from a submatrix as part of a first transform matrix in a first size, a second transform matrix in a second size that is a size smaller than the first size;
using the derived second transform matrix to orthogonally transform a predicted residual of an image and generate coefficient data;
encoding the generated coefficient data to generate a bitstream; and
using the first transform matrix stored in a lookup table, to derive the second transform matrix.

* * * * *